United States Patent [19]
Mizobe

[11] Patent Number: 5,985,005
[45] Date of Patent: Nov. 16, 1999

[54] DEHUMIDIFYING DEVICE

[76] Inventor: Kunitaka Mizobe, 6-7, Hoshikuma 1-chome, Jonan-ku, Fukuoka, Japan

[21] Appl. No.: 08/817,808

[22] PCT Filed: Oct. 12, 1995

[86] PCT No.: PCT/JP95/02089

§ 371 Date: Apr. 14, 1997

§ 102(e) Date: Apr. 14, 1997

[30] Foreign Application Priority Data

Oct. 13, 1994 [JP] Japan .................................. 6-287093

[51] Int. Cl.$^6$ .............................. B01D 53/22; B01D 53/26
[52] U.S. Cl. ............................... 96/7; 96/9; 96/10; 55/360
[58] Field of Search ................. 55/360; 95/45, 95/52; 96/4, 6–10

[56] References Cited

U.S. PATENT DOCUMENTS

| | | | |
|---|---|---|---|
| 693,638 | 2/1902 | Breuer | 454/359 |
| 2,452,066 | 10/1948 | Murphy | 429/86 |
| 2,506,656 | 5/1950 | Wallach et al. | 95/52 |
| 3,229,023 | 1/1966 | Bolton et al. | 174/14 R |
| 3,369,343 | 2/1968 | Robb | 95/46 |
| 4,354,857 | 10/1982 | Reiss | 95/45 X |
| 5,066,683 | 11/1991 | Dillon et al. | 95/52 X |
| 5,417,743 | 5/1995 | Dauber | 96/13 |
| 5,575,835 | 11/1996 | Bailey et al. | 95/52 X |
| 5,665,146 | 9/1997 | Mizobe | 96/7 |
| 5,820,655 | 10/1998 | Gottzmann et al. | 96/8 X |

FOREIGN PATENT DOCUMENTS

| | | | |
|---|---|---|---|
| 57-59618 | 4/1982 | Japan . | |
| 62-26899 | 2/1987 | Japan . | |
| 63-080828 | 4/1988 | Japan | 96/4 |
| 63-267416 | 11/1988 | Japan . | |
| 63-287530 | 11/1988 | Japan . | |
| 63-291623 | 11/1988 | Japan . | |
| 1-274824 | 11/1989 | Japan . | |
| 2-126914 | 5/1990 | Japan | 96/7 |
| 3-207422 | 9/1991 | Japan | 95/45 |
| 4-156915 | 5/1992 | Japan | 96/4 |
| 5-115735 | 5/1993 | Japan . | |
| 5-322060 | 12/1993 | Japan . | |
| 6-134244 | 5/1994 | Japan . | |
| 6-134245 | 5/1994 | Japan . | |
| 6-134246 | 5/1994 | Japan . | |
| 7-68124 | 3/1995 | Japan . | |

*Primary Examiner*—Robert Spitzer
*Attorney, Agent, or Firm*—Flynn, Thiel, Boutell & Tanis, P.C.

[57] ABSTRACT

A dehumidifying device in which lower humidity can be achieved in a side to be dehumidified (a side of a box) and the stable continued effect can also be obtained without any dehumidifying effect which stays at a low level due to water vapor gas electrified by an electric panel accommodated in the box side, hydrogen gas existing in outside air, or other floating dusts easily electrified in the air or the like. The dehumidifying device comprises a tubular body provided in a wall section of a box and forming a vent path for air communication between inside and outside of the box, and a vent body formed by providing an electrically grounded conductive porous body adjacent to at least one side of a waterproof membrane having moisture-permeable micro-throughholes to make a pair therewith and arranging at least two pairs thereof at a space from each other inside said tubular body to shield an inside space of the vent path into at least one chamber in the direction from the box to the outside.

12 Claims, 36 Drawing Sheets

Fig.32

Table showing physical features

| | CODE NO | (1) moisture permeability (g/m × m × day) | (2) the ratio of moisture permeability A | (3) air permeability (sec/100cc) | (4) the ratio of air permeability | (5) A × B |
|---|---|---|---|---|---|---|
| | Experiment items | L 1099 | | P 8117 | | |
| ① | 1103 – N30C | 350 | 1.40 | 15000 | 0.83 | 1.16 |
| ② | 1103 – N40A | 380 | 1.52 | 23000 | 1.28 | 1.95 |
| ③ | 1108 – N40C | 250 | 1.00 | 18000 | 1.00 | 1.00 |
| ④ | 1100 – C40A | 2000 | 8.00 | 1000 | 0.06 | 0.48 |
| ⑤ | 1050 – B50B | 4500 | 18.00 | 400 | 0.02 | 0.36 |
| ⑥ | 1050 – P50B | 4300 | 17.20 | 450 | 0.03 | 0.52 |
| ⑦ | 1050 – P20B | 4600 | 18.40 | 350 | 0.02 | 0.37 |

Fig.33

| name | No. · grade | average pore size (μm) | organization | physical features | | |
|---|---|---|---|---|---|---|
| | | | | density | thickness (μm) | pore rate (%) |
| microtex | NTF − 5200 | 0.1 | membrane bay | 0.70 | 70 | 68 |
| | | 0.2 | membrane bay | 0.55 | 85 | 75 |
| | | 0.5 | membrane bay | 0.48 | 85 | 78 |
| | | 0.5 | membrane bay | 0.68 | 30 | 70 |
| | | 0.6 | membrane bay | 0.33 | 25 | 85 |
| | | 0.6 | membrane bay | 0.33 | 50 | 85 |
| | | 0.6 | membrane bay | 0.33 | 75 | 85 |
| | | 0.8 | membrane bay | 0.48 | 85 | 78 |
| | | 1.0 | membrane bay | 0.44 | 85 | 80 |
| | | 1.5 | membrane bay | 0.33 | 15 | 85 |
| | | 1.5 | membrane bay | 0.33 | 30 | 85 |
| | | 3.0 | membrane bay | 0.22 | 15 | 90 |
| | | 3.0 | membrane bay | 0.22 | 30 | 90 |
| | NTF − 5600 | 3.0 | PPnet one-side laminates | — | (coating thickness) 30 | — |
| | | 0.6 | PO non-woven fabric one-side laminates | — | (coating thickness) 25 | — |
| | | 0.6 | PO non-woven fabric both-sides laminates | — | (coating thickness) 25 | — |
| | | 3.0 | PO-non woven fabric one-side laminates | — | (coating thickness) 15 | — |
| | microF1 − 5530 | 3.0 | PET felt (500g/m²) one-side laminates | — | (coating thickness) 15 | — |
| | microtex − 2K | 0.6 | nylontaffeta one-side laminates | — | (coating thickness) 25 | — |
| | microtex − 3K | 0.6 | nylontaffeta/ nylontricot laminates | — | (coating thickness) 25 | — |

Fig.34

| name | No. · grade | average pore size (μm) | physical features | | | | widths (mm) MAX |
|---|---|---|---|---|---|---|---|
| | | | moisture permeability (g/m²·day) | air permeability (sec/100cc) | water resistance (kg/cm²) | water repellency (point) | |
| microtex | NTF – 5200 | 0.1 | 6,800 | 45 | 6.0 | >90 | 330 |
| | | 0.2 | 6,800 | 25 | 4.0 | >90 | 330 |
| | | 0.5 | 7,200 | 13 | 2.0 | >90 | 330 |
| | | 0.5 | 6,500 | 12 | 2.0 | >90 | 1,000 |
| | | 0.6 | 7,500 | 5 | 1.3 | >90 | 1,200 |
| | | 0.6 | 7,200 | 10 | 1.3 | >90 | 1,200 |
| | | 0.6 | 7,200 | 15 | 1.3 | >90 | 1,200 |
| | | 0.8 | 7,200 | 7 | 1.3 | >90 | 330 |
| | | 1.0 | 7,200 | 5 | 1.2 | >90 | 330 |
| | | 1.5 | 7,500 | <1 | 0.6 | >90 | 1,000 |
| | | 1.5 | 7,200 | 1.5 | 0.7 | >90 | 1,000 |
| | | 3.0 | 8,000 | <1 | 0.4 | >90 | 1,000 |
| | | 3.0 | 7,500 | <1 | 0.4 | >90 | 1,000 |
| | NTF – 5600 | 3.0 | 6,700 | <1 | (mm) >1,000 | – | 600 |
| | | 0.6 | 7,200 | 10 | (mm) >2,000 | – | 1,000 |
| | | 0.6 | 7,000 | 15 | (mm) >2,000 | – | 1,000 |
| | | 3.0 | 7,200 | <1 | (mm) >1,000 | – | 1,000 |
| | microF1 – 5530 | 3.0 | 7,000 | <1 | (mm) >1,000 | – | 1,150 |
| | microtex – 2K | 0.6 | 7,000 | 10 | (mm) >2,000 | >90 | 1,140 |
| | microtex – 3K | 0.6 | 6,800 | 15 | (mm) >2,000 | >90 | 1,120 |

Fig.35

| name | No. · grade · organization | thickness (μm) | pore rate (%) | moisture permeability (g/m²·day) | air permeability (sec./100cc) | water resistance (mm) | water repellency (point) | widths (mm) MAX |
|---|---|---|---|---|---|---|---|---|
| pression | (PE looseness film bay) | 50 | 45 | 5,500 | 200 | >1,000 | >90 | 1,000 |
| | (duplex goods of special looseness layer) | 50 | 45 | 5,500 | 200 | >1,000 | >90 | 1,000 |
| | K-1130 (duplex goods and the laminates goods of PET non-woven fabric) | (total) 250 | — | 5,000 | 200 | >1,000 | — | 1,000 |
| | K-1150 (duplex goods and the laminates goods of PET non-woven fabric) | (total) 350 | — | 5,000 | 200 | >1,000 | — | 1,000 |
| | H-1338 (duplex goods and the laminates goods of nylon non-woven fabric) | (total) 200 | — | — | 8,000 | >1,000 | — | 1,000 |
| | H-1344 (duplex goods and the laminates goods of nylon non-woven fabric) | (total) 300 | — | — | 4,500 | >1,000 | — | 1,000 |

Fig.36

| DATA NO. | BOX C. | BOX RH. | IN CH C. | IN CH RH. | OUTCH C. | OUTCH RH. | OUT C. | OUT RH. |
|---|---|---|---|---|---|---|---|---|
| 1 | 23.2 | 56.6 | 23.4 | 67.6 | 22.8 | 59.8 | 22.5 | 56.7 |
| 2 | 21.5 | 55.2 | 21.6 | 66 | 21.1 | 62.1 | 21.1 | 62.1 |
| 3 | 21.4 | 53.8 | 21.5 | 64.6 | 21 | 62.3 | 21.1 | 61.3 |
| 4 | 21.5 | 52.7 | 21.6 | 63.1 | 21.4 | 61.1 | 21.5 | 57.3 |
| 5 | 22 | 51.8 | 21.7 | 61.6 | 21.4 | 59.6 | 21.5 | 55.7 |
| 6 | 22.1 | 51.3 | 21.8 | 60.4 | 21.5 | 58.6 | 21.5 | 55.3 |
| 7 | 22 | 50.8 | 22.2 | 59.6 | 21.4 | 58 | 21.5 | 55.4 |
| 8 | 22 | 50.5 | 22.2 | 58.9 | 21.5 | 57.5 | 21.4 | 55.5 |
| 9 | 22 | 50.3 | 22.2 | 58.3 | 21.4 | 57.2 | 21.5 | 56.6 |
| 10 | 22 | 50.1 | 22.2 | 57.7 | 21.5 | 57.2 | 21.5 | 58.6 |
| 11 | 22 | 50 | 22.2 | 57.3 | 21.5 | 57.4 | 21.5 | 60.7 |
| 12 | 22 | 49.9 | 22.2 | 57.1 | 21.4 | 57.6 | 21.5 | 61.3 |
| 13 | 22.1 | 49.8 | 22.2 | 56.9 | 21.4 | 57.6 | 21.5 | 62 |
| 14 | 22.1 | 49.8 | 22.2 | 56.8 | 21.4 | 57.6 | 21.5 | 62.2 |
| 15 | 22.1 | 49.7 | 22.2 | 56.7 | 21.4 | 58.2 | 21.5 | 65 |
| 16 | 31.6 | 41.7 | 28 | 54 | 27.3 | 53.1 | 25.3 | 57.9 |
| 17 | 25.9 | 50.8 | 25.2 | 55.9 | 23.5 | 57.3 | 22.4 | 70.8 |
| 18 | 32.1 | 42.4 | 28.7 | 53.1 | 27.8 | 52.1 | 26.1 | 54.7 |
| 19 | 26.3 | 50.9 | 25.8 | 54.9 | 23.8 | 55.4 | 22.6 | 63.5 |
| 20 | 32.3 | 42.2 | 28.7 | 52.1 | 28.1 | 50.3 | 26.1 | 51.5 |
| 21 | 26.3 | 50.8 | 25.4 | 54.1 | 23.8 | 53.4 | 22.5 | 58.3 |
| 22 | 32.4 | 41.9 | 28.9 | 51.1 | 28.2 | 48.4 | 26.2 | 46.5 |
| 23 | 26.6 | 50.1 | 25.8 | 52.7 | 24.3 | 51.2 | 23 | 52.8 |
| 24 | 23.2 | 50.4 | 23.3 | 53.6 | 22.5 | 53.1 | 22.5 | 54.8 |
| 25 | 22.6 | 49.6 | 22.5 | 53.6 | 22.4 | 52.9 | 22 | 53.5 |
| 26 | 22.2 | 49.2 | 22.2 | 53.3 | 21.7 | 52.4 | 21.7 | 51.8 |
| 27 | 22.2 | 48.8 | 22.2 | 52.9 | 21.8 | 52 | 21.9 | 50.3 |
| 28 | 22 | 48.6 | 22.2 | 52.4 | 21.6 | 51.4 | 21.6 | 49.4 |
| 29 | 22 | 48.4 | 22.2 | 51.9 | 21.5 | 50.9 | 21.4 | 49.2 |
| 30 | 22 | 48.2 | 22.2 | 51.4 | 21.6 | 50.2 | 21.8 | 47.2 |
| aver. | 22 | 49.5 | 23.5 | 56.7 | 22.7 | 55.5 | 22.3 | 56.6 |

Fig.37

| NO DATA NO. | $\left(\dfrac{BOX\ C-}{INCH\ C}\right)$ | $\left(\dfrac{BOX\ R-}{INCH\ R}\right)$ | $\left(\dfrac{BOX\ C-}{OUTCH\ C}\right)$ | $\left(\dfrac{BOX\ R-}{OUTCR\ R}\right)$ | $\left(\dfrac{OUT\ C-}{BOX\ C}\right)$ | $\left(\dfrac{OUT\ R-}{BOX\ R}\right)$ | $\left(\dfrac{OUT\ C-}{INCH\ C}\right)$ | $\left(\dfrac{OUT\ R-}{INCH\ R}\right)$ | $\left(\dfrac{OUT\ C-}{OUTCH\ C}\right)$ | $\left(\dfrac{OUT\ R-}{OUTC\ R}\right)$ | $\left(\dfrac{OUTC\ C-}{INCH\ C}\right)$ | $\left(\dfrac{OUTC\ R-}{INCH\ R}\right)$ |
|---|---|---|---|---|---|---|---|---|---|---|---|---|
| 1  | -0.2 | -11   | 0.4 | -3.2  | -0.7 | 0.1  | -0.9 | -10.9 | -0.3 | -3.1 | -0.6 | -7.8 |
| 2  | -0.1 | -10.8 | 0.4 | -6.9  | -0.4 | 6.9  | -0.5 | -3.9  | 0    | 0    | -0.5 | -3.9 |
| 3  | -0.1 | -10.8 | 0.4 | -8.5  | -0.3 | 7.5  | -0.4 | -3.3  | 0.1  | -1   | -0.5 | -2.3 |
| 4  | -0.1 | -10.4 | 0.1 | -8.4  | 0    | 4.6  | -0.1 | 5.8   | 0.1  | -3.8 | -0.2 | -.2  |
| 5  | 0.3  | -9.8  | 0.6 | -7.8  | -0.5 | 3.9  | -0.2 |       | 0.1  | -3.9 | -0.3 | -.2  |
| 6  | 0.3  | -9.1  | 0.6 | -7.3  | -0.6 | 4    | -0.3 | -5.9  | 0    | -3.3 | -0.3 | -1.8 |
| 7  | -0.2 | -8.8  | 0.6 | -7.2  | -0.5 | 4.6  | -0.7 | -5.1  | -0.1 | -2.6 | -0.8 | -1.6 |
| 8  | -0.2 | -8.4  | 0.5 | -7    | -0.6 | 5    | -0.8 | -4.2  | 0.1  | -.2  | -0.7 | -1.4 |
| 9  | -0.2 | -8    | 0.6 | -6.9  | -0.5 | 6.3  | -0.7 | -3.4  | 0    | -0.6 | -0.8 | -1.1 |
| 10 | -0.2 | -7.6  | 0.5 | -7.1  | -0.5 | 8.5  | -0.7 | -1.7  | 0    | 1.4  | -0.7 | -0.5 |
| 11 | -0.2 | -7.3  | 0.5 | -7.4  | -0.5 | 10.7 | -0.7 | 0.9   | 0.1  | 3.3  | -0.8 | 0.1  |
| 12 | -0.2 | -7.2  | 0.6 | -7.7  | -0.5 | 11.4 | -0.7 | 3.4   | 0.1  | 3.7  | -0.8 | 0.5  |
| 13 | -0.1 | -7.1  | 0.7 | -7.8  | -0.6 | 12.2 | -0.7 | 4.2   | 0.1  | 4.4  | -0.8 | 0.7  |
| 14 | -0.1 | -7    | 0.7 | -8    | -0.6 | 12.4 | -0.7 | 5.1   | 0.1  | 4.4  | -0.8 | -1   |
| 15 | -0.1 | -7    | 0.7 | -8.5  | -0.6 | 15.3 | -0.7 | 5.4   | 0.1  | 6.8  | -0.8 | 1.5  |
| 16 | 3.6  | -12.3 | 4.3 | -11.4 | -0.6 | 16.2 | 2.7  | 8.3   | -.2  | 4.8  | 0.7  | -0.9 |
| 17 | 0.7  | -5.1  | 2.4 | -6.5  | -6.3 | 20   | -2.8 | 3.9   | -1.1 | 13.5 | 1.7  | 1.4  |
| 18 | 3.4  | -10.7 | 4.3 | -9.   | 3.5  | 12.3 | -2.6 | 14.9  | -1.7 | 2.6  | -0.9 | -1   |
| 19 | 0.5  | -4    | 2.5 | -4.5  | -.6  | 12.6 | -3.2 | 1.6   | -1.2 | 8.1  | -.2  | 0.5  |
| 20 | 3.6  | -9.9  | 4.2 | -8.1  | -3.7 | 9.3  | -2.6 | 8.6   | -.2  | 1.2  | -0.6 | -1.8 |
| 21 | 0.9  | -3.3  | 2.5 | -2.6  | -6.2 | 7.5  | -2.9 | -0.6  | -1.3 | 4.9  | -1.6 | -0.7 |
| 22 | 3.5  | -9.2  | 4.2 | -6.5  | -3.8 | 4.6  | -2.7 | 4.2   | -.2  | -1.9 | -0.7 | -2.7 |
| 23 | 0.8  | -2.6  | 2.3 | -1.1  | -6.2 | 2.7  | -2.8 | -4.6  | -1.3 | 1.6  | -1.5 | -1.5 |
| 24 | -0.1 | -3.2  | 0.7 | -2.7  | -3.6 | 4.4  | -0.8 | 0.1   | 0    | 1.7  | -0.8 | -0.5 |
| 25 | 0.1  | -4    | 0.2 | -3.3  | -0.7 | 33.9 | -0.5 | 1.2   | -0.4 | 0.6  | -0.1 | -0.7 |
| 26 | 0    | -4.1  | 0.5 | -3.2  | -0.6 | 2.6  | -0.5 | -0.1  | 0    | -0.6 | -0.5 | -0.9 |
| 27 | 0    | -4.1  | 0.4 | -3.2  | -0.5 | 1.5  | -0.3 | -1.5  | 0.1  | -1.7 | -0.4 | -0.9 |
| 28 | -0.2 | -3.8  | 0.4 | -2.8  | -0.3 | 0.8  | -0.6 | -2.6  | 0    | -.2  | -0.6 | -1   |
| 29 | -0.2 | -3.5  | 0.5 | -2.5  | -0.4 | 0.8  | -0.8 | -.3   | -0.1 | -1.7 | -0.7 | -1   |
| 30 | -0.2 | -3.2  | 0.4 | -.2   | -0.6 | -1   | -0.4 | -2.7  | 0.2  | -.3  | -0.6 | -1.2 |
| aver. | 0.5 | -7.1 | 1.3 | -6    | -0.2 | -4.2 | -1.2 | -4.2  | -0.4 | 1.1  | -0.8 | -1.1 |
|    |     |      |    |       | -1.7 | 7.1  |      | -0.1  |      |      |      |     |

Fig.38

| NO DATA NO. | BOX C. | BOX RH. 2 | IN CH C. | IN CH RH. | OUTCH C. | OUTCH RH. | OUT C. | OUT RH. |
|---|---|---|---|---|---|---|---|---|
| 31 | 22 | 48 | 22.2 | 51 | 21.6 | 49.6 | 21.8 | 46.3 |
| 32 | 22 | 47.9 | 22.2 | 50.5 | 21.5 | 48.8 | 21.7 | 44.8 |
| 33 | 22 | 47.8 | 22.2 | 49.9 | 21.4 | 48.2 | 21.6 | 44.1 |
| 34 | 22 | 47.6 | 22.1 | 49.4 | 21.3 | 47.4 | 21.4 | 43.1 |
| 35 | 21.5 | 47.5 | 22.1 | 48.9 | 21.3 | 46.6 | 21.3 | 41.7 |
| 36 | 21.5 | 47.1 | 21.6 | 48.4 | 21.3 | 45.8 | 21.2 | 40 |
| 37 | 21.5 | 47.1 | 21.6 | 47.9 | 21.3 | 45.2 | 21.2 | 38.8 |
| 38 | 21.4 | 47 | 21.5 | 47.5 | 21.4 | 44.5 | 21.3 | 42.6 |
| 39 | 21.4 | 46.9 | 21.6 | 47.3 | 21.4 | 45 | 21.3 | 42.6 |
| 40 | 30.8 | 39 | 27.4 | 44.9 | 27.1 | 39.7 | 25.1 | 29.9 |
| 41 | 25.6 | 47.8 | 24.4 | 45.6 | 23.4 | 40.8 | 22.1 | 31.9 |
| 42 | 31.7 | 39.1 | 28 | 43 | 27.5 | 36.3 | 25.7 | 25.2 |
| 43 | 25.6 | 47.6 | 24.6 | 44.1 | 23.3 | 36.5 | 22.1 | 25 |
| 44 | 31.7 | 38.7 | 28.5 | 40.2 | 27.6 | 33.2 | 25.5 | 11.7 |
| 45 | 25.6 | 47.2 | 24.8 | 42 | 23.2 | 34.2 | 21.9 | 10 |
| 46 | 32 | 38.2 | 28.4 | 38.6 | 27.8 | 32.1 | 25.6 | 11.7 |
| 47 | 25.8 | 46.6 | 25 | 40.5 | 23.5 | 33.4 | 22.1 | 22.5 |
| 48 | 22.5 | 46.2 | 22.4 | 40.2 | 21.6 | 34.5 | 21.6 | 28 |
| 49 | 22 | 45.3 | 22 | 40 | 21.4 | 34.8 | 21.3 | 29.2 |
| 50 | 22 | 44.5 | 22 | 39.9 | 21.2 | 35.1 | 21.1 | 30.2 |
| 51 | 22 | 44.2 | 22 | 40 | 21.2 | 35.8 | 21.2 | 32.7 |
| 52 | 21.5 | 43.9 | 22 | 40.3 | 21.1 | 36.7 | 21.2 | 34.2 |
| 53 | 21.5 | 43.8 | 22 | 40.4 | 21.2 | 37.5 | 21.2 | 35.5 |
| 54 | 21.5 | 43.6 | 21.5 | 40.4 | 21.2 | 37.2 | 21.2 | 33.3 |
| 55 | 21.3 | 43.4 | 21.5 | 40.3 | 21.2 | 36.5 | 21.2 | 32 |
| 56 | 21.3 | 43.2 | 21.4 | 39.8 | 21.2 | 35.8 | 21.2 | 31 |
| 57 | 21.3 | 43 | 21.5 | 39.6 | 21.1 | 35.4 | 21.2 | 29.4 |
| 58 | 21.3 | 42.8 | 21.5 | 39.8 | 21.1 | 35.2 | 21.1 | 29.6 |
| 59 | 21.5 | 42.6 | 21.5 | 39.1 | 21.2 | 34.9 | 21.1 | 29.2 |
| 60 | 21.4 | 42.6 | 21.5 | 38.8 | 21.2 | 34.8 | 21.2 | 29.6 |
| aver. | 23.5 | 44.7 | 23 | 43.3 | 22.4 | 39.1 | 22 | 31.7 |

Fig.39

| NO DATA NO. | $\begin{pmatrix}\text{BOX C}-\\\text{INCH C}\end{pmatrix}$ | $\begin{pmatrix}\text{BOX R}-\\\text{INCH R}\end{pmatrix}$ | $\begin{pmatrix}\text{BOX C}-\\\text{OUTC C}\end{pmatrix}$ | $\begin{pmatrix}\text{BOX R}-\\\text{OUTC R}\end{pmatrix}$ | $\begin{pmatrix}\text{OUT C}-\\\text{BOX C}\end{pmatrix}$ | $\begin{pmatrix}\text{OUT R}-\\\text{BOX R}\end{pmatrix}$ | $\begin{pmatrix}\text{OUT C}-\\\text{INCH C}\end{pmatrix}$ | $\begin{pmatrix}\text{OUT R}-\\\text{INCH R}\end{pmatrix}$ | $\begin{pmatrix}\text{OUT C}-\\\text{OUTC C}\end{pmatrix}$ | $\begin{pmatrix}\text{OUT R}-\\\text{OUTC R}\end{pmatrix}$ | $\begin{pmatrix}\text{OUTC C}-\\\text{INCH C}\end{pmatrix}$ | $\begin{pmatrix}\text{OUTC R}-\\\text{INCH R}\end{pmatrix}$ |
|---|---|---|---|---|---|---|---|---|---|---|---|---|
| 31 | -0.2 | -3 | 0.4 | -1.6 | -0.2 | -1.7 | -0.4 | -4.7 | 0.2 | -3.3 | -0.6 | -1.4 |
| 32 | -0.2 | -2.6 | 0.5 | -0.9 | -0.3 | -3.1 | -0.5 | -5.7 | 0.2 | -4 | -0.7 | -1.7 |
| 33 | -0.2 | -2.1 | 0.6 | -0.4 | -0.4 | -3.7 | -0.6 | -5.8 | 0.2 | -4.1 | -0.8 | -1.7 |
| 34 | -0.1 | -1.8 | 0.7 | 0.2 | -0.6 | -4.5 | -0.7 | -6.3 | 0.1 | -4.3 | -0.8 | -2 |
| 35 | -0.6 | -1.4 | 0.2 | 0.9 | -0.2 | -5.8 | -0.8 | -7.2 | 0 | -4.9 | -0.8 | -2.3 |
| 36 | -0.1 | -1.1 | 0.2 | 1.5 | -0.3 | -7.3 | -0.1 | -8.4 | -0.1 | -5.8 | -0.3 | -2.6 |
| 37 | -0.1 | -0.8 | 0.2 | 1.9 | -0.3 | -8.3 | -0.1 | -9.1 | -0.1 | -6.4 | -0.3 | -2.7 |
| 38 | -0.1 | -0.5 | 0 | 2.5 | -0.2 | -9.2 | -0.3 | -9.7 | -0.2 | -6.7 | -0.1 | -3 |
| 39 | -0.2 | -0.4 | 0 | 1.9 | -0.1 | -4.3 | -0.3 | -4.7 | -0.1 | -2.4 | -0.2 | -2.3 |
| 40 | 3.4 | -5.9 | 3.7 | -0.7 | -5.7 | -9.1 | -2.3 | -15 | -.2 | -9.8 | -0.3 | -5.2 |
| 41 | 1.2 | 2.2 | 2.2 | 7 | -3.5 | 15.9 | -2.3 | -13.7 | -1.3 | -8.9 | -1 | -4.8 |
| 42 | 3.7 | -3.9 | 4.2 | 2.8 | -6 | -13.9 | -2.3 | -17.8 | -1.8 | -11.1 | -0.5 | -6.7 |
| 43 | 1 | 3.5 | 2.3 | 11.1 | -3.5 | -22.6 | -2.5 | -19.1 | -1.2 | -11.5 | -1.3 | -7.6 |
| 44 | 3.2 | -1.5 | 4.1 | 5.5 | -6.2 | -27 | -3 | -28.5 | -2.1 | -21.5 | -0.9 | -7 |
| 45 | 0.8 | 5.2 | 2.4 | 13 | -3.7 | -37.2 | -2.9 | -32 | -1.3 | -21.2 | -1.6 | -7.8 |
| 46 | 3.6 | -0.4 | 4.2 | 6.1 | -6.4 | -26.5 | -2.8 | -26.9 | -2.2 | -20.4 | -0.6 | -6.5 |
| 47 | 0.8 | 6.1 | 2.3 | 13.2 | -3.7 | -24.1 | -2.9 | -18 | -1.4 | -10.9 | -1.5 | -7.1 |
| 48 | 0.1 | 6 | 0.9 | 11.7 | -0.9 | -18.2 | -0.8 | -12.2 | 0 | -6.5 | -0.8 | -5.7 |
| 49 | 0 | 5.3 | 0.6 | 10.5 | -0.7 | -16.1 | -0.7 | -10.8 | -0.1 | -5.6 | -0.6 | -5.2 |
| 50 | 0 | 4.6 | 0.8 | 9.4 | -0.9 | -14.3 | -0.9 | -9.7 | -0.1 | -4.9 | -0. | -4.8 |
| 51 | 0 | 4.2 | 0.8 | 8.4 | -0.8 | -11.5 | -0.9 | -7.3 | 0 | -3.1 | -0.8 | -4.2 |
| 52 | -0.5 | 3.6 | 0.4 | 7.2 | -0.3 | -9.7 | -0.8 | -6.1 | 0.1 | -2.5 | -0.9 | -3.6 |
| 53 | -0.5 | 3.4 | 0.3 | 6.3 | -0.3 | -8.3 | -0.8 | -4.9 | 0 | -2 | -0.8 | -2.9 |
| 54 | 0 | 3.2 | 0.3 | 6.4 | -0.3 | -10.3 | -0.8 | -7.1 | 0 | -3.9 | -0.3 | -3.2 |
| 55 | -0.2 | 3.1 | 0.1 | 6.9 | -0.1 | -11.1 | -0.3 | -8.3 | 0 | -4.5 | -0.3 | -3.8 |
| 56 | -0.1 | 3.4 | 0.1 | 7.4 | -0.1 | -12.2 | -0.2 | -8.8 | 0 | -4.8 | -0.2 | -4 |
| 57 | -0.2 | 3.4 | 0.4 | 7.6 | -0.4 | -13.6 | -0.3 | -10.2 | 0 | -6 | -0.3 | -4.2 |
| 58 | 0 | 3.5 | 0.3 | 7.6 | -0.1 | -13.2 | -0.4 | -9.7 | -0.1 | -5.6 | -0.4 | -4.1 |
| 59 | 0 | 3.5 | 0.2 | 7.7 | -0.4 | -13.4 | -0.4 | -9.9 | 0 | -5.7 | -0.3 | -4.2 |
| 60 | -0.1 | 3.8 | 0.2 | 7.8 | -0.2 | -13 | -0.3 | -9.2 | 0 | -5.2 | -0.3 | -4 |
| ave. | 0.5 | 1.4 | 1.1 | 5.6 | -1.6 | -13 | -1.1 | -11.6 | -0.4 | -7.4 | -0.6 | -4.2 |

Fig.40

| NO DATA NO. | BOX C. | BOX RH. | IN CH C. | IN CH RH. | OUT CH C. | OUT CH RH. | OUT C. | OUT RH. |
|---|---|---|---|---|---|---|---|---|
| 1 | 24.7 | 36.8 | 24.5 | OY48.3 | 23.3 | 42.5 | 22.4 | 26.9 |
| 2 | 23.2 | 37 | 22.1 | 50.8 | 21.7 | 44 | 22.1 | 27.6 |
| 3 | 31.6 | 33.8 | 26.2 | 51.1 | 24.7 | 42.5 | 24.3 | 22.8 |
| 4 | 22.9 | 39.6 | 22.3 | 52.4 | 22.3 | 41.9 | 22 | 26.1 |
| 5 | 21.2 | 39.3 | 21.4 | 52.2 | 21.3 | 41.4 | 21.5 | 26.7 |
| 6 | 21.1 | 39 | 21.3 | 51.2 | 21.3 | 41.4 | 21.5 | 28.4 |
| 7 | 20.9 | 39 | 21.1 | 50.4 | 21.2 | 41 | 21.4 | 28.4 |
| 8 | 20.9 | 39 | 21.1 | 49.2 | 21.3 | 39.4 | 21.1 | 27 |
| 10 | 20.9 | 39 | 21.1 | 48.3 | 21.2 | 38.2 | 21.2 | 26.5 |
| 12 | 20.9 | 39.1 | 21.1 | 47.7 | 20.8 | 38.7 | 21.1 | 31 |
| 13 | 20.5 | 39.1 | 21.1 | 47.3 | 20.7 | 38.9 | 21.1 | 31.9 |
| 14 | 20.4 | 39.3 | 20.7 | 46.9 | 20.6 | 38.5 | 20.7 | 31.7 |
| 15 | 20.2 | 39.3 | 20.5 | 46.6 | 20.3 | 38.3 | 20.6 | 31.4 |
| 16 | 20 | 39.3 | 20.2 | 46.3 | 20.3 | 37.9 | 20.2 | 31.6 |
| 17 | 20 | 39.3 | 20.2 | 46 | 20 | 37.8 | 20.2 | 31.7 |
| 18 | 20 | 39.3 | 20.2 | 45.6 | 19.9 | 38 | 20.2 | 32 |
| 19 | 19.5 | 39.5 | 20.2 | 45.3 | 19.7 | 38.1 | 20.2 | 32.4 |
| 20 | 19.4 | 39.5 | 19.7 | 45.2 | 19.6 | 37.7 | 20.2 | 31.8 |
| 21 | 19.5 | 39.5 | 20.2 | 44.8 | 19.7 | 37.9 | 20.2 | 32.4 |
| 22 | 21.1 | 38.8 | 20.2 | 44.5 | 20.3 | 36.3 | 20.4 | 27.6 |
| 23 | 30.3 | 36.1 | 24.9 | 43.9 | 23.4 | 33.8 | 22.3 | 11.6 |
| 24 | 23.1 | 40.3 | 22 | 43.4 | 21.3 | 33.2 | 21 | 14 |
| aver. | 18.6 | 32.7 | 18.2 | 40.3 | 17.9 | 33 | 17.9 | 23.5 |

Fig.41

| NO.DATA NO. | BOX C-INCH C | BOX R-INCH R | BOX C-OUTC C | BOX R-OUTC C | OUT C-BOX C | OUT R-BOX R | OUT C-INCH C | OUT R-INCH R | OUT C-OUTC C | OUT R-OUTC R | INCH C | INCH R |
|---|---|---|---|---|---|---|---|---|---|---|---|---|
| 1 | 0.2 | −11.5 | 1.4 | −5.7 | −2.3 | −9.9 | −2.1 | −21.4 | −0.9 | −15.6 | −1.2 | −5.8 |
| 2 | 1.1 | −13.8 | 1.5 | −7 | −1.1 | −9.4 | 0 | −23.2 | 0.4 | −16.4 | −0.4 | −6.8 |
| 3 | 5.4 | −17.3 | 6.9 | −8.7 | −7.3 | −11 | −1.9 | −28.3 | −0.4 | −19.7 | −1.5 | −8.6 |
| 4 | 0.6 | −12.8 | 0.6 | −2.3 | −0.9 | −13.5 | −0.3 | −26.3 | −0.3 | −15.8 | 0 | −10.5 |
| 5 | −0.2 | −12.9 | −0.1 | −2.1 | 0.3 | −12.6 | 0.1 | −25.5 | 0.2 | −14.7 | −0.1 | −10.8 |
| 6 | −0.2 | −12.2 | −0.2 | −2.4 | 0.4 | −10.6 | 0.2 | −22.8 | 0.2 | −13 | 0 | −9.8 |
| 7 | −0.2 | −11.4 | −0.3 | −2 | 0.5 | −10.6 | 0.3 | −22 | 0.2 | −12.6 | 0.1 | −9.4 |
| 8 | −0.2 | −10.2 | −0.4 | −0.4 | 0.2 | −12 | 0 | −22.2 | −0.2 | −12.4 | 0.2 | −9.8 |
| 9 | −0.2 | −9.3 | −0.3 | 0.8 | 0.3 | −12.5 | 0.1 | −21.8 | 0 | −11.7 | 0.1 | −10.1 |
| 10 | −0.2 | −8.6 | 0.1 | 0.4 | 0.2 | −8.1 | 0 | −16.7 | 0.3 | −7.7 | −0.3 | −9 |
| 11 | −0.6 | −8.2 | −0.2 | 0.4 | 0.6 | −7.2 | 0 | −15.4 | 0.4 | −7 | −0.4 | −8.4 |
| 12 | −0.3 | −7.6 | −0.2 | 0.2 | 0.3 | −7.6 | 0 | 15.2 | 0.1 | −6.8 | −0.1 | −8.4 |
| 13 | −0.3 | −7.3 | −0.1 | 0.8 | 0.4 | −4.9 | 0.1 | −15.2 | 0.3 | −6.9 | −0.2 | −8.3 |
| 14 | −0.2 | −7 | −0.3 | 1 | 0.2 | −7.7 | 0 | −14.7 | −0.1 | −6.3 | 0.1 | −8.4 |
| 15 | −0.2 | −6.7 | −0.3 | 1.4 | 0.2 | −7.6 | 0 | −14.3 | −0.1 | −6.1 | 0.1 | −8.2 |
| 16 | −0.2 | −6.3 | 0.1 | 1.5 | 0.2 | −7.3 | 0 | −13.6 | 0.3 | −6 | −0.3 | −7.6 |
| 17 | −0.7 | −5.8 | −0.2 | 1.3 | 0.7 | −7.1 | 0.5 | −12.9 | 0.5 | −5.7 | −0.5 | −7.2 |
| 18 | −0.3 | −5.7 | −0.2 | 1.4 | 0.8 | −7.7 | 0 | −13.4 | 0.6 | −5.9 | −0.1 | −7.5 |
| 19 | −0.7 | −5.3 | −0.2 | 1.8 | 0.7 | −7.1 | 0.2 | −12.4 | 0.5 | −5.5 | −0.5 | −6.9 |
| 20 | 0.9 | −5.7 | 0.8 | 1.6 | −0.7 | −11.2 | 0.2 | −16.9 | 0.1 | −8.7 | 0.1 | −8.2 |
| 21 | 5.4 | −7.8 | 6.9 | 2.5 | −8 | −24.5 | −2.6 | −32.3 | −1.1 | −22.2 | −1.5 | −10.1 |
| 22 | 1.1 | −3.1 | 1.8 | 7.1 | −2.1 | −26.3 | −1 | −29.4 | −0.3 | −19.2 | 0.7 | −10.2 |
| 23 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 |
| 26 | 0 | 0 | 0 | 0 | 0 | 0 | 0 | 0 | 0 | 0 | 0 | 0 |
| 27 | 0 | 0 | 0 | 0 | 0 | 0 | 0 | 0 | 0 | 0 | 0 | 0 |
| 28 | 0 | 0 | 0 | 0 | 0 | 0 | 0 | 0 | 0 | 0 | 0 | 0 |
| 29 | 0 | 0 | 0 | 0 | 0 | 0 | 0 | 0 | 0 | 0 | 0 | 0 |
| 30 | 0 | 0 | 0 | 0 | 0 | 0 | 0 | 0 | 0 | 0 | 0 | 0 |
| aver. | 0.4 | −7.6 | 0.7 | −0.3 | −0.6 | −9.2 | −0.2 | −16.8 | 0 | −9.5 | −0.3 | −7.3 |

DEHUMIDIFYING DEVICE

FIELD OF THE INVENTION

The present invention relates to a dehumidifying device suitable for dehumidification of a moisture-proof/drip-proof type of box, especially of outdoor equipment.

BACKGROUND OF THE INVENTION

In a conventional type of box aimed at moisture proof or drip proof properties, for instance, an outdoor box for accommodating an electric panel therein or the like, an opening/closing section thereof is covered with a waterproof seal or at the portion that the cable goes inside of the box or from the box to the ouside is protected by a waterproof gland packing or the like. In the structure described above, outside air is let in according to breathing phenomenon due to a difference in temperature between inside and outside of the box, which causes dew condensation to occur in the box, so that the present inventor proposed a dehumidifying device in which a vent path is provided in an air tight box and partitioned into small chambers which were shielded thereby into a plurality of stages (Refer to Japanese Patent Laid-Open Publication No. 322060/1993).

However, in this dehumidifying device, a dehumidifying effect becomes unsteady, when a density in water-vapor gas inside thereof becomes once high, according to charged particles such as water-vapor gas entering the internal section thereof or according to more charged particles electrified by the side of the frame such as water-vapor gas inside the frame, or humidity in the side to be dehumidified of the box side is stabilized disadvantageously at a comparatively high level.

In many cases, the water-vapor gas or charged particles in the air contain mainly electrolytic particles like those contained in sea water, so that dusts together with these electrolytic particles cause a moisture-permeable waterproof membrane to be clogged extremely quickly when they enter each chamber in accordance with breathing phenomena of the box, which makes weatherproofing easily reduced. Also in the conventional type of apparatus, minimization thereof can not easily be realized.

The present invention was made for solving the problems described above, and it is an object of the present invention to provide a dehumidifying device in which humidity at a low level can be achieved in the side to be dehumidified (box side) and the stabilized and continued effect of the low humidity therein can also be achieved by water-vapor gas electrified by an electric apparatus accommodated in the box side, water-vapor gas existing in the outside air, or by any other floating dusts in the air which are easily electrified, or the like without the dehumidifying effect which is badly affected.

SUMMARY OF THE INVENTION

A dehumidifying device according to claim 1 of the present invention comprises a tubular body provided in the portion section of a box and forming a vent path for air communication between inside and outside of the box; and a vent body formed by providing an electrically grounded conductive porous body adjacent to at least one side of a waterproof membrane having moisture-permeable micro-throughholes to make a pair therewith and arranging at least two pairs thereof at a space from each other inside the tubular body to shield an inside space of the vent path into at least one chamber in the direction from the box to the outside.

Herein, the conductive porous body indicates a porous body with electrically low resistance. For instance, such indicates a metallic mesh.

With this feature, the dehumidifying device according to claim 1 can promote a dehumidifying effect by preventing a dehumidifying function from reduction due to strongly electrified gas which caused a dehumidifying effect not to be achieved in a conventional type of dehumidifying device, which was mentioned above, namely in the apparatus partitioned into small chambers each shielded by moisture-permeable waterproof membranes into a plurality of stages therein, because electrification in air, surroundings, or of the gas in the box side is dielectrified by the vent path comprising an electrically grounded conductive porous body provided adjacent to at least one side of a waterproof membrane having moisture-permeable micro-throughholes to make a pair therewith, or by selecting any gradient in humidity, obtained by making use of the dielectric effect, between the small chambers as required according to the environment.

A dehumidifying device according to claim 2 of the present invention comprises a tubular body provided in a wall section of a box and forming a vent path for air communication between inside and outside of the box; and a vent body formed by providing conductive porous bodies successively provided and electrically grounded each adjacent to at least one side of each of waterproof membranes having moisture-permeable micro-throughholes to make a pair therewith and arranging at least two pairs thereof at a space from each other inside the tubular body to shield an inside space of the vent path into at least one chamber in the direction from the box to the outside.

With this feature, the dehumidifying device according to claim 2 can promote a dehumidifying effect by preventing a dehumidifying function from reduction due to more strongly electrified gas as compared to that in a case where the conductive porous body is partially grounded by which a dehumidifying effect could not be achieved in a conventional type of dehumidifying device, namely in the apparatus partitioned into small chambers each shielded by moisture-permeable waterproof membranes into a plurality of stages therein, because electrification in air, surroundings, or of the gas in the box side acts as a dielectric by the bent path formed by providing conductive porous bodies successively provided and electrically grounded each adjacent to at least one side of each of waterproof membranes having moisture-permeable micro-throughholes to make a pair therewith, and by making weather proofing higher, increasing a protecting capability against spoiling of the apparatus or by selecting any gradient in humidity, obtained by making use of the dielectric effect, between the small chambers as required according to the environment.

A dehumidifying device according to claim 3 of the present invention comprises a tubular body provided in a wall section of a box and forming a vent path for air communication between inside and outside of the box; and a tubular-shaped vent body with a bottom formed by providing an electrically grounded conductive porous body adjacent to at least one side of a waterproof membrane having moisture-permeable micro-throughholes to make a pair therewith and forming a portion of the wall of the tube therewith, and the vent path is shielded in the direction from inside of the box to the outside by providing the tubular-shaped vent body with a bottom inside of the tubular body.

With this feature, the dehumidifying device according to claim 3 can promote a dehumidifying effect by preventing a dehumidifying function from reduction due to strongly electrified gas which caused a dehumidifying effect not to be achieved in the conventional type of dehumidifying device, namely in the device partitioned into small chambers each shielded by moisture-permeable waterproof membranes into a plurality of stages therein, because electrification in air, surroundings, or of the gas in the box side acts as a dielectric along the vent path comprising an electrically grounded conductive porous body provided adjacent to at least one side of a waterproof membrane having moisture-permeable micro-throughholes to make a pair therewith and suitable for a larger type of airtight box because of a higher discharging rate which can dehumidify more than that in the dehumidifying device according to claim 1, or by selecting any gradient in humidity, obtained by making use of the dielectric effect, between the small chambers as required according to the environment.

A dehumidifying device according to claim 4 of the present invention comprises a tubular body provided in a wall section of a box and forming a vent path for air communication between inside and outside of the box; and a tubular-shaped vent body with a bottom formed by providing conductive porous bodies successively provided and electrically grounded each adjacent to at least one side of each of waterproof membranes having moisture-permeable micro-throughholes to make a pair therewith and forming a portion of the wall of the tube therewith, and the vent path is shielded in the direction from inside of the box to the outside by providing the tubular-shaped vent body with a bottom inside of the tubular body.

With this feature, the dehumidifying device according to claim 4 can promote a dehumidifying effect by preventing a dehumidifying function from reduction due to more strongly electrified gas as compared to that in a case where the conductive porous body is partially grounded by which a dehumidifying effect could be achieved than a conventional type of dehumidifying device which in mentioned above that are all connect to earth, namely in the apparatus only partitioned into small chambers each shielded by moisture-permeable waterproof membranes into a plurality of stages therein, because electrification in air, surroundings, or of the gas in the box side acts as dielectric by the vent path comprising conductive porous bodies successively provided and electrically grounded each provided adjacent to at least one side of each of waterproof membranes having moisture-permeable micro-throughholes to make a pair therewith and suitable for a larger type of airtight box according to the environment because of a higher discharging rate which can dehumidify more than that in the dehumidifying device according to claim 2, and by making weather proofing higher, increasing a protecting capability against spoiling of the box or by selecting any gradient in humidity, obtained by making use of the dielectric effect, between the small chambers as required according to the environment.

A dehumidifying device according to claim 5 according to the present invention comprises a tubular body provided in a wall section of a box and forming a vent path for air communication between inside and outside of the box; and a vent body formed by providing an electrically grounded conductive porous body adjacent to at least one side of a waterproof membrane having moisture-permeable micro-throughholes and arranging the membranes at a space from each other inside the tubular body to shield an inside space of the vent path into a plurality of small chambers.

With this feature, the dehumidifying device according to claim 5 can promote a dehumidifying effect by preventing a dehumidifying function from reduction due to more strongly electrified gas as compared to that in a case where the conductive porous body is partially grounded by which a dehumidifying effect could not be achieved in the conventional type of dehumidifying device, namely in the device only partitioned into small chambers each shielded by moisture-permeable waterproof membranes into a plurality of stages therein, because electrification in air, surroundings, or of the gas in the box side acts as a dielectric by the vent path comprising conductive porous bodies successively provided and electrically grounded each provided adjacent to at least one side of each of waterproof membranes having moisture-permeable micro-throughholes to make a pair therewith and suitable for a larger type of airtight box because of a higher discharging rate which can dehumidify more than that in the dehumidifying device according to claim 2, and by making weather proofing higher, increasing a protecting capability against spoiling of the apparatus or by selecting any gradient in humidity, obtained by making use of the dielectric effect, between the small chambers as required according to the environment.

A dehumidifying device according to claim 6 according to the present invention comprises a tubular body provided in a wall section of a box and forming a vent path for air communication between inside and outside of the box; and a vent body formed by providing conductive porous bodies successively provided and electrically grounded each adjacent to at least one side of each of waterproof membranes having moisture-permeable micro-throughholes and arranging the membranes at a space from each other inside the tubular body to shield an inside space of the vent path into a plurality of small chambers.

With this feature, the dehumidifying device according to claim 6 can promote a dehumidifying effect by preventing a dehumidifying function from reduction due to more strongly electrified gas as compared to that in a case where the conductive porous body is partially grounded by which a dehumidifying effect could not be achieved in the conventional type of dehumidifying device, namely in the device only partitioned into small chambers each shielded by moisture-permeable waterproof membranes into a plurality of stages therein, because electrification in air, surroundings, or of the gas in the box side acts as a dielectric in the vent path comprising conductive porous bodies successively provided and electrically grounded each provided adjacent to at least one side of each of waterproof membranes having moisture-permeable micro-throughholes to make a pair therewith and suitable for a larger type of airtight box because of a higher discharging rate which can dehumidify more than that in the dehumidifying device according to claim 2, and by making weather proofing higher, increasing a protecting capability against spoiling of the apparatus or by selecting any gradient in humidity, obtained by making use of the dielectric effect, between the small chambers as required according to the environment.

In a dehumidifying device according to claim 7 according to the present invention, the electrically grounded conductive porous body in the vent path used in earlier described dehumidifying devices has a wave-front shape or a concentric circular shape and is provided in a position with consideration of a convective phenomenon in each chamber (small chamber).

With this feature, the dehumidifying device according to claim 7 can improve a dehumidifying effect as well as suppress a sucking speed of gas in the side of outside air at the time of sucking gas by selecting any shape, with which the conductive porous body can uppermost be effected, among a combination of conductive porous bodies with a wave-front shape and a concentric circular shape or a combination of the conductive porous bodies with the same shape each required for designing a shape so that the conductive porous body exists in a path in the discharging air side as the most appropriate one to avoid the fluctuation because a conductive porous body with a simple concentric circular shape may generate an unstable element, because the electrically grounded conductive porous body in the vent path used in the dehumidifying device has a wave front shape or a concentric circular shape provided in a position decided in consideration of convection in each chamber, and the electrically conductive porous bodies are placed in a position decided by taking into consideration a difference between temperature in the side to be dehumidified and that in the side of outside air in accordance with vibration of flux due to inconsistency of convective gas in density generated by convection in each of small chambers, so that, even in one sheet of conductive porous body, there are places with a large flow and a small flow which fluctuate according to a velocity of flow namely flow velocity, a flux of the flow namely a flow, or to gas density in outside air.

A dehumidifying device according to claim 8 according to the present invention comprises a tubular body provided in a wall section of a box and forming a vent path for air communication between inside and outside of the box; and a vent body formed by providing a weak conductive porous body comprising a porous electric resistor with high electric resistance adjacent to at least one side of a waterproof membrane having moisture-permeable micro-throughholes to make a pair therewith and arranging the waterproof membrane and conductive porous body as a pair constituting the vent path at a space from each other inside the tubular body to shield an inside space of the tubular body.

Herein, the weak conductive porous body indicates a porous body with electrically high resistance and indicates a mesh made from, for instance, 4-ethylene fluoride, polyethylene, vinyl chloride, nylon, and polyester or the like, each of which has a high insulating capability.

A non-conductive porous body is also used in the present invention, but both are used in the same meaning.

With this feature, the dehumidifying device according to claim 8 can also adjust a drying speed at a constant level by adjusting a gradient in an electrostatic potential adjacent to a moisture-permeable waterproof membrane as an interface between chambers or adjusting the density in water vapor therein according to a use of gradient in potential in an electric resistor or without connecting a discrete electric resistance to the conductive porous body.

A dehumidifying device according to claim 9 of the present invention comprises a tubular body provided in a wall section of a box and forming a vent path for air communication between inside and outside of the box; and at least double tubular-shaped vent bodies each with a bottom formed by providing a weak conductive porous body comprising a porous electric resistor with high electric resistance adjacent to at least one side of a waterproof membrane having moisture-permeable micro-throughholes to make a pair therewith and forming a portion of the tubular wall thereby constituting the vent path, and an inside space of the vent path is shielded into a plurality of stages in the direction from inside to outside of the box by providing the tubular-shaped vent bodies each with a bottom inside the tubular body.

With this feature, the dehumidifying device according to claim 9 can adjust a drying speed without adding any discrete electric resistor to a grounded circuit.

In a dehumidifying device the vent path comprises a Peltier's thermoelectronic element which directs its heating section toward the box side and also directs its cooling section toward the side of outside air with the waterproof membrane therebetween.

With this feature, the dehumidifying device according to claim 10 can promote a dehumidifying effect together with a gradient in temperature between chambers generated by artificially generating a gradient in temperature in an area with the conductive porous body and a moisture-permeable waterproof membrane provided therein, which results in generation of an electrostatic gradient on a surface of a porous sheet made from a substance with a high insulating capability such as 4-ethylene fluoride or polyethylene or the like, so that a gradient in potential for promoting a dehumidifying effect acts continuously yet weakly between chambers or on the same membrane and adjacent to the conductive porous body, and making use of fluctuations in a generating rate of electric power in accordance with fluctuations in an irradiating amount of light around the apparatus.

In a dehumidifying device according to claim 11, includes at least three types of moisture-permeable waterproof membranes constituting the vent path of the dehumidifying device comprises moisture-permeable membranes each of which can be waterproofed and is set so that moisture permeability thereof becomes higher along the direction from the box side to the side of outside air, and is also set so that air permeability thereof becomes lower along the direction from the box side to the side of outside air.

With this feature, the dehumidifying device according to claim 11 can promote a dehumidifying effect together with a gradient in temperature between chambers generated by artificially generating a gradient in temperature in an area with the conductive porous body and a moisture-permeable waterproof membrane provided therein, which results in generation of an electrostatic gradient on a surface of a porous sheet made from a substance with a high insulating capability such as 4-ethylene fluoride or polyethylene or the like, so that a gradient in potential for promoting a dehumidifying effect acts continuously yet weak between chambers or on the same membrane and adjacent to the conductive porous body, and making use of fluctuations in a generating rate of electric power in accordance with the change in an irradiating amount of sunlight around the apparatus.

In a dehumidifying device according to claim 12 comprises a frame forming a vent path for air communication between inside and outside of the box with a volume of the vent path changeably formed therein; a waterproof membrane having moisture-permeable micro-throughholes fixed to the frame with hermeticity therein; and a means extending and shrinking according to such an external environment that the frame is moved.

With this feature, the dehumidifying device according to claim 12 can relieve phenomena such as a back-flow phenomenon and a reverse gradient in temperature and maintain dehumidification in the box side in a stabler state by changing a volume of a chamber according to external environments such as temperature or atmospheric pressure.

BRIEF DESCRIPTION OF THE DRAWINGS

FIG. 32 is a table showing physical features in moisture-permeable waterproof membranes;

FIG. 33 is a table showing physical features in membranes;

FIG. 34 is a table showing the physical features continued from FIG. 33;

FIG. 35 is a table showing physical features in membranes;

FIG. 36 is a table showing a result of measurement;

FIG. 37 is a table showing the result of measurement continued from FIG. 36;

FIG. 38 is a table showing a result of measurement;

FIG. 39 is a table showing the result of measurement continued from FIG. 38;

FIG. 40 is a table showing a result of measurement; and

FIG. 41 is a table showing the result of measurement continued from FIG. 40.

DETAILED DESCRIPTION

Detailed description is made for the present invention with reference to the related drawings.

At first, features of metallic grounding meshes (grounded conductive porous body) are provided as follows.

Figure 1A:
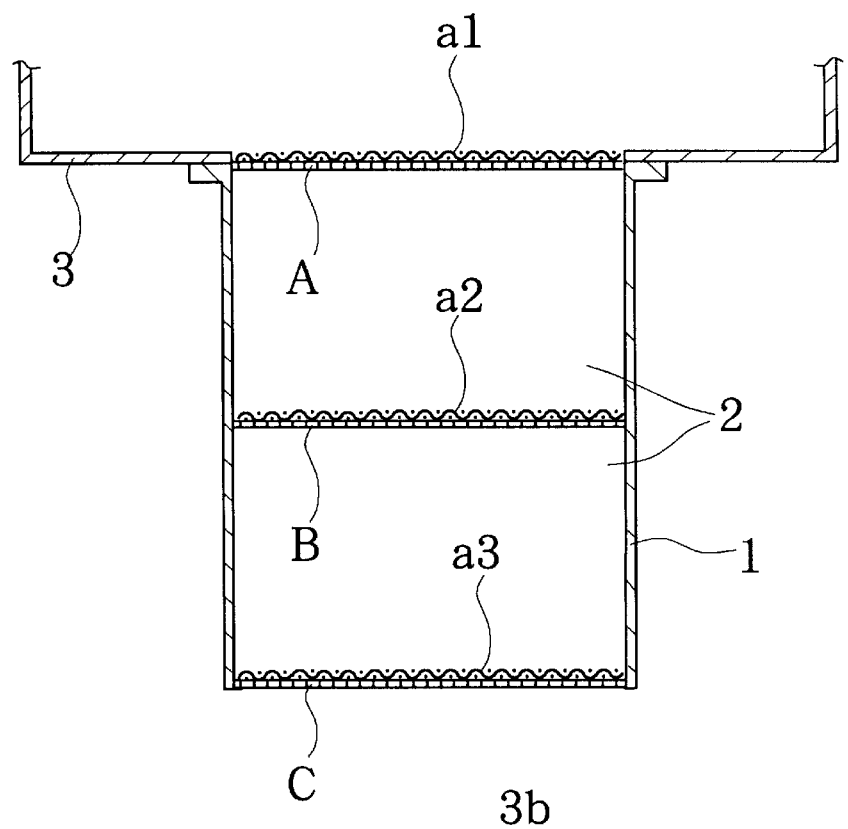
FIG. 1(a) is an explanatory view showing a dehumidifying device that is not grounded.
Figure 1B:
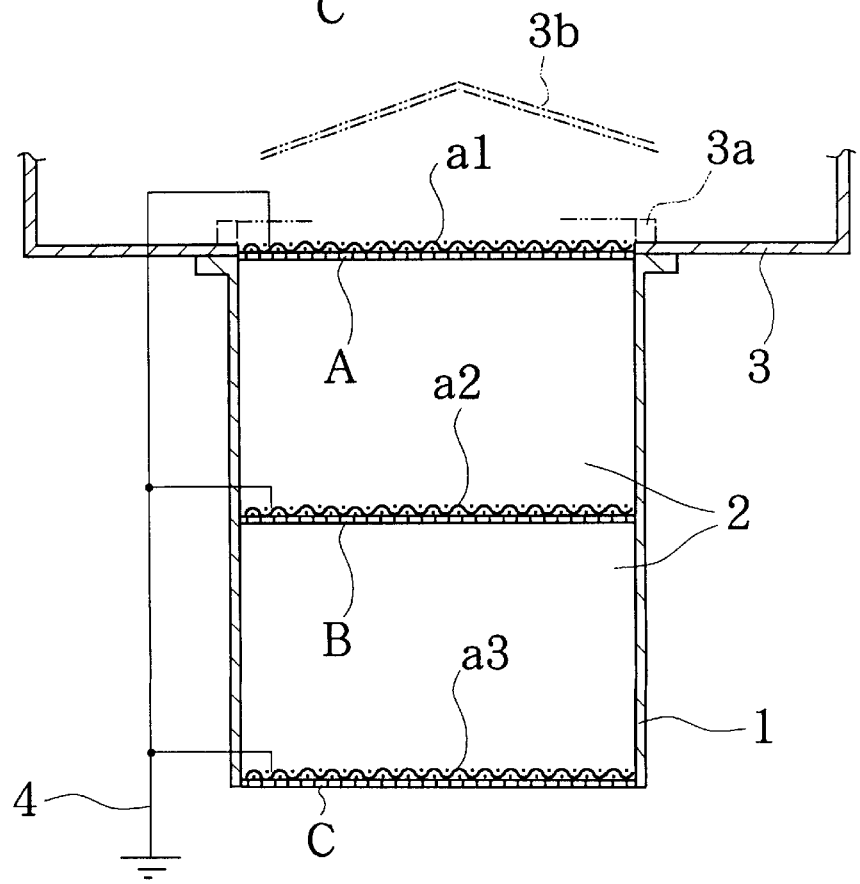
FIG. 1(b) is an explanatory view showing a dehumidifying device that is grounded.

However, each of setting positions of three sheets of mesh a1, a2, a3 was provided, as shown in FIGS. 1(*a*), (*b*), in a vent path 2 of a tubular body 1 in the side of a box 3 respectively, and comparison was made between two types of mesh, one of which a ground was not provided (non-grounded 4) therein and other of which a ground was provided (grounded) therein.

Each of the meshes a1, a2, a3 used as a conductive porous body comprises a sheet thereof respective, and a copper mesh with 34 mesh×32 mesh which was used for an experiment to compare a drying speed between meshes according to a thermal image analysis of the meshes was provided adjacent to each of three sheets of moisture permeable waterproof membrane A, B, C in the same method of provision as used in the experiment.

It should be noted that a product name of "Breathron" produced by Nitto Denko Kabushiki Kaisha (physical properties: refer to FIG. 32) was used herein for the moisture permeable waterproof membrane.

Moisture permeability according to comparison between waterproof membranes is described as follows (refer to FIG. 2).

1108-N40C<1100-C40A<1050-E50B

Also, air permeability is described as follows (refer to FIG. 3).

1108-N40C>1100-C40A>1050-E50B

Herein, it is assumed that a membrane 1108-N40C with a minimum value of the moisture permeability thereof is set to 1.0 and others are compared and computed according to the value, or in order to compare the moisture permeability to fluctuations of the air permeability with the value as a reference, it is thought to be necessary to multiply moisture permeability by air permeability (assuming that 1108-N40C is set to 1.0), and for this reason, if this value is added to air permeability, it is most convenient for forming a gradient of density in water vapor according to moisture permeability and air permeability to select membrane types (3) to (5) among seven types of membranes in the above mentioned.

The membrane type (7) can be selected instead of (5). Accordingly, (3), (4), and (5) are selected in Experiment G2-1 described later.

To check any connection between a gradient of density and a dehumidifying effect, a membrane BRN 1103-N40A with a hole diameter of 1 $\mu$m was used as an object.

The reason of using the sample as an object is because it shows the highest numerical value in the air permeability among them, which helps to simplify an experimental plan.

The following description shows features of the waterproof membranes A, B, C respectively, in which each of the first values indicates moisture permeability (g/m×m×day) and each of the second values indicates air permeability (sec/100 cc).

| Membrane A1 | BRN1103 - N40A | 380 | 23000 |
|---|---|---|---|
| Membrane B1 | BRN1103 - N40A | 380 | 23000 |
| Membrane C1 | BRN1103 - N40A | 380 | 23000 |

In the features and the arrangement of membranes, which was the same structure as that in Experiment G2-1 described later, a dehumidifying effect did not remarkably appear while a keeping of humidity was found, but an effect of preventing dew condensation was recognized.

Herein, combinations as follows were selected.

| Membrane A | BRN1050 - P20B | 4600 | 350 |
|---|---|---|---|
| Membrane | BRN1108 - N40C | 4500 | 400 |
| Membrane B | BRN1100 - C40A | 2000 | 1000 |
| Membrane C | BRN1050 - E50B | 250 | 18000 |

As Membrane A, BRN1108-N40C can be selected in place of BRN1050-P20B as a means of arranging these membranes. The reason of selecting those membranes will be described later.

Figure 2:
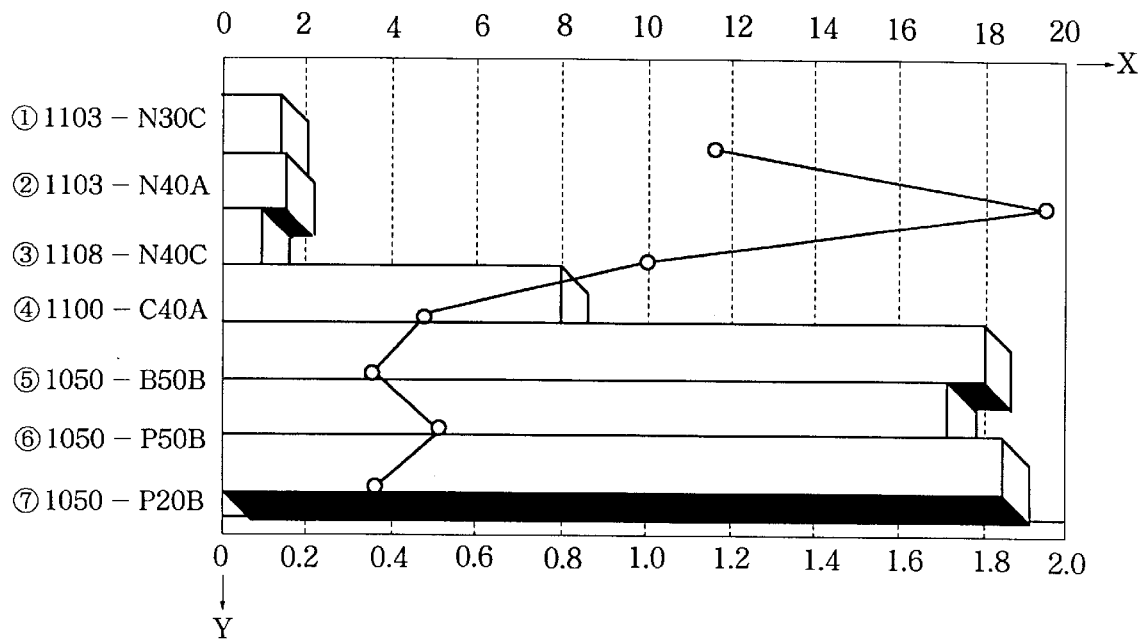
FIG. 2 is a view showing a comparison of moisture permeability among membranes according to physical features shown in FIG. 32 and also a comparison of moisture permeability x air permeability when it is assumed that the moisture permeability and air permeability in the membrane 1108-N40C is set to 1.0.

To enhance a dehumidifying capability of the dehumidifying device comprising moisture permeable waterproof membranes constituting the vent path, in consideration of a volume of a box, an inclining angle in a portion indicated by a bold line in the line graph as shown, for instance, in the comparison in moisture permeability between membranes (refer to FIG. 2), namely a virtual line coupling between the maximum value and minimum value is expressed in an equation of X=−aY+b assuming that a vertical axis in the line graph shown in FIG. 2 is set to Y axis and a horizontal axis therein to X axis, but, types of products, namely moisture permeable waterproof membranes to be selected are just arranged on Y axis, so that the reference code b herein indicates a value obtained when Y is equal to zero (Y=0) as an ideal value. In accordance with making larger a difference between the minimum value and maximum value in the line graph, namely making the reference code a larger, a dehumidifying effect increases. Further, if the maximum value and minimum value are set to lower values, the dehumidifying effect can be more promoted. Namely, the value of b is made smaller. Reversely, in a case where the present mechanism is used as a humidifier system, membranes may be arranged from the box to outside air so that the gradient in values will be reversed.

Figure 3:
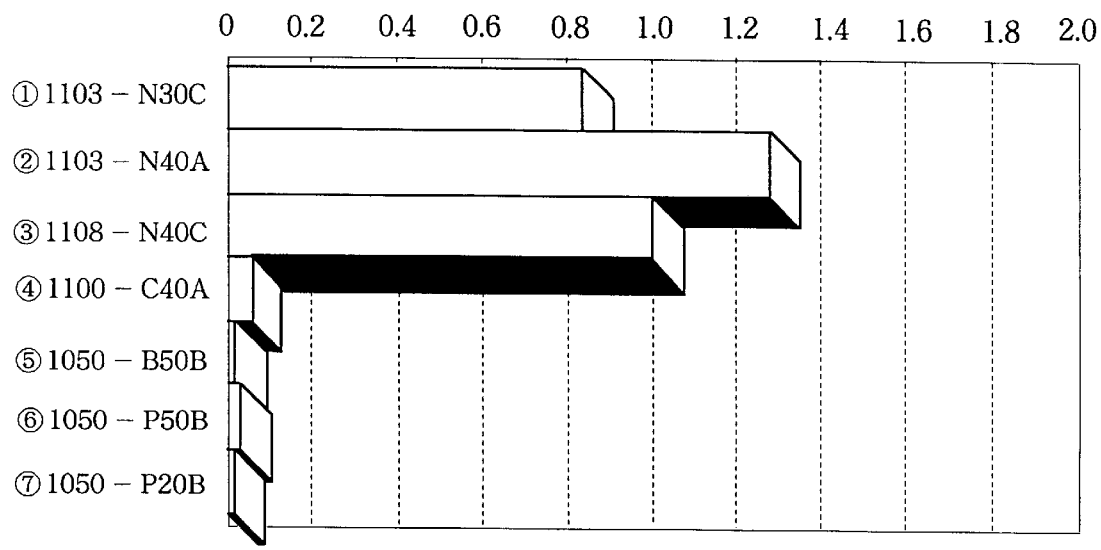
FIG. 3 is a view showing a comparison of air permeability among the membranes according to the physical features shown in FIG. 32.
Figure 4:
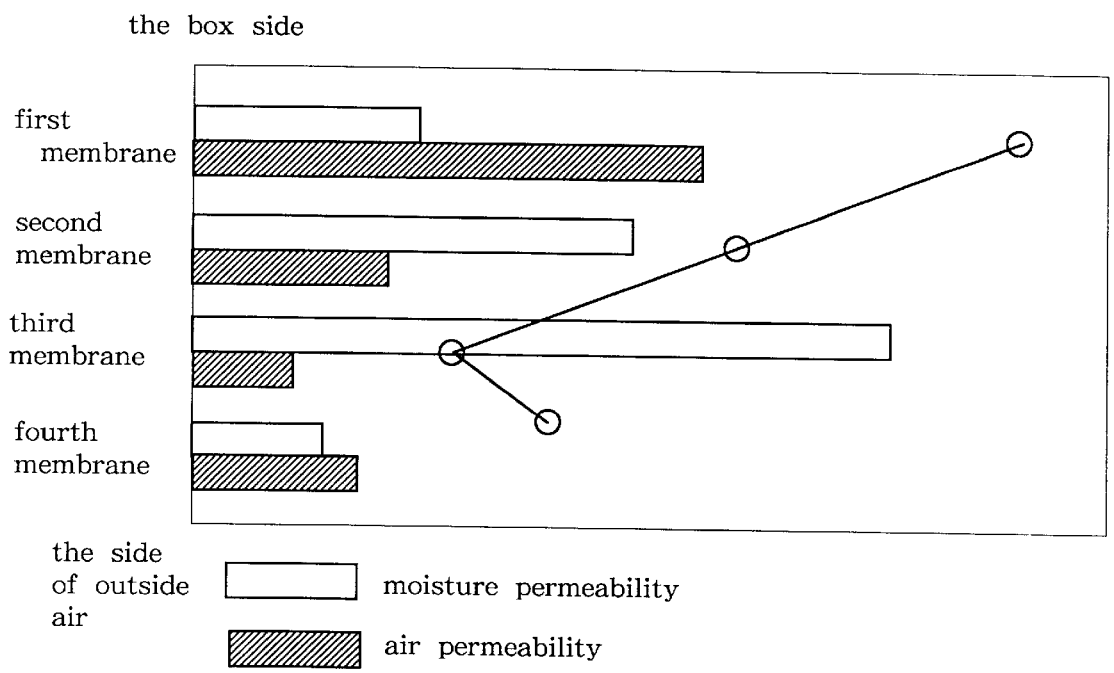
FIG. 4 is an explanatory view showing a gradient obtained by reversing the features shown in FIG. 2 in a simulated way.
Figure 6:
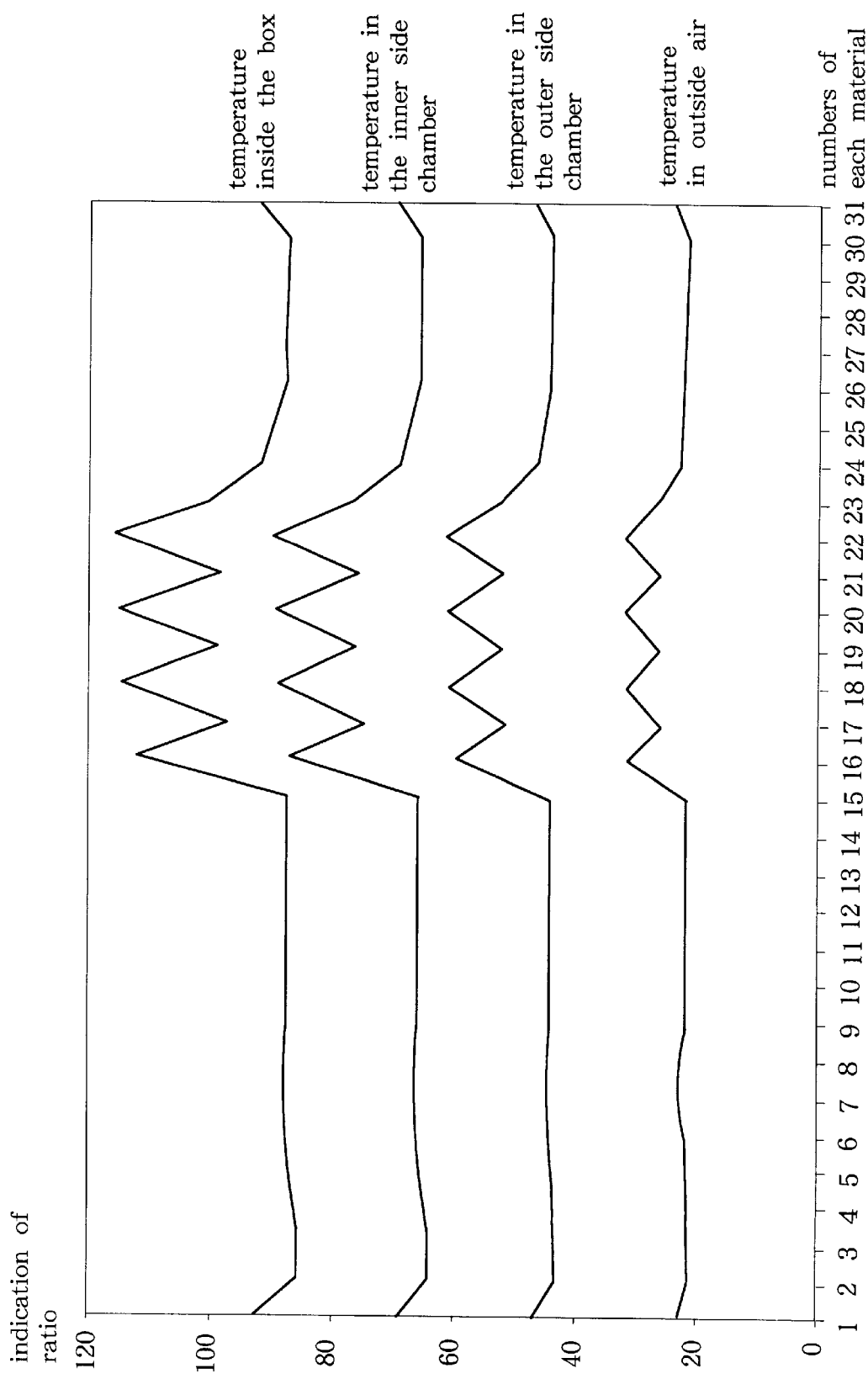
FIG. 6 is a view showing a comparison of temperatures between the box and chambers each not being grounded in the dehumidifying device.
Figure 8:
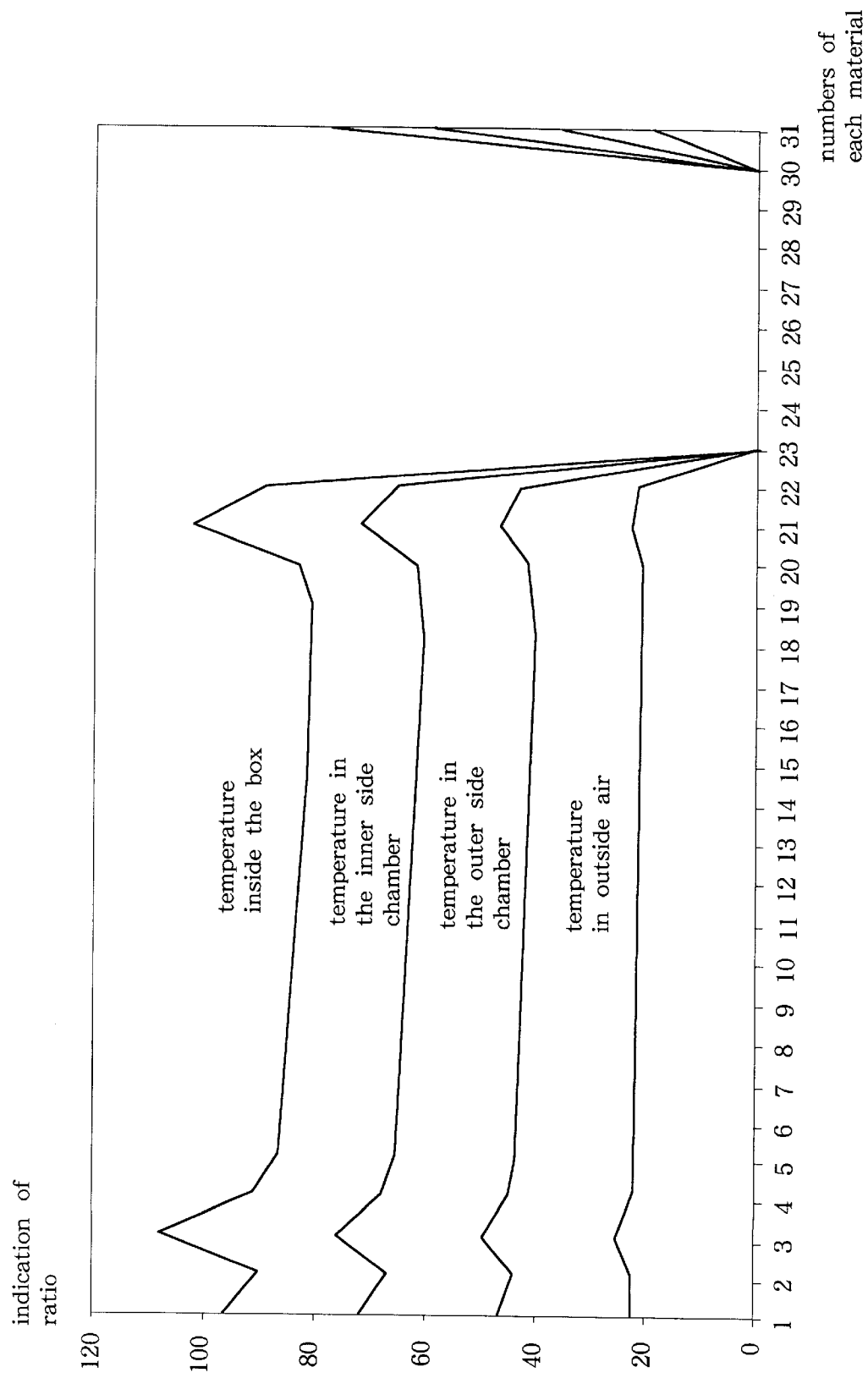
FIG. 8 is a view showing a comparison of temperatures between the box and the chambers each being grounded in the dehumidifying device.

A relation of the gradient in temperature in cases of FIGS. 2, 3, and 4 is obtained according to that in FIG. 6 and FIG. 8. For this reason, when the relation of the gradient in temperature between the side of the box and the side of outside air is a relation reversed to that in FIG. 6 and FIG. 8, the relation opposite to the arrangement in the box side as well as in the side of outside air in FIG. 2, FIG. 3, FIG. 4 should be set. It is needless to say that a side of water repellency of the membrane is directed toward the side of outside air and a side of a non-woven fabric is directed toward the side of the box also in a case where the opposite relation is to be set.

Occurrence of a gradient in temperature between chambers described later strongly affects a volume of each chamber relatively depending on the inclination of the gradient in temperature because a change of moisture permeability and a change of air permeability were not set between the membranes in the arrangement of the films A1, B1, and C1.

The present apparatus is a dehumidifying device with no power and no electric power mainly making use of fluctuations of temperature in the box, so that various changes of the specification are conceivable according to regions. FIG. 4 is a simulated view of a graph showing a ratio between moisture permeability and air permeability as well as of a graph of moisture permeablity×air permeablity in a case where it is assumed that the moisture permeability and air permeability of the particular membrane to be used is set to 1.0 in a case where chambers from a first membrane to a fourth membrane are set by increasing one more layer of chamber in addition to the inner side chamber and to the outer side chamber.

As described above, for instance, in a case where it is assumed that, for instance, four layers of small chamber in the dehumidifying device described in claims 1, 2, 3, 4, 5, 6, 7, 8, and 9 are provided therein, and in a case where a chamber in the outermost section is put under a very easily humidified environment, one reversed gradient in the direction from the outermost chamber toward the box is set in the opening section in the side of outside air as shown in a model in FIG. 4 in addition to the original dehumidifying gradient (this gradient is a gradient in the portion indicated by a bold line in the line graph shown in FIG. 2 according to the arrangement in which moisture permeability is set so that it becomes higher in accordance with its movement from the box side to the side of outside air and air permeability is set so that it becomes lower in accordance with its movement from the box side to the side of outside air), a gradient in density between chambers each of which suppresses once flowing of water vapor in the side of outside air into the box side is set, so that it is possible to promote discharging of the water vapor in the drying process when the temperature is rising, for instance, during solar irradiation, and especially, in this step, if a membrane having a smaller gradient (in the graph) as well as smaller moisture permeability as compared to membranes set between the small chambers for setting a dehumidifying gradient in the box side and having air permeability larger than that of a third membrane is selected for a membrane set in the side of outside air as a fourth membrane, the humidity in the side of outside air can further be suppressed to move toward the box side even in a case where outside air is high in humidity for a long period of time, and the humidity inside the box can also efficiently be kept at a low level.

Figure 5:
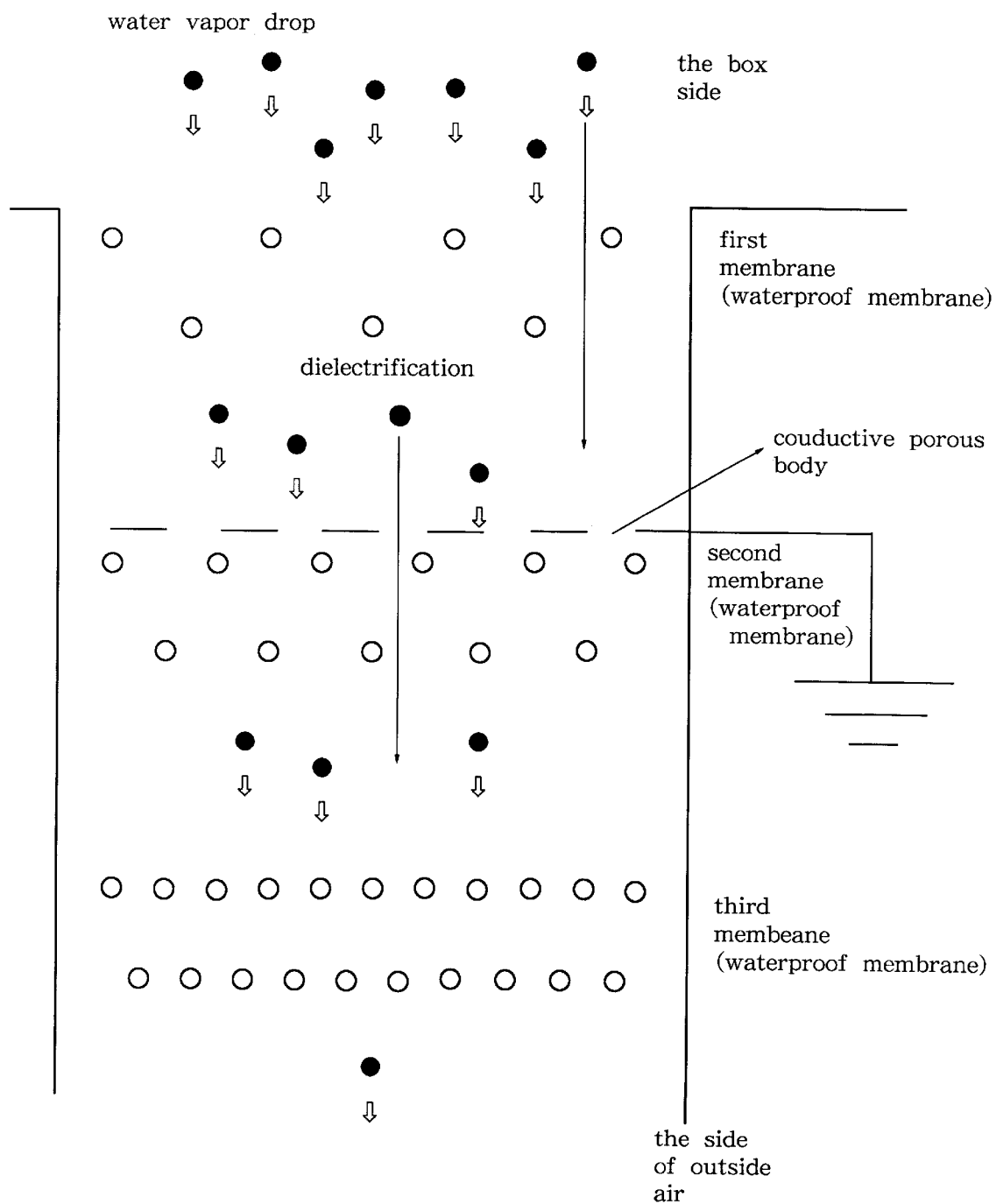
FIG. 5 is an explanatory view showing a state of dehumidification in a simulated way.

FIG. 5 is a theory on a dehumidifying mechanism on the assumption.

The air inside the box moves toward outside air with the temperature in the box. On the contrary, the air inside the box is contracted in accordance with lowering of the temperature of outside air, so that breathing phenomena occur in outside air as if the outside air passes through the vent path of the dehumidifying device according to the present invention. Also, convection of air having variable densities of water vapor or the like occurs in each of the small chambers. There occurs a difference between an absolute rate of water vapor with the difference of moisture permeability and the difference of air permeability which can pass through a membrane and a air permeable rate due to a difference between moisture permeability and air permeability even under the breathing phenomena as described above, and the difference is intentionally generated between each of the small chambers from the first membrane to the third membrane, and for this reason the box side can be dehumidified. A metallic conductive porous body acts as a dielectric, especially in setting of the second membrane in the box side, electrified water vapor at this position and at the same time has also such effects, that the humidity in some local portion can temporarily be raised, including features or the like that some local point in a membrane adjacent to the second membrane can be cooled or easily be dried, however, when air is sucked into the box, the electrified water vapor is hard to pass through the membrane, but it is easy to pass therethrough because a dielectric effect is executed on discharging the air (on sucking the air), so that discharging of the water vapor to the side of outside air can be promoted, which makes it more easier to promote dehumidification from a box.

Generally, a high-conductive porous body, for instance a metallic mesh (e.g. made of stainless steel, gold, white gold, or copper or the like) has electrically low resistance, on the other hand a synthetic resin mesh (e.g. 4-ethylene fluoride, polyethylene, polyester, vinyl chloride, or nylon or the like) has electrically high resistance.

Further, it can generally be said that a high-conductive mesh is high in thermal conductivity as compared to that in a low-conductive mesh. As one of the exceptions, there is a carbon-fibers mesh which is high in conductivity but is lower in thermal conductivity as compared to that of the metallic mesh.

Herein, the dielectric effect can be included in effects as a main element thereof and thermal conductivity can largely act on the effects. Namely, the metallic mesh contributes to uniformity of the temperature and easily effects over the air to be cooled, on the other hand, the synthetic resin mesh contributes to uniformity of the temperature as thermal keeping preserative effects.

Accordingly, any arrangement of a temperature gradient not contradicting to the arrangement of a temperature gradient shown in FIG. 6 and FIG. 8 has an advantageously significant effect on stabilization of the temperature in consideration of air permeability and convective features of air in a chamber.

Detailed Description of the Contents in Experiments

It is assumed that Membrane 1 is arranged in the box side and Membrane 3 is arranged in the side of outside air. This experiment is described as G2-1. Each of the below grounding meshes is arranged to be set within a distance of 1 mm right above each of membranes.

| Grounding mesh | 41 × 80 mesh | φ84 |
| Membrane 1 | Breathron | 1108 - N40C |
| Grounding mesh | 41 × 80 mesh | φ84 |
| Membrane 2 | Breathron | 1100 - C40A |
| Grounding mesh | 41 × 80 mesh | φ84 |
| Membrane 3 | Breathron | 1050 - P20B |

Herein, FIG. 33 shows physical features of a membrane, FIG. 34 and FIG. 35 are views each continued from FIG. 33.

FIG. 36 shows a result of measurement under conditions of setting a metallic mesh as well as a membrane in the apparatus without a ground thereof, and FIG. 37 shows a view continued from FIG. 36.

FIG. 38 shows a result of measurement under conditions of setting a metallic mesh as well as a membrane in the apparatus without a ground thereof, and FIG. 39 shows a view continued from FIG. 38.

FIG. 40 shows a result of measurement under conditions of setting a metallic mesh as well as a membrane in the apparatus without a ground thereof, and FIG. 41 shows a view continued from FIG. 40.

Next description is made for each result in each of experiments with reference to the related drawings (refer to FIGS. 6 to 18).

In figures showing each graph, it is assumed that the upper side of the vertical axis indicates a high state and the lower side thereof indicates a low state, and that numerical values are set on the vertical scale of each graph calibrated by clearly magnification in each. However, vertical magnification in each of the graphs from FIG. 6 to FIG. 18 is not the same one, and each calibration is made according to convenience of description for each of the graphs. The reference numerals 1 to 31 in the horizontal axis thereof indicate a number of each material.

At first, FIG. 6 shows a case where a metallic mesh and a membrane are provide therein without a ground thereof and shows the temperature inside the box, that in the inner side chamber (in the chamber in the box side, the same hereinafter), that in the outer side chamber (in the chamber in the side of outside air, the same hereinafter), and that of outside air in the order from the upper side of the vertical axis.

Figure 7:
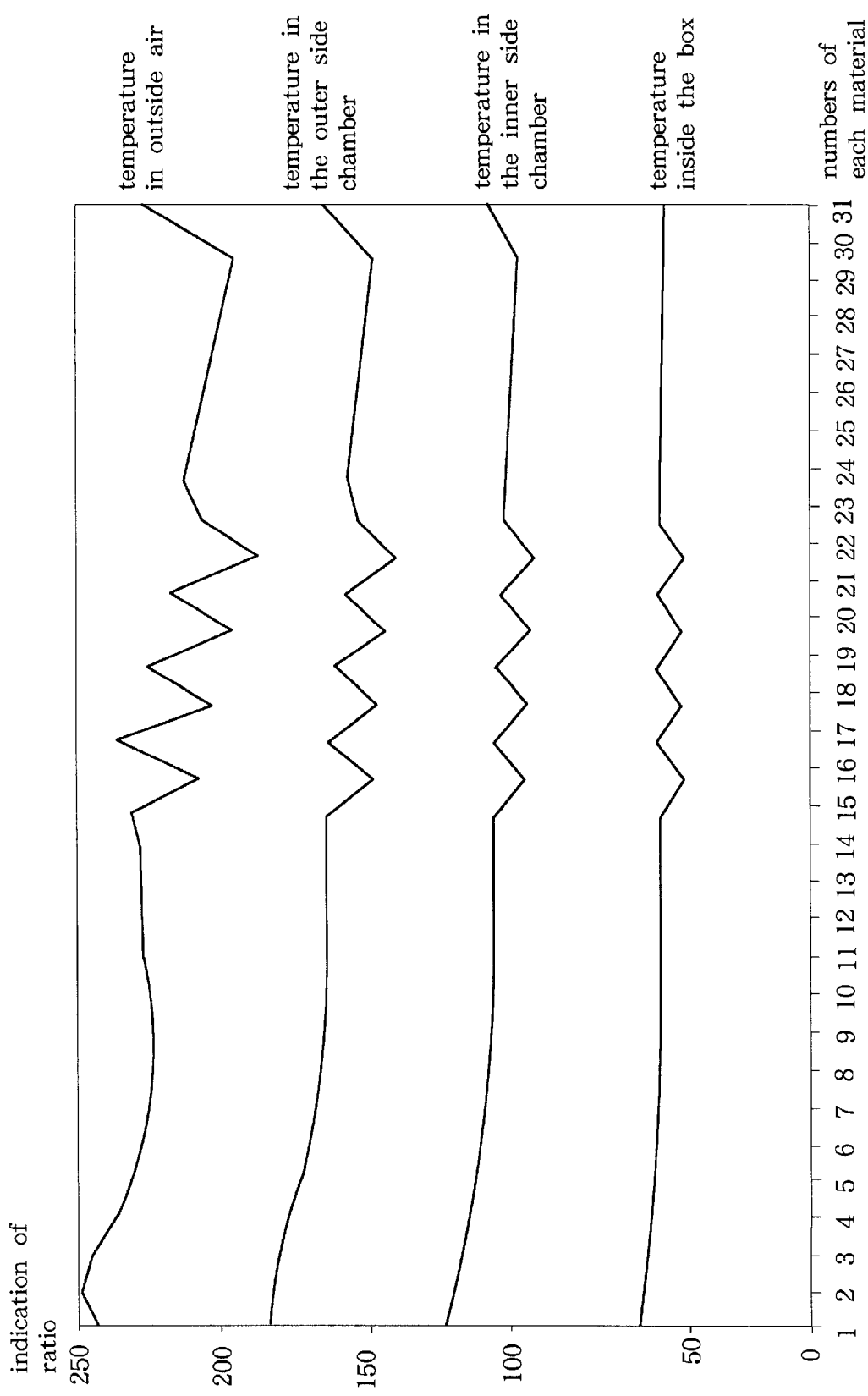
FIG. 7 is a view showing a comparison of humidities between the box and the chambers each not being grounded in the dehumidifying device.

FIG. 7 shows a case where a metallic mesh and a membrane are provide therein without a ground thereof and shows the humidity in outside air, that in the outer side chamber, that in the inner side chamber, and that inside the box in the order from the upper side thereof.

FIG. 8 shows a case where a metallic mesh and a membrane are provided therein with a ground thereof and shows the temperature inside the box, that in the inner side chamber, that in the outer side chamber, and that in outside air in the order from the upper side of the vertical axis.

Figure 9:
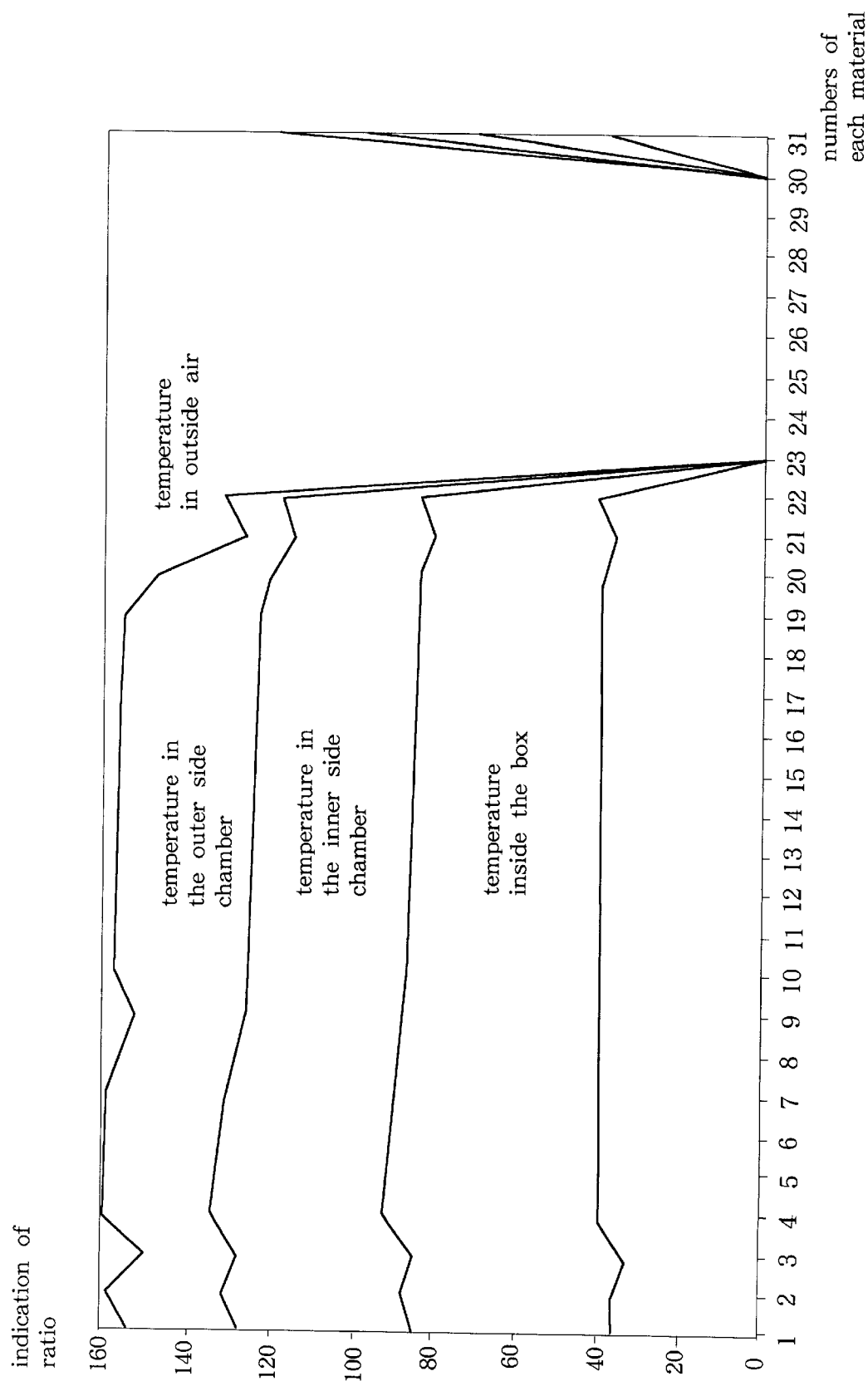
FIG. 9 is a view showing a comparison of humidities between the box and the chambers each being grounded in the dehumidifying device.

FIG. 9 shows a case where a metallic mesh and a membrane are provide therein with a ground thereof and shows the humidity in outside air, that in the outer side chamber, that in the inner side chamber, and that inside the box in the order from the upper side thereof.

Figure 10:
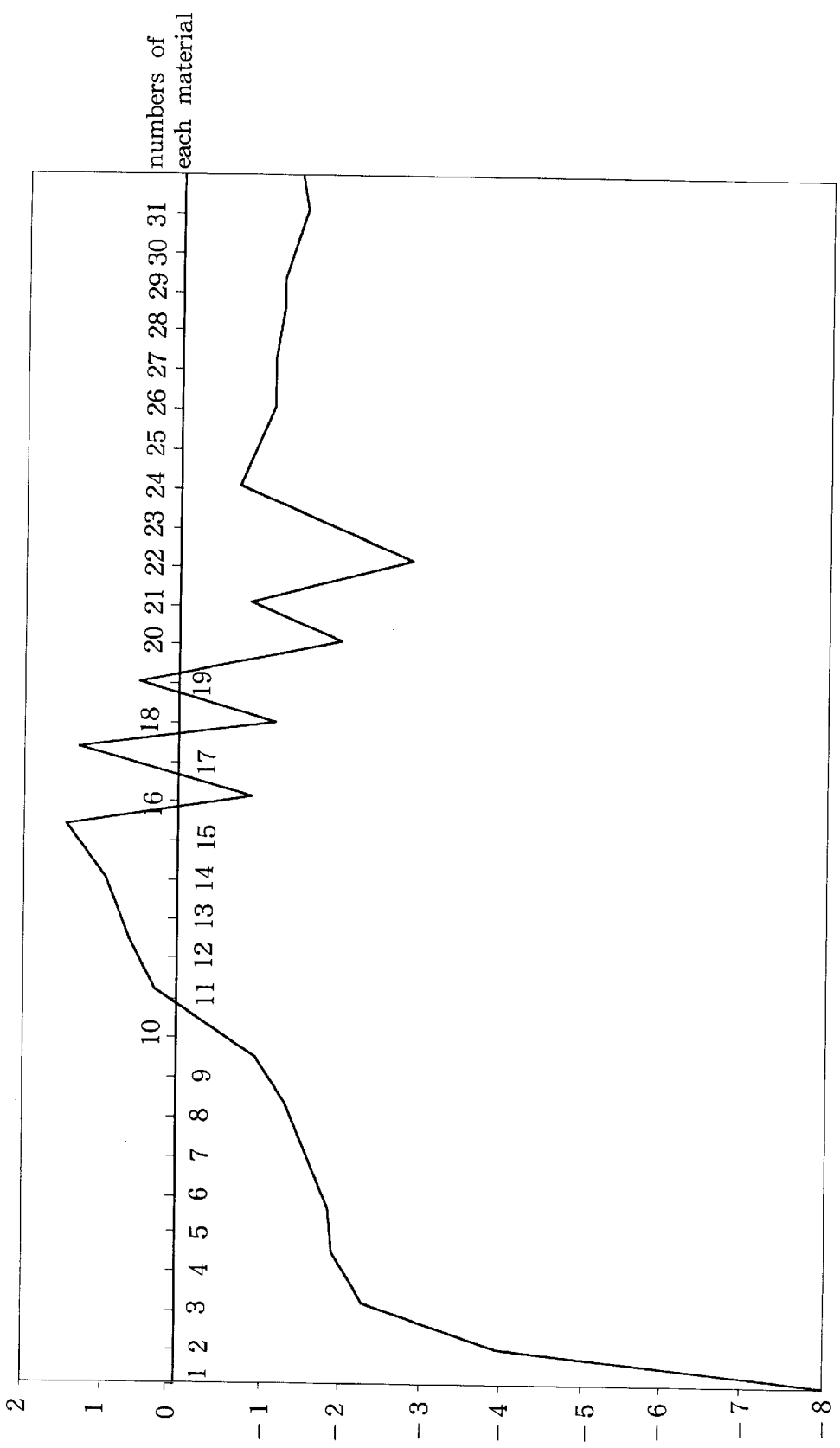
FIG. 10 is a view showing a difference in humidities between a chamber in the outer side and that in the inner side each not being grounded.

FIG. 10 shows a case where a metallic mesh and a membrane are provide therein without a ground thereof and shows a value obtained by the humidity in the outer side chamber–(minus) that in the inner side chamber.

Figure 11:
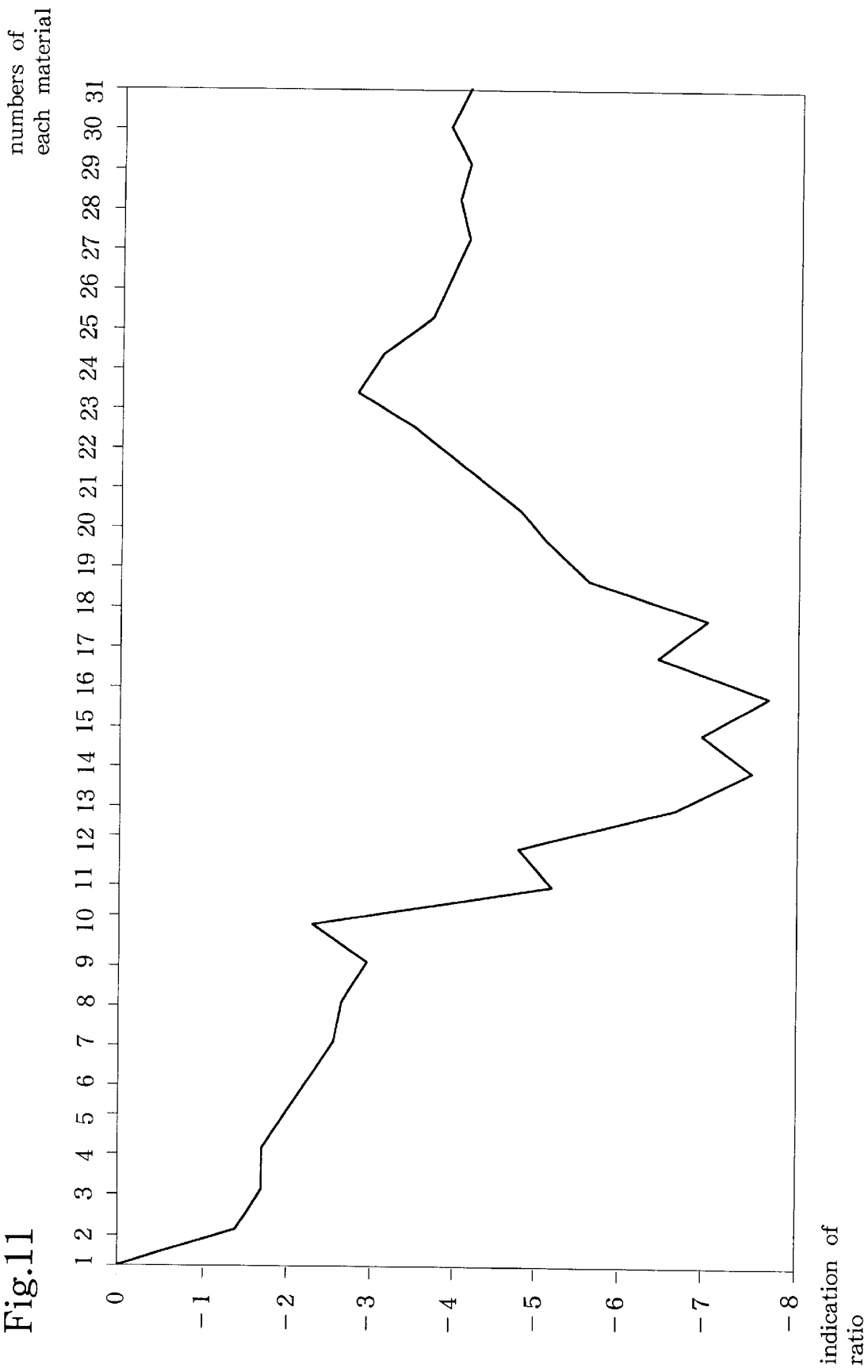
FIG. 11 is a view showing a difference in humidities between the chamber in the outer side and that in the inner side each not being grounded.

FIG. 11 shows a case where a metallic mesh and a membrane are provide therein without a ground thereof and shows a value obtained by the humidity in the outer side chamber–that in the inner side chamber.

Figure 12:
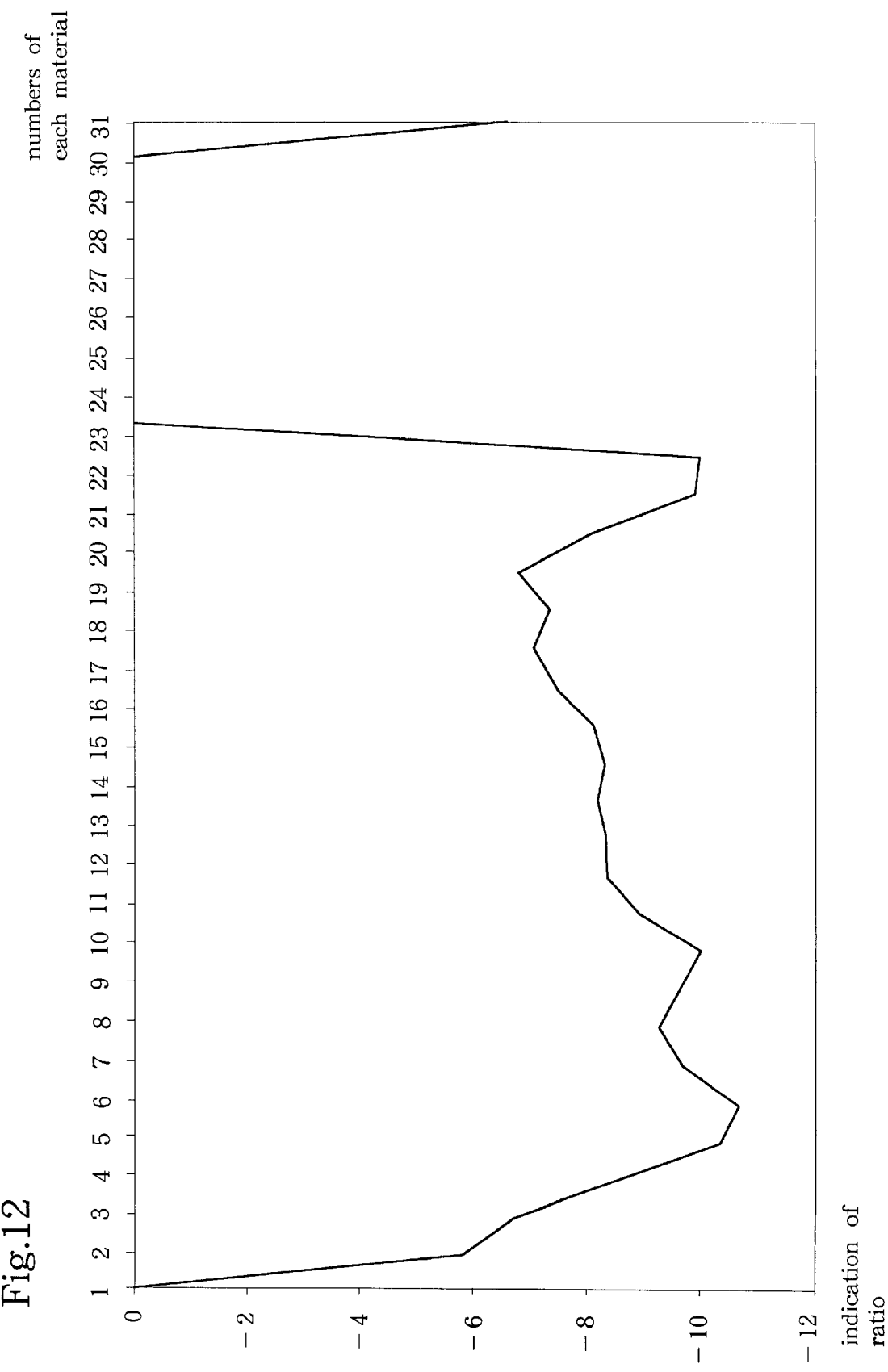
FIG. 12 is a view showing a difference in humidities between the chamber in the outer side and that in the inner side each being grounded.

FIG. 12 shows a case where a metallic mesh and a membrane are provide therein with a ground thereof and shows a value obtained by the humidity in the outer side chamber–that in the inner side chamber.

Figure 13:
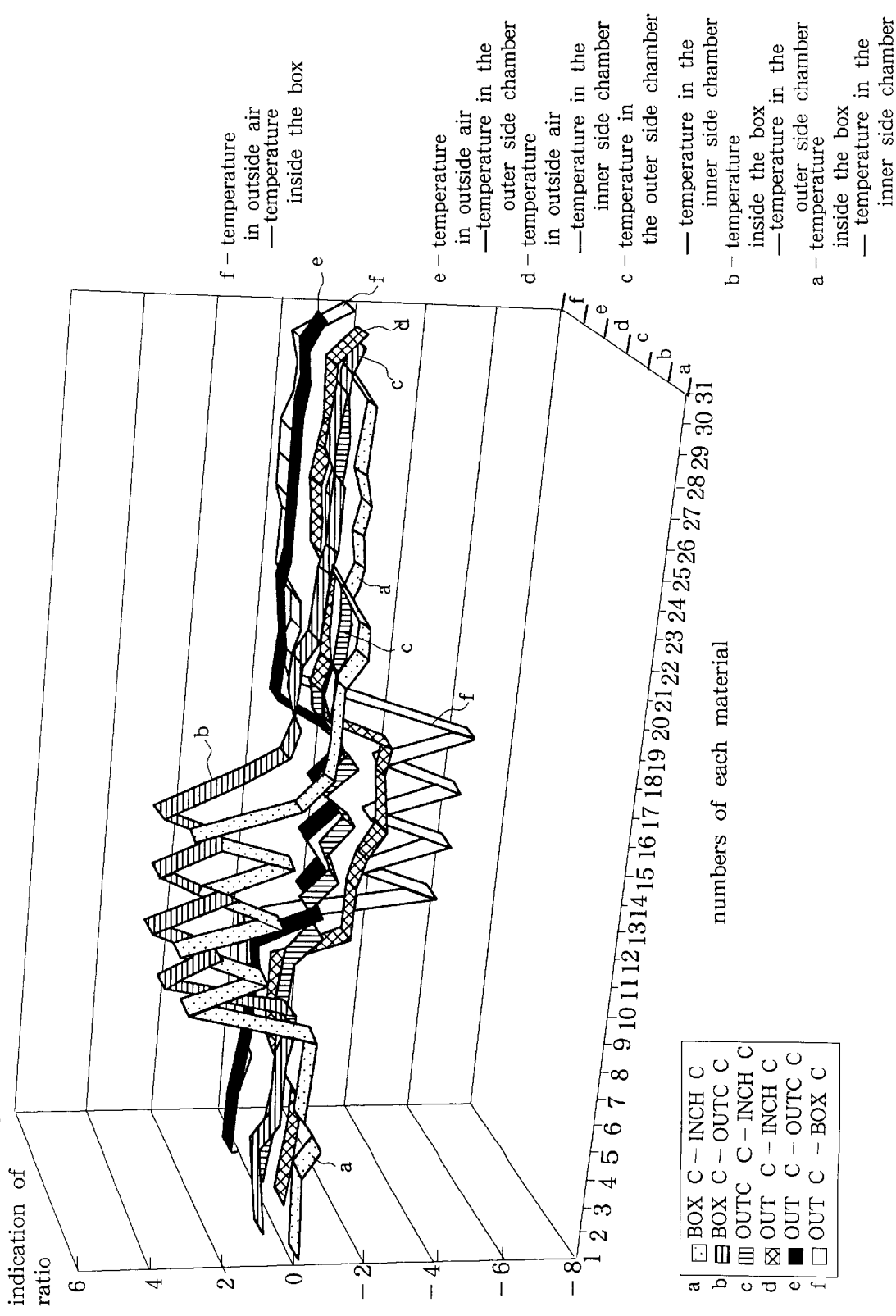
FIG. 13 is a view showing a comparison of temperatures in each of the chambers not being grounded.

FIG. 13 shows a case where a metallic mesh and a membrane are provide therein without a ground thereof and shows, from the front side of the graph, each value obtained by:

temperature inside the box–that in the inner side chamber, temperature inside the box–that in the outer side chamber, temperature in the outer side chamber–that in the inner side chamber, temperature in outside air–that in the inner side chamber, temperature in outside air–that in the outer side chamber, and temperature in outside air–that inside the chamber.

Figure 14:
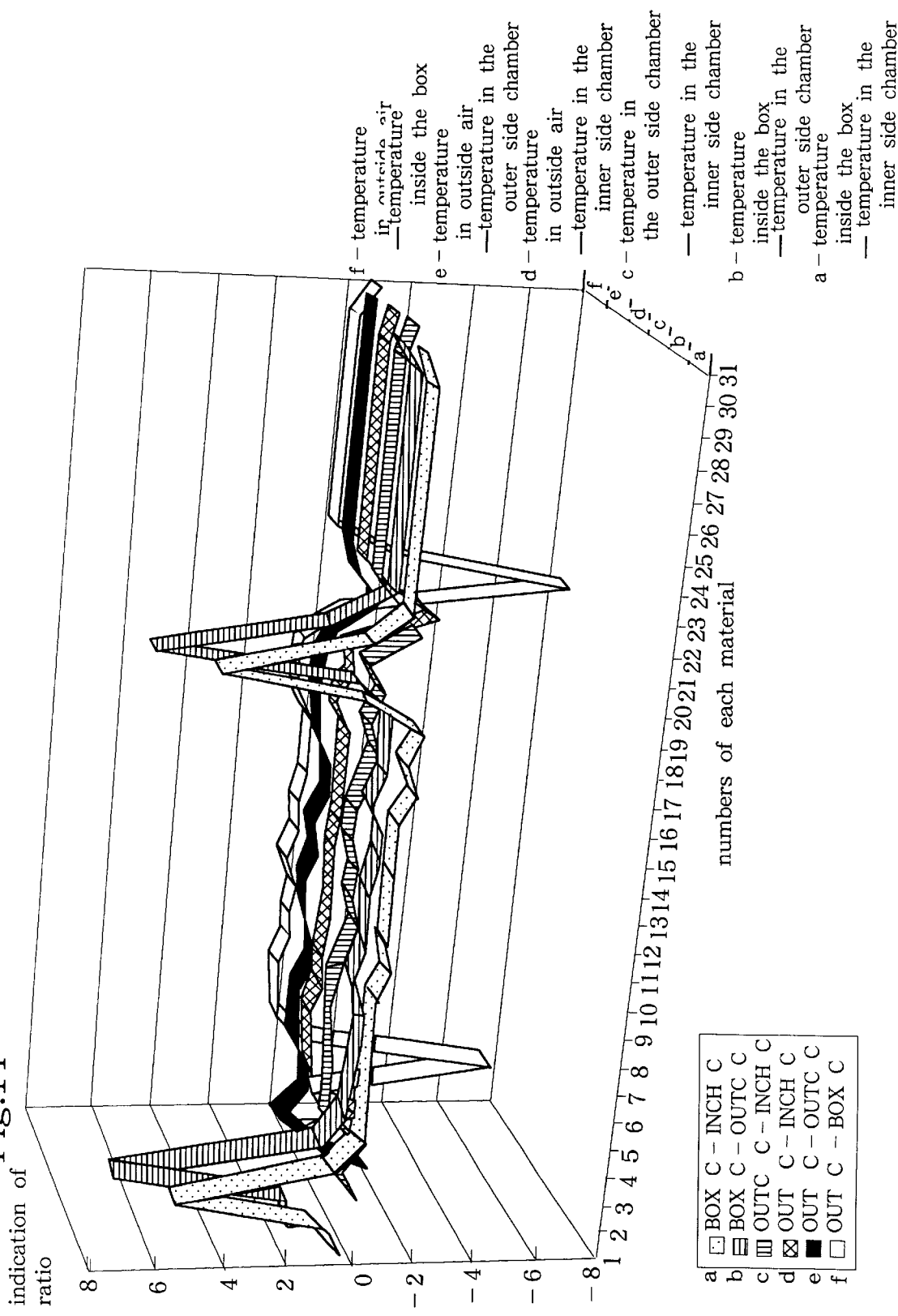
FIG. 14 is a view showing a comparison of temperatures in each of the chambers being grounded.

FIG. 14 shows a case where a metallic mesh and a membrane are provide therein with a ground thereof and shows, from the front side of the graph, each value obtained by:

temperature inside the box–that in the inner side chamber, temperature inside the box–that in the outer side chamber, temperature in the outer side chamber–that in the inner side chamber, temperature in outside air–that in the inner side chamber, temperature in outside air–that in the outer side chamber, and temperature in outside air–that inside the chamber.

Figure 15:
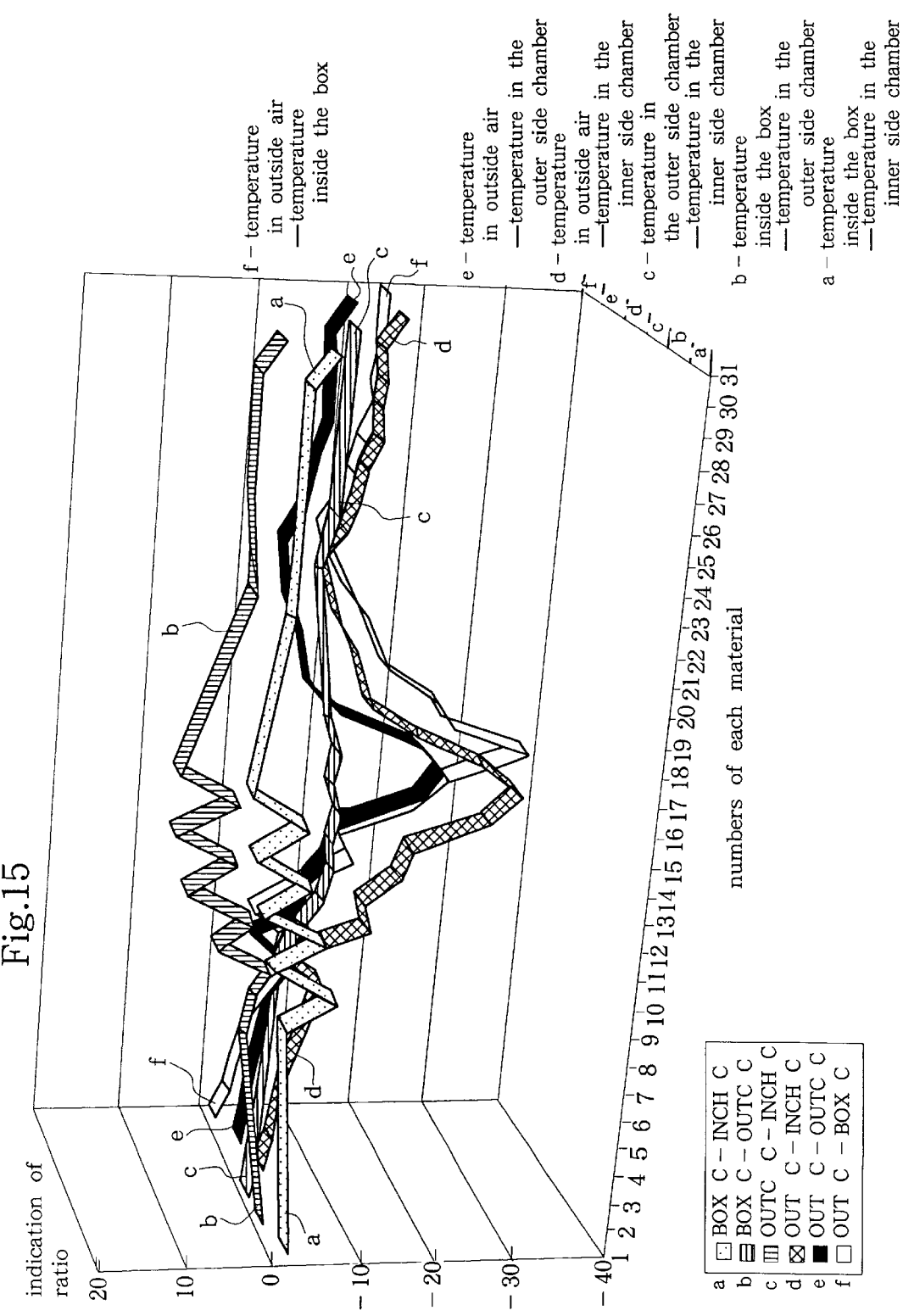
FIG. 15 is a view showing a comparison of humidities in each of the chambers not being grounded.

FIG. 15 shows a case where a metallic mesh and a membrane are set therein without a ground thereof and shows, from the front side of the graph, each value obtained by:

humidity inside the box–that in the inner side chamber, humidity inside the box–that in the outer side chamber, humidity in the outer side chamber–that in the inner side chamber, humidity in outside air–that in the inner side chamber, humidity in outside air–that in the outer side chamber, and humidity in outside air–that inside the chamber.

Figure 16:
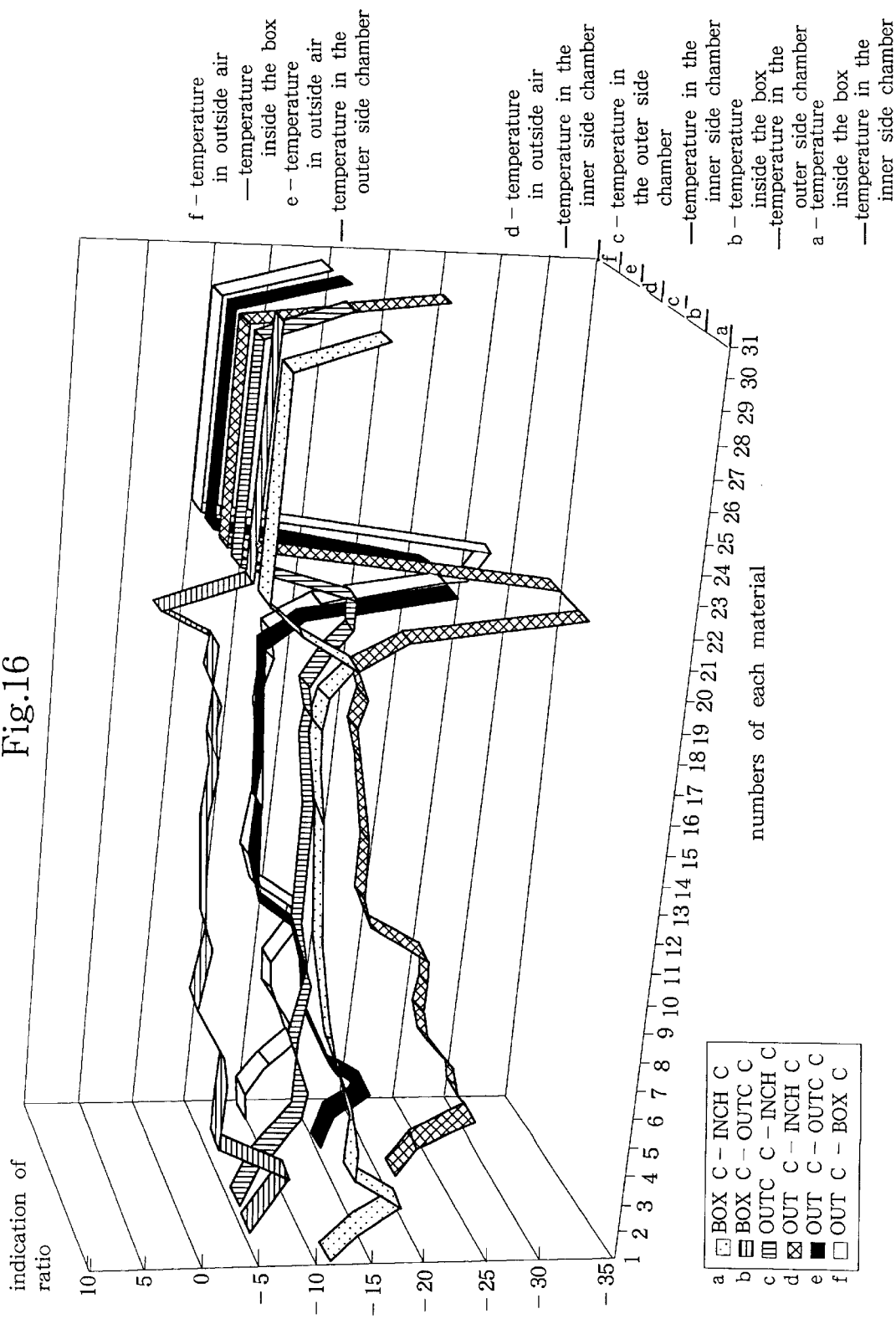
FIG. 16 is a view showing a comparison of humidities in each of the chambers being grounded.

FIG. 16 shows a case where a metallic mesh and a membrane are set therein with a ground thereof and shows, from the front side of the graph, each value obtained by humidity inside the box–that in the inner side chamber, humidity inside the box–that in the outer side chamber, humidity in the outer side chamber–that in the inner side chamber, humidity in outside air–that in the inner side chamber, humidity in outside air–that in the outer side chamber, and humidity in outside air–that inside the chamber.

Figure 17:
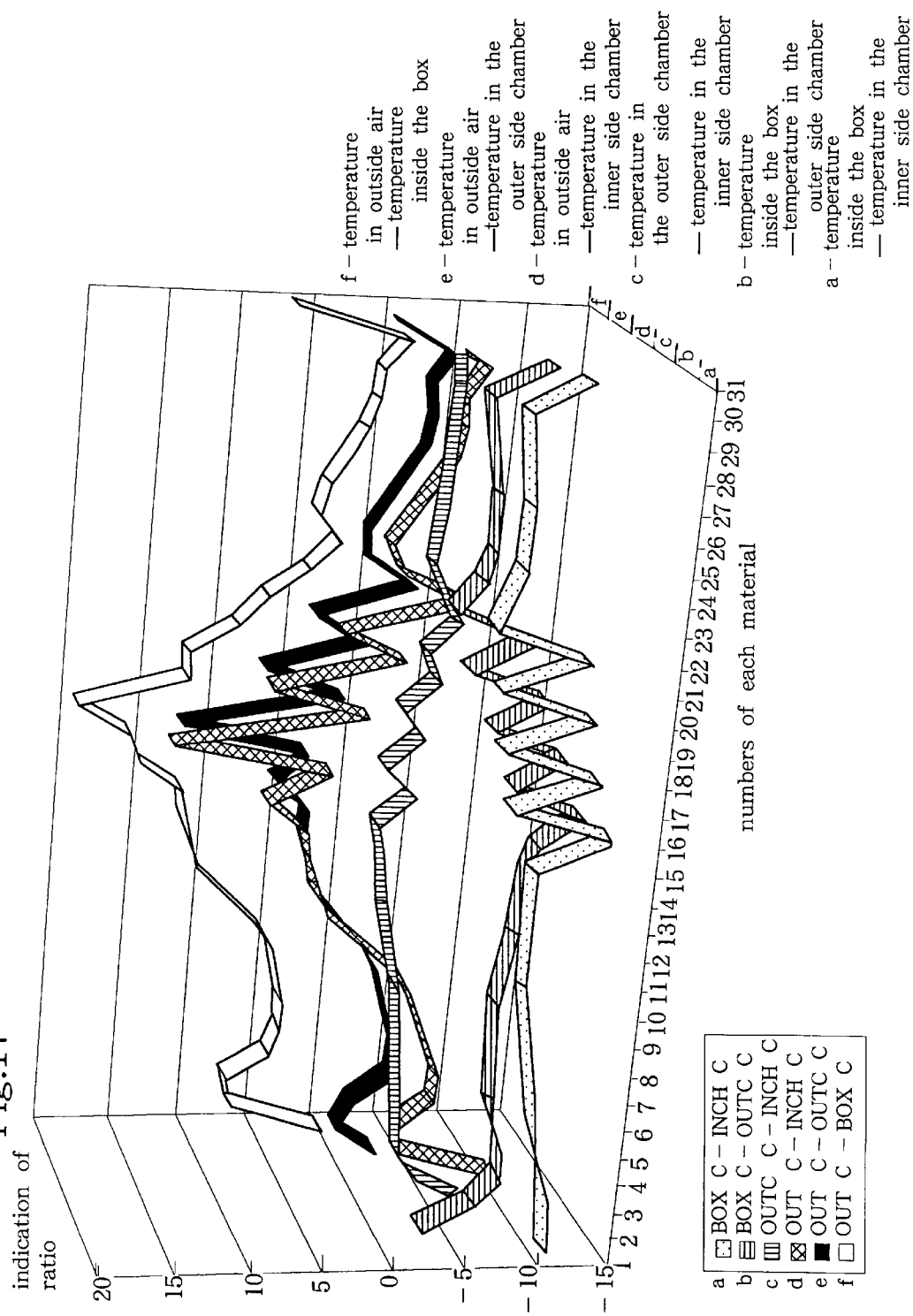
FIG. 17 is a view showing a comparison of humidities in each of the chambers not being grounded.

FIG. 17 shows a case where a conductive porous body and a membrane are set therein without a ground thereof and shows, from the front side of the graph, each value obtained by:

humidity inside the box–that in the inner side chamber, humidity inside the box–that in the outer side chamber, humidity in the outer side chamber–that in the inner side chamber, humidity in outside air–that in the inner side chamber, humidity in outside air–that in the outer side chamber, and humidity in outside air–that inside the chamber.

Figure 18:
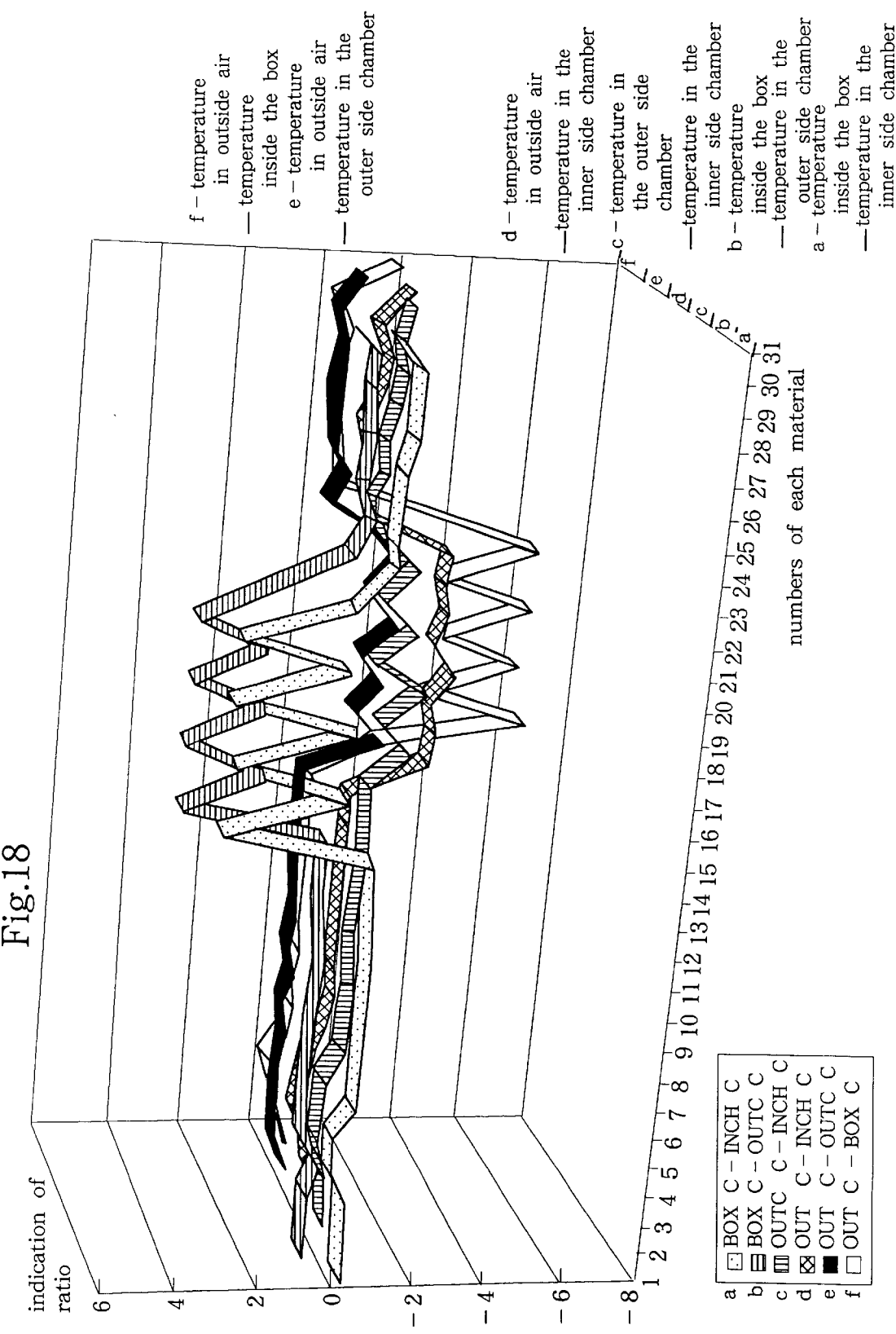
FIG. 18 is a view showing a comparison of temperatures in each of the chambers not being grounded.

FIG. 18 shows a case where a (electric)conductive porous body and a membrane are set therein without a ground thereof and shows, from the front side of the graph, each value obtained by:

temperature inside the box–that in the inner side chamber, temperature inside the box–that in the outer side chamber, temperature in the outer side chamber–that in the inner side chamber, temperature in outside air–that in the inner side chamber, temperature in outside air–that in the outer side chamber, and temperature in outside air–that inside the chamber.

The following results are obtained after the tests described above were executed.

1. A temperature gradient between chambers clearly occurs.

Refer to FIG. 6 and FIG. 8.

2. In the membrane with the conductive porous body grounded, lowering of the temperature occurs earlier, though slowly, as compared to a case where the body is not grounded.

Refer to FIG. 6, FIG. 8, FIG. 13, and FIG. 14.

3. On the other hand, examining on entire features of temperature fluctuation, the membranes with the conductive porous bodies successively provided and grounded as typically shown in FIG. 13 and FIG. 14 are more stable as compared to those with the bodies not successively provided and grounded, and it is understood, according to comparison between FIG. 6 and FIG. 8, that a decreasing speed of the temperature becomes quicker.

4. In the membranes with the conductive porous bodies successively provided and grounded, the temperature thereof decreases slowly and stably, but in those not successively provided and grounded, a fluctuation rate of humidity outside the box is easily affected by a fluctuation rate of humidity inside the box, but the humidity inside the box requires time until a decreasing curve is made in comparison with that for decreasing of the temperature (as compared to the above 2 and 3) as recognized in FIG. 7 and FIG. 9, on the other hand, in the membranes with the conductive porous bodies successively provided and grounded, the humidity inside the box is converged to about 37% with stability which is lower as compared to that converged to 50% with stability in those with bodies not successively provided and grounded.

5. On the other hand, examining on entire features of humidity fluctuation, the membranes with the conductive porous bodies successively provided and grounded as typically shown in FIG. 15 and FIG. 16 are also stabler as compared to those with the bodies not successively provided and grounded, and it is understood, according to comparison between FIG. 7 and FIG. 9, that a decreasing speed of the humidity is going down with stability.

6. As for the phenomena described in above 2, 3, 4, as typically shown in FIG. 10 and FIG. 12, in comparison with a difference between humidity in outer side chamber and that in inner side chamber, membranes with conductive porous bodies successively provided and grounded hold a stable fluctuation rate, on the other hand, membranes with conductive porous bodies not successively provided and grounded are unstable, which can be supported also by the fact that the fluctuating speed is extremely high.

It is found that slight movement of electrified water vapor between the chambers occurs from a result of measurement of a surface potential of a moisture-permeable waterproof membrane (FIG. 24 and FIG. 25), and by setting a ground of the conductive porous body, the grounded conductive porous body can dielectrify water vapor acting as an interfering element in moisture permeability and air permeability of the membrane, namely electrified air, electrified water vapor, or some other electrified gas in movement of the air between the chambers receives a dielectric effect, so that the movement thereof can be prevented from interference, and for this reason, it is conceivable that metallic meshes successively provided and grounded could reach the humidity in the box at remarkably low level as compared to a case where the metallic meshes without being successively provided and grounded are provided. Also, convection of gas occurs in a space of the chamber at static pressure, and the content gas in the space of the chamber receives a dielectric effect according to the convection thereof.

It is known that water vapor in the air can be charged either positively or negatively, and the charge thereof shows various states especially depending on a difference in regions or in climates. It is also known that, in the charge thereof, a charging capability of water vapor depends on an electric field in which the water vapor exists and the charge of water vapor is temporary as known phenomena in dielectric discharge.

Accordingly, it can be considered that dielectrifying effects of a conductive porous body can easily be affected by weak potential gradient on a surface or electrostatic features generated according to a box or component materials of the present dehumidifying device and the environment in which the materials are provided, or to a charging capability in the box.

It can be supported also by the fact that nonuniform dispersion of water vapor can be recognized on a membrane on discharging air or on sucking air in the thermal image measurement of the third membrane that flow velocity of water vapor with various densities therein is captured by a mesh to be promoted to discharge the air to the outer side according to local stagnation of air as well as to a convective phenomenon inside the chamber generated simultaneously when the humidity in the portion of the local air rises due to a metallic mesh.

Accordingly, the dehumidifying device according to the present invention can adjust, based on each applied situaton and each circumstance as required, a countermeasure against dielectrification in the entire process in the chamber so that there will be no interference with discharging air to an air exit, promotion of forming a temperature gradient adjacent to the membrane or in the chamber section, formation of a gradient in water vapor density in a local portion, temperature which is a kinetic energy source for water-vapor particles in the chamber section, and convection or a heat radiating phenomenon generated mainly in the chamber section and the air discharging section according to a gradient in a weak potential on the surface generated due to a box, component materials of the present dehumidifying device and the environment in which the materials are provided or a charging capability (electrification) in the box, or to electrostatic features of the same, or according to provision of methods for setting a setting direction of the mesh in the outer side as required or setting the mesh in the box side depending on a difference in environments in each of which the apparatus is installed, for instance, depending on a difference in regions when the apparatus is set in a region with long solar irradiation a day, a region with high humidity, a drying region such as a desert, or on sea or a high-altitude region.

The above features result in the fact that making use of a mesh is effective for generation of a gradient in temperature, especially the effects, according to dielectric effects, derived from high-specific heat as well as a high coefficient of thermal conductivity or the like due to the mesh made of metal, and promotion of a drying speed due to a ground are made use of herein.

Making use of a mesh is effective for adjustment of the humidity in a local portion in front of or back of the membrane, so that the mesh has such tendency that a grounded mesh is more easily dried and cooled, while a non-grounded mesh is more easily humidified and hard to be cooled.

On the contrary, the above features result in the fact that placement of a substance which is easy to be electrified inside the chamber promotes a humidity insulating effect in reverse electrostatically.

For this reason, it is possible to use the apparatus according to the present invention in the reverse way, by introducing humidity in outside air, as a humidifying device which can hold humidity inside thereof at a constant level by insulating a conductive porous body to be provided therein or providing a large amount of substances each of which is easily electrified and is high in water absorption such as styrene foam or the like in the chamber.

Namely, the dehumidifying device can easily be changed to a humidify insulating device by providing a metallic mesh which is not grounded and a substance (e.g. styrene foam or the like) which is easily electrified and is high in humidity insulation between chambers.

It is found by the test that interfering elements in a flow according to a conductive porous body provided adjacent to a position between the chambers affect the humidity.

In Graph 2 and Graph 4, spaces among the membranes in the direction of the Y axis indicating the humidity inside the box, that in an inner side chamber, that in an outer side chamber, and that in the side of outside air are equal to each other, so that, in a case where fluctuations in a spreading speed therebetween are compared to each other, an influence of the convective volume in a chamber on the humidity therein is proportional, and a gradient in the humidity between the chambers is substantially proportional to an angle of the gradient in temperature assuming that a volume in each chamber is set to 1:1, and for this reason, high efficiency can be expected if a volume of a chamber is efficiently designed by applying the above condition thereto.

The spaces between membranes are set to be equal in the experiment in the embodiment.

As for setting of moisture permeability and air permeability in each membrane, in a case where membranes are arranged so that moisture permeability and air permeability thereof decrease or increase in the direction from outside air to the box side, namely, as a result of this intentional arrangement, a gradient in temperature occurs between chambers in a case where, by considering on a distance between membranes as a boundary between chambers or on a volume of each chamber so that the distance or the volume thereof is convenient for generation of a gradient in temperature between chambers according to specifications specific to each region, setting of a distance or a volume in each membrane forming a chamber as a radial cooling space for the air passing through each membrane is decided as most appropriate one as necessary taking into consideration influences thereon of a convection in the chamber, radial cooling, a convection controlling fin set in a conductive porous body or inside the chamber or the like. For instance, cool air in the outer side is set so that air permeability therein increases along the direction from the side of outside air to the box side, and for this reason, especially in a case where the temperature in the box is higher than that in outside air, the chamber is affected more strongly by the temperature in the box side than by that in outside air, consequently, along the chambers each provided in the direction from the box side to the outer side, temperature therein gradually decreases.

Reversely, warm air in the outer side is set so that the moisture permeability therein gradually decreases along the direction from the outer side to the box side, and for this reason, water-vapor particles are hard to be flown into the box side.

A rise of temperature and a decrease of an existing rate of water-vapor particles in each volume are required for a decrease of humidity, so that higher temperature in the box side as compared to that in the opening side of outside air in the apparatus is more convenient for a better dehumidifying effect.

As application of a mesh, it is possible to control a convective phenomenon according to provision of both substances each with conductivity and each with non-conductivity, or both a substance with electrically low resistance and that with electrically high resistance therein.

The reason is because it can be understood from the fact that nonuniform dispersion in temperature has been recognized on the membrane at the time of discharging air or of sucking air and fluctuations in temperature have occurred in the thermal image observation of the third membrane. Namely, generation of fluctuations in electrostatic potential in accordance with a slight fluctuation in temperature indicates fluctuations in density in water vapor in the portion, which can be supported also by the fact that the electrostatic potential in the same portion according to electrification of water vapor is also fluctuated.

With this method as described above, the dehumidifying device can be designed so that a dehumidifying effect can effectively be achieved without preparation of various types of membrane required for changing specifications according to a difference in regions.

This method can also be an extremely important element for its minimization and reduction of manufacturing costs.

When conductive porous bodies identical to each other, for instance, a substance with conductivity and that with non-conductivity or a substance with electrically low resistance and that with electrically high resistance are provided on a surface of a copper metal together with each other, a concentric circle shape or a wave-front shape of a membrane is effective in a case where the conductive porous body is applied to a landscape type for a small box (provision of a sectional-typed membrane) and in a case of a portrait type for a large box (a case of a multi-tubular type), it is effective to provide membranes each in a band shape on upper and lower portions of the tubular construction or to configure membranes along the upper and lower portions in a wave-front shape at the portion of multi-tubular.

Furthermore, when meshes such as those made of nylon or the like which have preserative of temperature insulation and can be positively electrified are to be used as supporting bodies for a moisture-permeable waterproof membrane, by using the meshes on both sides of the waterproof membrane as supporting meshes, it is possible to prevent adhesion of dusts onto a moisture-permeable waterproof membrane with reduction of a dehumidifying effect in the dehumidifying device without giving any damage thereto.

Embodiment of Claim 10

A portion of a Peltier's electrothermal element is configured to prevent a bad influence due to a leakage current from the electrothermal element by being electrically insulated from a conductive porous body in either a cooling side or a heat radiating side respectively, so that it is possible so as not to give damage to a function of the conductive porous body.

The cooling side and the non-cooling side (a side of high temperature) of the electrothermal element (a Peltier element) are connected to a convection controlling fin through an insulating body so that a leakage current can be prevented and thermal transfer can efficiently be conveyed to spaces between the chambers.

A safety device may be incorporated in the apparatus for restricting the upper limit so as not to be overworked.

Driving of the thermal element may automatically be controlled with a microcomputer by providing a temperature sensor or a humidity sensor in, for instance, a space closed in the tube, in a bottom of a chamber in the opening side of a box side, or in a chamber in the opening side of the outer side.

Embodiment of Claim 11

Painting with a difference in rates absorbing infrared rays may be applied to the surface of an axis of the apparatus or to a position on the periphery in which desired features are performed so that a difference in temperature due to absorption of radiant heat will be generated.

For instance, the painting with a low absorbing rate is applied adjacent to a flange of the apparatus, and is not applied to places other than the flange thereof or painting with a high absorbing rate is applied thereto.

FIG. 2 and FIG. 3 show tables of the comparisons among waterproof membranes respectively.

FIG. 2 and FIG. 3 are a graph showing each ratio in a case where moisture permeability and air permeability of a particular membrane is set to 1.0 to arrange the membranes as described above if a number of types of membrane are available (refer to Graph 1 described above for a detailed example) and a graph indicating moisture permeable×air permeable.

FIG. 2 shows a comparison of moisture permeability in the membranes (each ratio when the membrane 1108-N40C is set to 1.0).

FIG. 3 shows a comparison of air permeability in the membranes (each ratio when the membrane 1108-N40C is set to 1.0).

In a case of a landscape type of the apparatus (a case where a sectional type is provided), and in a case where a volume of each chamber and a distance between membranes are fixed, there may be conceivable a case where functions in the apparatus and the box can not quickly be adapted to a natural harsh environment under which they are put.

Herein, matters especially needed to be considered for the apparatus are an environment of temperature and fluctuations in atmospheric pressure.

Figure 26:
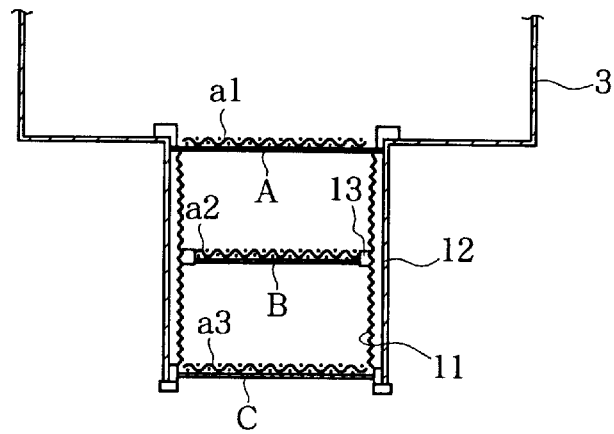
FIG. 26 is an explanatory view showing another embodiment of the dehumidifying device.
Figure 27:
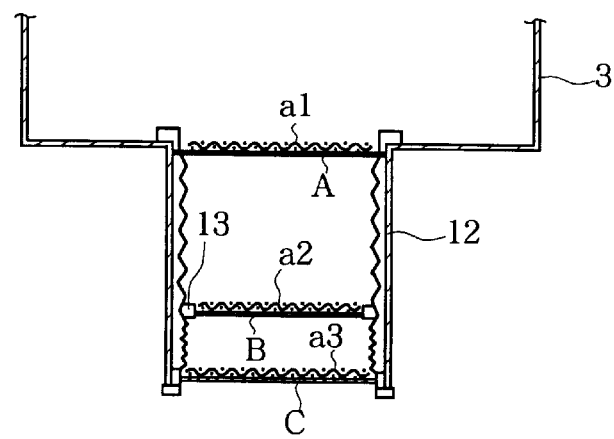
FIG. 27 is an explanatory view showing another embodiment of the dehumidifying device.
Figure 28:
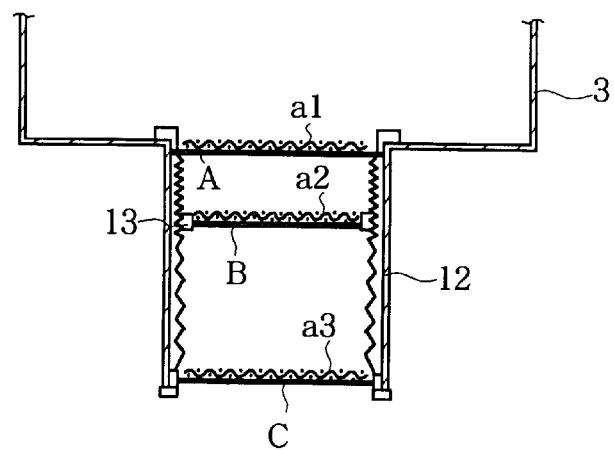
FIG. 28 is an explanatory view showing another embodiment of the dehumidifying device.

In the case as described above, as shown in, for instance, FIG. 26, in a case where a number of chambers are double-layered, namely, in a case where three sheets of waterproof membrane (functional porous membrane) with moisture-permeable micro-throughholes are used, each waterproof membrane and conductive porous body are fixed with frames 13 so that stress and relax will not occur to each waterproof membrane or the conductive porous body a2, and the frames are guided by an extendable internal wall 11 of the chamber so that the membranes move in parallel to each other as a rule along the chamber space, and the outer side as well as the box side in the internal wall 11 are tightly fixed to the external wall 12 of the chamber at the ends of the moving space of the frames or the like so as not to loose the hermeticity of each chamber, and in movement of the second membrane as well as the conductive porous body a2, or only the second membrane B, only the conductive porous body belonging to the second membrane, or of only a fin if a convection controlling fin belonging to the second membrane is provided, the membranes or the conductive porous bodies are set to move in parallel to each other as a rule to the outer side or to the box side taking into consideration convective volume in the box-side chamber or in the outside air-side chamber, a volume required for agitation generated due to a convention required for radiant cooling, a speed of air to pass through the chambers, or an effect of the convection controlling fin provided on the conductive porous body or inside the chamber, so that the position of the second membrane B, the conductive porous body, or the conviction controlling fin or the like moves to the box side or to the outer side with temperature in the outside. FIG. 27 shows a simulated view when the temperature in the box or in outside air rises, or when pressure in outside air decreases. FIG. 28 shows a simulated view when the temperature in the box or in outside air drops, or when pressure of outside air increases.

Figure 29:
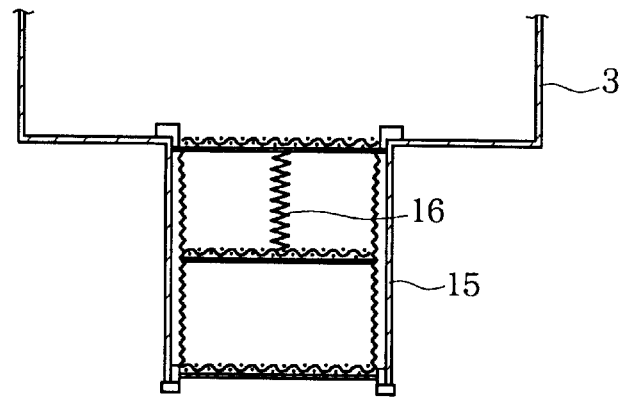
FIG. 29 is an explanatory view showing another embodiment of the dehumidifying device.

FIG. 29 shows a simulated view of an arrangement of a moving means in a case where a shape-memory alloy 16 is used as the moving means.

Figure 30:
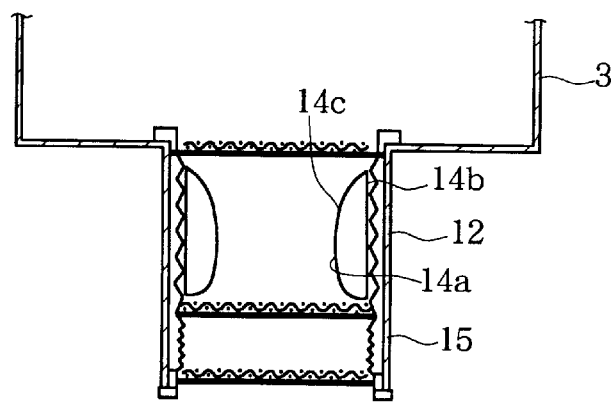
FIG. 30 is an explanatory view showing another embodiment of the dehumidifying device.
Figure 31:
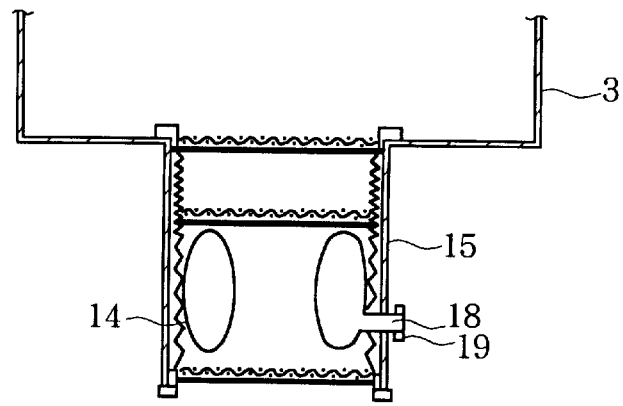
FIG. 31 is an explanatory view showing another embodiment of the dehumidifying device.

FIG. 30 and FIG. 31 show model views each of a moving system of a movable frame in a case where a frame is designed with special attention to fluctuations in atmospheric pressure.

Then, the movement is performed by a moving means according to fluctuations in temperature in the external wall 12 or to heat conduction from the mounting section in the box side without power supply.

As types of the moving means, a shape-memory alloy or a balloon or the like is included.

Herein, there will be summarized an effect inside and outside of a small chamber formed by conductive porous bodies or that obtained by providing moisture-permeable waterproof membrane together with the conductive porous body based on a result obtained from the test result in the embodiment.

Features of a Metallic Grounding Mesh

1. It is easily dried as compared to the equivalent mesh (a conductive porous body) which is not grounded.

2. By selecting any substance with high-specific heat as a component substance constituting a mesh (a conductive porous body), an environment of a lower temperature than that in the circumstances can be generated in a local area or adjacent to the local area set in the mesh (conductive porous body). In this step, if the mesh (conductive porous body) comprising component substances each with the same specific heat is made thinner, a volume of the mesh (conductive porous body) decreases, so that this effect (a drop of temperature inside the mesh (conductive porous body) or adjacent to the mesh) decreases.

The higher an area density of a hole is, the less air permeability is, but if there are more number of structures that interfere with a flow of the mesh (conductive porous body), the air permeability furthermore decreases.

Herein, the flow-interfering structure as described above is a component element which may interfere with proceeding of a flow of gas in the direction to which the flow passes through the mesh, and indicates a three-dimensional structure for interference (a zigzag structure of the mesh or the like) so that the flow can not pass through the mesh if the flow does not go along another alternate route as proceeding.

3. It is electrically neutral, because it is grounded.

It can make gas passing therethrough electrically neutral. On the other hand, it can be an electrode for ionized wind.

4. In a case where a component substance comprises a metal, for instance, if copper fabrics or the like are used, an oligodynamic action is expected, so that, for instance, mold such as trichophytosis or the like existing in a natural environment can be prevented from multiplication on the mesh (conductive porous body). Also an eumycetes which is found in many cases in the field proofing agent or a material containing a fungicide may be used as required at conductive porous body or in some other area in consideration of electrification thereof.

5. Also in a case where meshes such as those made of nylon or the like, by moving them adjacent to the grounded meshes, which have insulation and can be positively electrified are used for both sides of the body as supporting meshes, it is possible to prevent adhesion of dusts onto a moisture-permeable waterproof membrane with reduction of a dehumidifying effect in the dehumidifying device without giving any damage thereto. Because the observation on three types of membrane which are used for one and half year with a microscope in Experiment G2-1 is resulted in that any large dusts could not be found on any of the membrane.

6. A dust removal effect can be promoted without requiring a power source.

7. When a mesh in a direction to cut off the flow of gas is to be provided in the direction of gas to pass through the mesh, and if it is provided on an entire surface of, the flow can be stabilized in a case where it is provided in a portion functioning like a valve (e.g. the entire surface of a circle of section in a landscape type), for instance, stabilization of the flux is such that, if the mesh (conductive porous body) is provided on a ring-shaped concentric circle inside the periphery of the circle of section in landscape-type, the flow tends to occur in the side of discharging air (because in many cases temperature in a tubular component substance, in which temperature in an outer tube thereof tends to be low, is lower than that in air around the tube even in a case where a resin or metal is used for the substance), or if the mesh is provided on a concentric circle section of the central side in an inner concentric circle, the flow tends to occur in the side of sucking air.

If any substance with a higher coefficient of thermal conductivity according to physical features of a mesh is selected, it is easier to unify a temperature distribution of a membrane by providing a single membrane adjacent to the mesh or near the mesh.

The above effect is supposed to increase in proportion to a thickness of the mesh or to a number of meshes which are superimposed on each other, however, if it is too thick, the effect will be reduced.

That is because, in a case where meshes are superimposed on each other, for instance, a temperature distribution (nonuniformity) has occurred in the superimposed meshes.

There is a stronger tendency in which temperature in the flow passing through the mesh changes to the temperature in the mesh itself in proportion to the thickness of the mesh or to an increase of a number of meshes which are superimposed on each other under the exception of the temperature of the passing air, and also flows are influenced by the structure of the meshes.

8. Provision of a mesh (conductive porous body) for the purpose of stabilization of a gradient in temperature in a local position in front of and back of a moisture-proofing waterproof membrane or adjacent thereto simultaneously generates a rise of a density of water vapor locally in front of and back of the same mesh (conductive porous body) or adjacent thereto in a stage in which a speed of the flow adjacent to the mesh (conductive porous body) in the dehumidifying device is still slow.

9. As an effect due to generation of ionized wind although the effect is supposed to be extremely small, depending on selection of any of moisture-permeable waterproof membranes, ionized wind can be stabilized according to features of the surface potential thereof in a case where ionized wind occurs, or there is a dielectric effect or the like to electrified gas, due to generation of ionized wind, or as an element that can interfere with the electrostatic physical features which the moisture-permeable waterproof membrane originally holds when the dehumidifying device (portrait type, landscape type) is used under such environment that electrification in the box side or in the outer side is supposed to occur.

Figure 19:
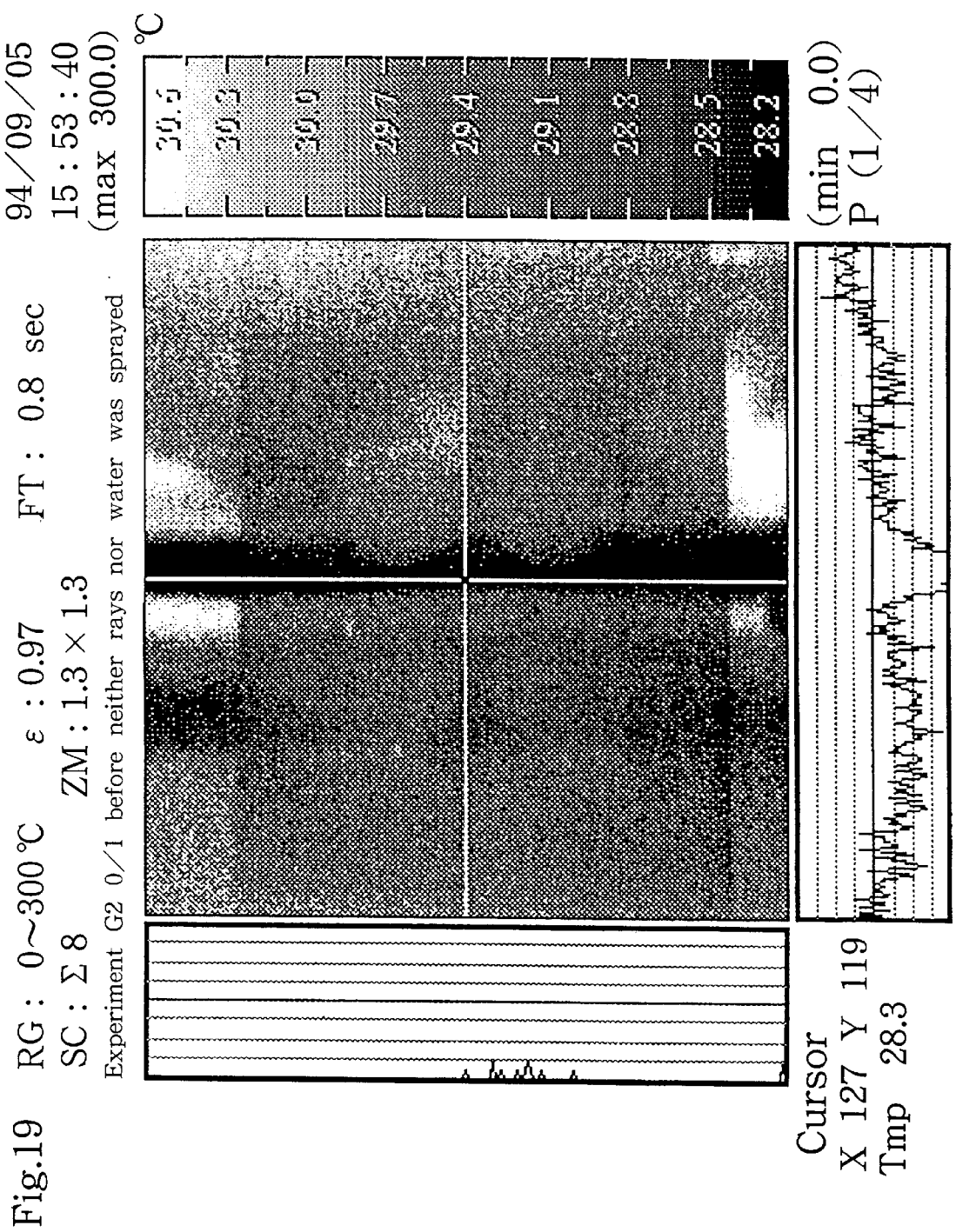
FIG. 19 is a view showing image processing for meshes.
Figure 21:
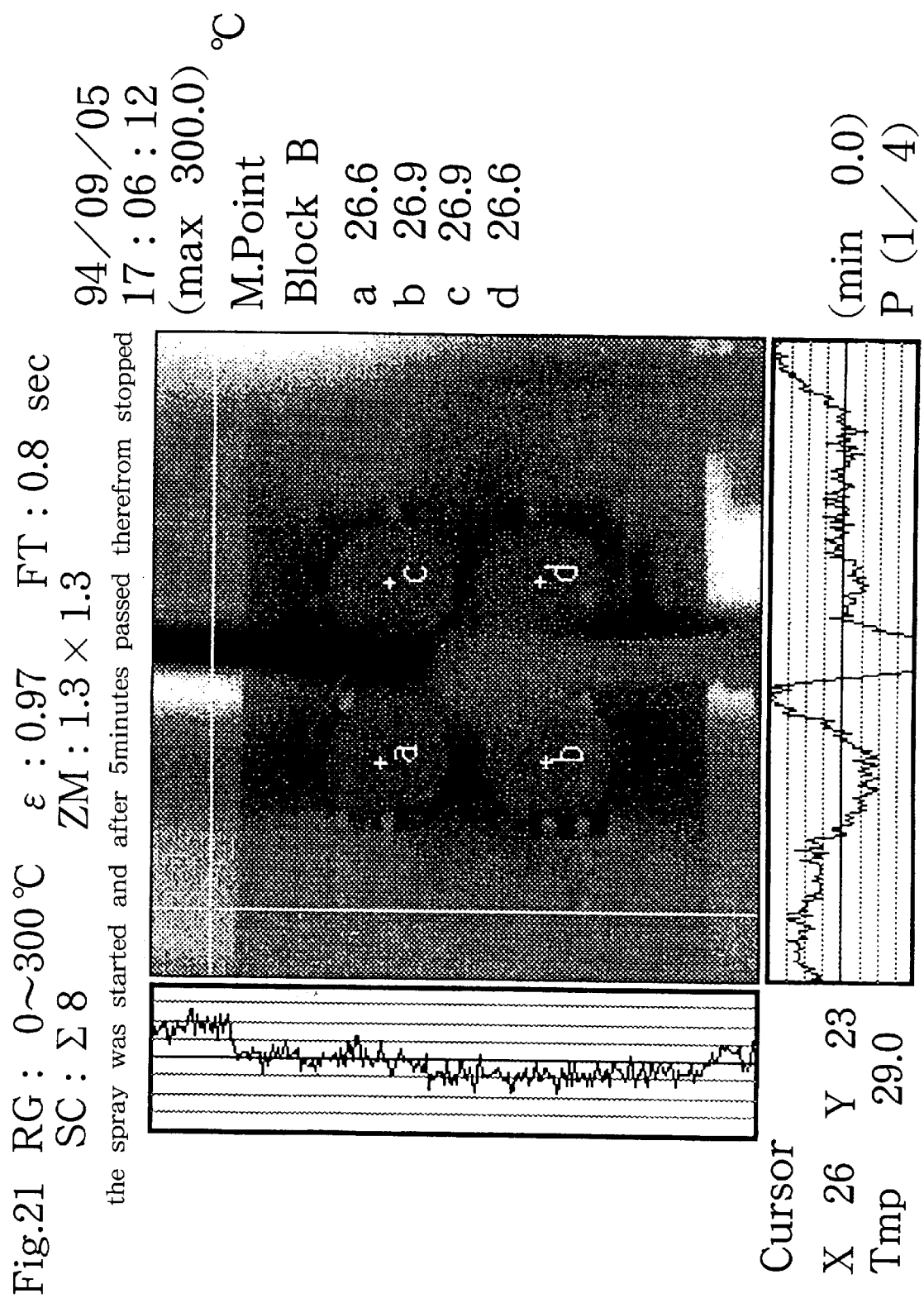
FIG. 21 is a view showing image processing for meshes.
Figure 22:
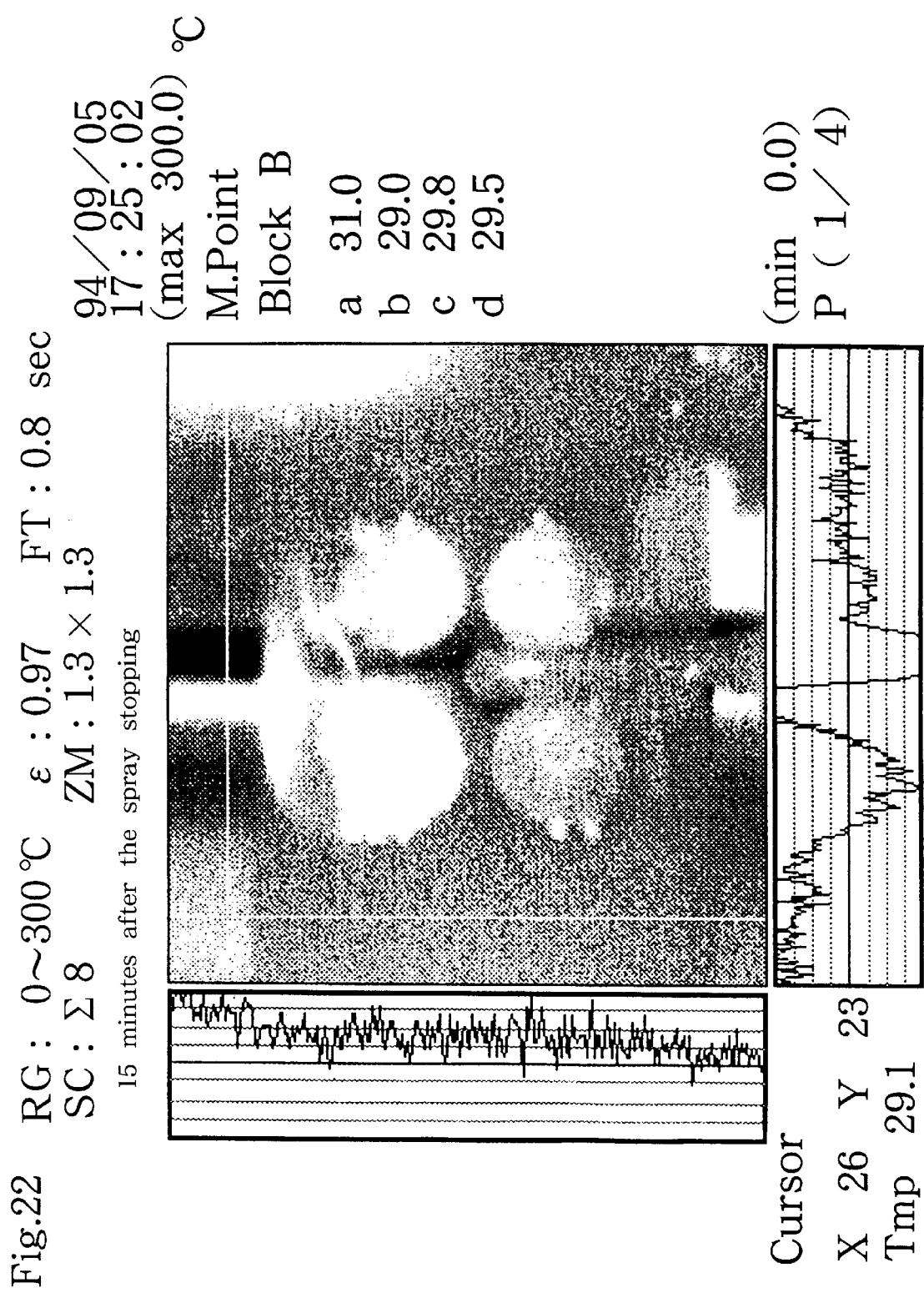
FIG. 22 is a view showing image processing for meshes.

Water is sprayed by an ultrasonic spraying device onto four types of mesh in total with #41×80 mesh φ 86 mm and #34×32 mesh φ 86 mm, which are grounded and are not grounded respectively, fluctuations in temperature for each on the same time are recorded in thermal images, and changes of state of the meshes up to dry thereof and fluctuations in the temperature thereon were observed with thermal images. In FIG. 19, FIG. 21, FIG. 22, the four types of mesh a, b, c, d are provided in a clockwise direction from the left upper side, and the mesh a indicates one with #41×80 mesh φ 86 mm which is grounded. The mesh b indicates one with #34×32 mesh φ 86 mm which is grounded. The mesh c indicates one with #41×80 mesh φ 86 mm which is not grounded, and the mesh d indicates one with #34×32 mesh φ 86 mm which is not grounded. Each of the meshes a, b, c, d is fixed to an acrylic plate having a thickness of the rear surface of about 1 mm with an 18 mm-acrylic square bar.

FIG. 19 is a thermal image analyzing view which shows thermal images of the four types of mesh in a state in which neither they are irradiated with rays nor water is sprayed again thereonto and also the meshes are not irradiated with infrared rays from a heat source. A significant difference among the four types of mesh is not recognized herein.

Figure 20:
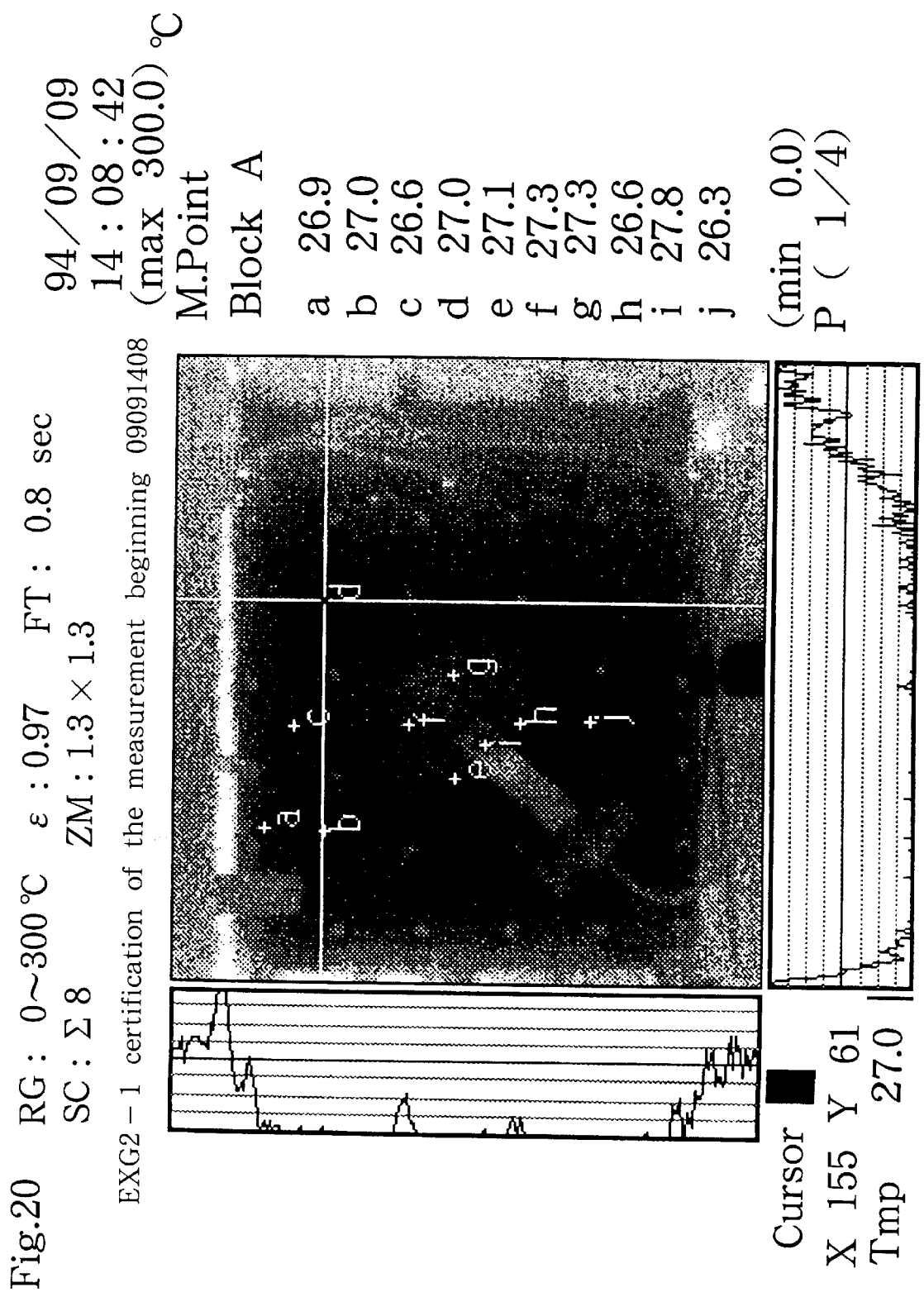
FIG. 20 is a view showing image processing for meshes.

FIG. 20 shows thermal images obtained by photographing a humidifying state of the dehumidifying device for a test, from the lower side thereof, mounting a membrane therein according to the arrangement employed in Experiment G2-1. Dispersion in the section corresponding to the membrane as well as in temperature on the surface thereof can be recognized. A hammer-shaped image in the figure in which the reference code i is positioned shows a sensor.

FIG. 21 shows a thermal image in a state in which rainwater was sprayed onto the meshes and the spray was stopped after 5 minutes passed therefrom. The figure shows a state of temperature in each of the meshes obtained by cooling supporting bodies for supporting the four types of meshes and the meshes according to the spray of rainwater thereonto and the meshes were changed to black. It should be noted that a spraying position is a center of a, b, c, d in the figure, and a band-shaped image indicating rather high temperature in the vertical direction between the meshes b and d is a nozzle of the spraying device.

FIG. 22 is a thermal image obtained immediately after processes of stopping the spray onto the meshes, and irradiating thereonto with infrared rays from the heat source for about 5 seconds after 15 minutes have passed from the stop to immediately stop the irradiation.

It is supposed that an image brighter in color in the figure indicates that it is more dried.

Figure 23:
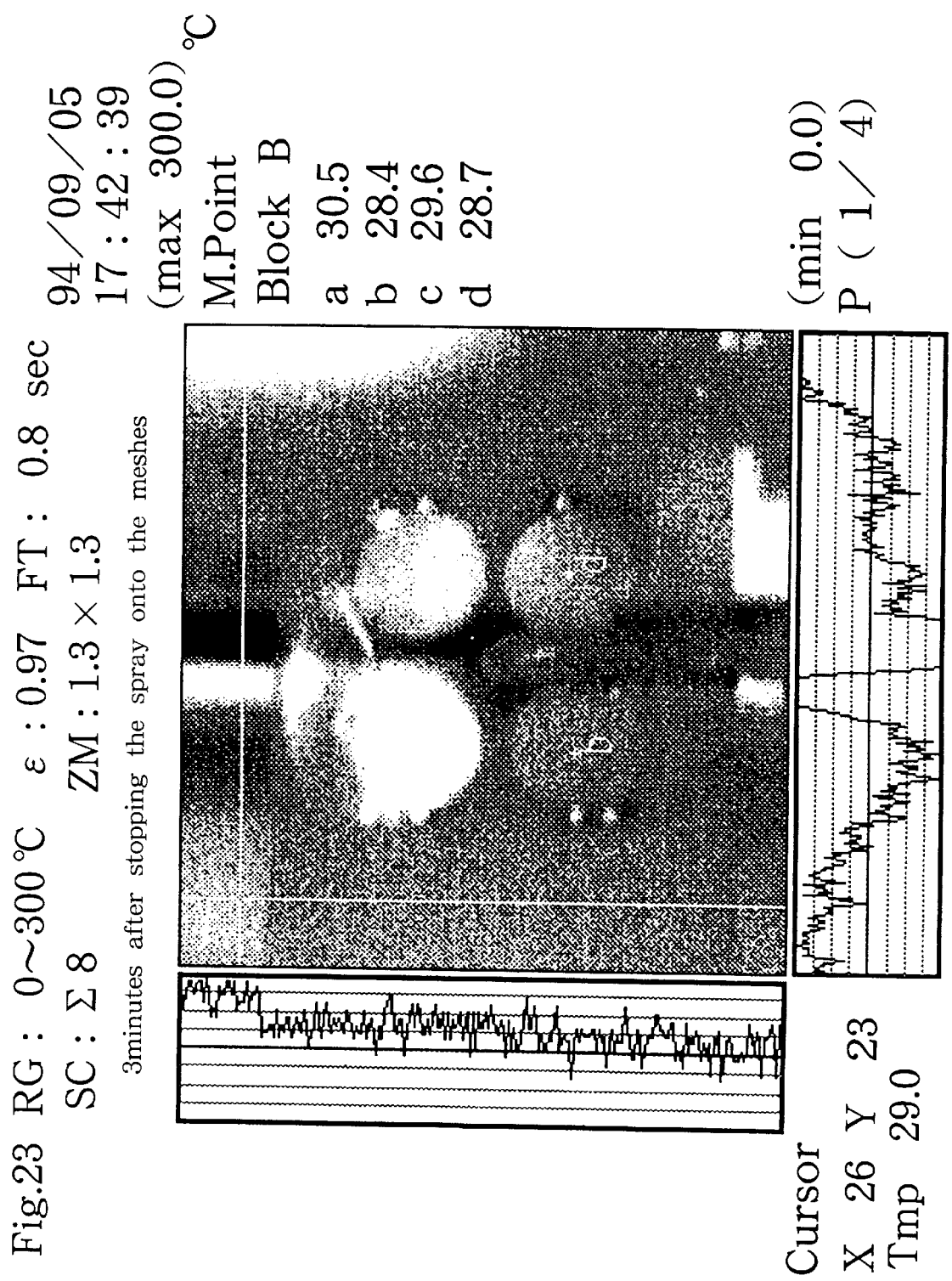
FIG. 23 is a view showing image processing for meshes.

FIG. 23 is a thermal image obtained immediately after processes of stopping the spray onto the meshes, and irradiating thereonto with infrared rays from the heat source for about 5 seconds after 3 minutes have passed from the stop to immediately stop the irradiation.

It is supposed that an image brighter in color in the figure indicates that it is more dried.

Conclusions

1. The mesh with #41×80 mesh φ 86 mm dries quicker, while the mesh with #34×32 mesh φ 86 mm dries slower.

2. Both of the meshes with #41×80 mesh φ 86 mm and #34×32 mesh φ 86 mm dry quicker when they are grounded.

3. The meshes are described as follows in order of decreasing drying speed:

$$a>b>d>c$$

Recorded on Sep. 5, 1994 17:25:02, 015 passed after the spray was stopped. (FIG. 22)

(An after-image of a heat source after irradiated with the heat source for about 5 seconds photographed by the thermal image)

4. Data, in which four types of mesh (conductive porous bodies) are arranged and a comparison among drying speed thereof is made, is used, and if the mesh (conductive porous bodies) is adjacent to a waterproof membrane, the features of a substance with high specific heat occur at the position in which both of them exist or at a place adjacent thereto because it is clear that specific heat of the mesh (conductive porous body) is higher than that the membrane (moisture-permeable waterproof membrane). Accordingly, the occurrence of the features as described above generates a rise of a density of water vapor locally in front of and back of the membrane or in a place adjacent thereto.

Result of Measurement

Figure 24:
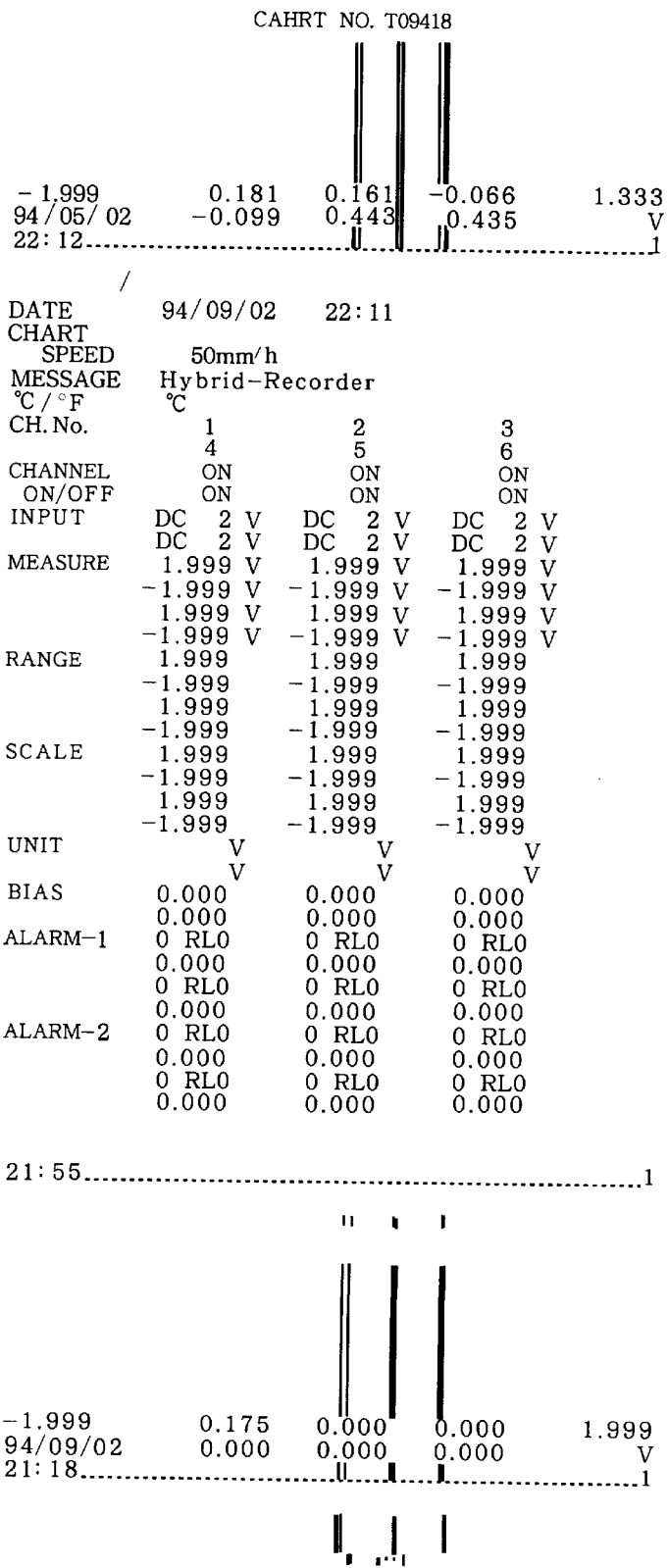
FIG. 24 is a measurement view of a surface potential voltage on the surface and rear surface of each membrane when Experiment G2-1 is started.
Figure 25:
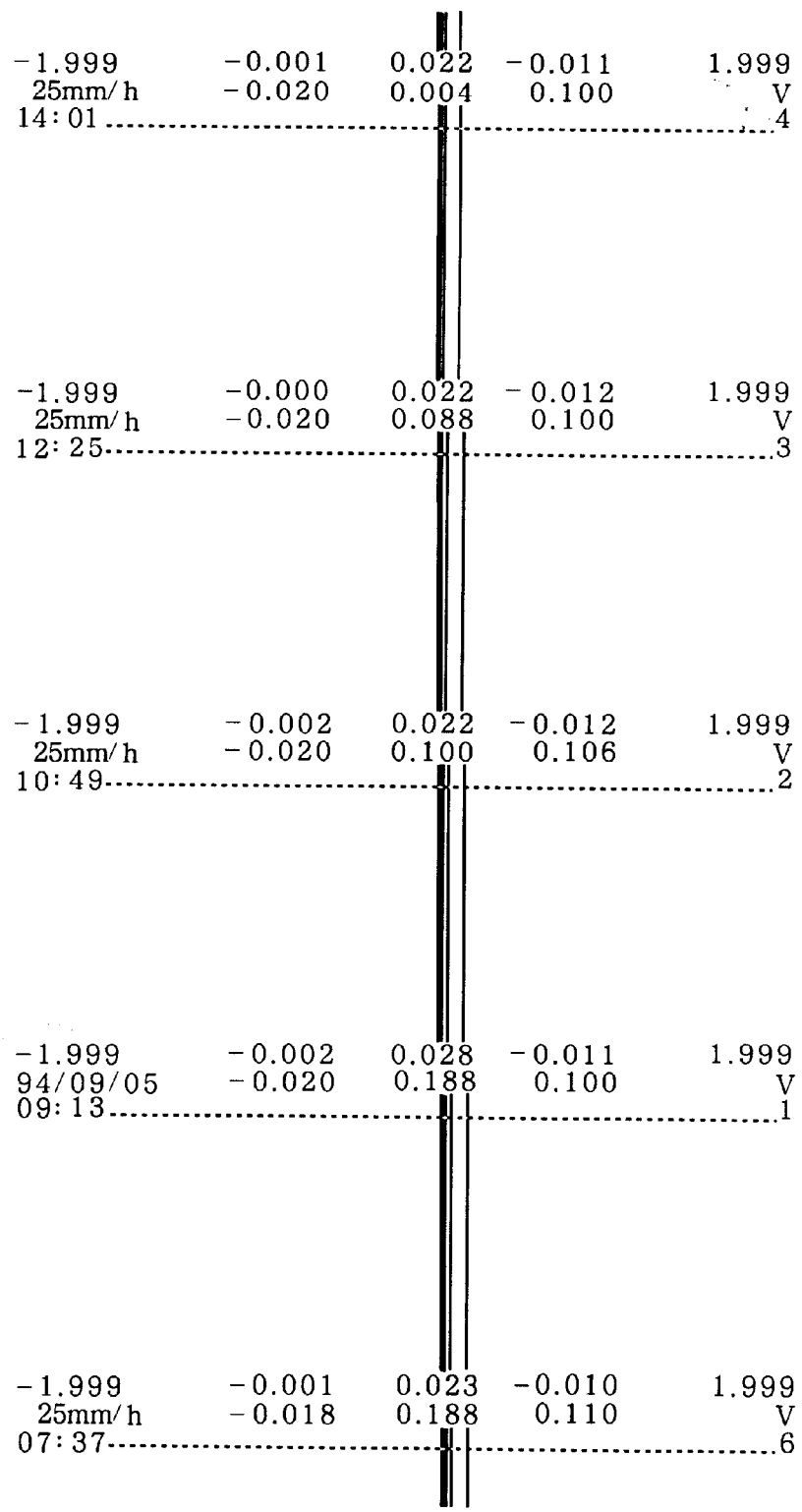
FIG. 25 is a measurement view of a surface potential voltage of the membranes when Experiment G2-1 is ended.

FIG. 24 is a view of measuring a surface potential on the surface and rear surface of each waterproof membrane immediately after Experiment G2-1 is started, and FIG. 25 shows a result of measurement at the time of ending of the experiment. Both of the views are measured views each obtained by measuring surface potential on the surface and rear surface of each of the membranes respectively, and a first channel is a measured view of surface potential in the outer side of the third membrane, a second channel in the side of the outer side chamber in the third membrane, a third channel in the side of the outer side chamber in the second membrane, a fourth channel in the side of the inner side chamber in the second membrane, a fifth channel in the side of the inner side chamber in the first membrane, and a sixth channel in the box side of the first membrane. Measured values are written in a row of date and time, and in the side-to-side direction of the graph, the center thereof indicates 0V, the left edge indicates −1KV, and the right edge indicates +1KV.

With a result obtained from FIG. 24 and FIG. 25, it is found membranes as a boundary for forming chambers resulted in gradually being at the same potential to be close to the surface potential 0 in a process in which a dehumidifying function works although the above fact is assumed as a result of that a moisture absorbing rate due to absorption of water vapor by each of the membranes might increase.

Herein, as for a moisture-absorbing state of a membrane, it is assumed that numbers of gas-permeable holes existing on the membranes are saturated with water vapor in comparison of a case where the moisture absorbing rate in the cited reference does not show a large amount thereof to the contents of results obtained from two types of measurement shown in FIG. 24 and FIG. 25, accordingly, it is assumed that the surface potential on the surface of the membrane might have approached zero (0).

It is understood from the results described above that, in the dehumidifying device based on the system according to the present invention, the thickness of a membrane which is made as thicker as possible is advantageous for efficiently improving the movement of water vapor in chambers bounded by each of the membranes as described above, and by adjusting the thickness of a moisture-permeable waterproof membrane (thickness diameter of a gas-permeable pore), the air permeability thereof may be adjusted so that a gradient of a density in each chamber can easily occur.

Selection of a substance with high insulation and a low moisture absorbing rate or a low water absorption is more advantageous.

Reversely, it can also be derived from the results described above that numbers of air-permeable pores existing on the moisture-permeable waterproof membranes are saturated with water vapor and the surface potential on the surface of the membrane changes the thickness of the membrane as time passes and with the dehumidification, whereby moisture permeability can be adjusted.

It is conceivable that the saturated phenomenon with water vapor in the moisture-permeable waterproof membrane might be such a phenomenon that, in a case where chambers are under static pressure, namely a gas moving rate between chambers is extremely low, at first, dielectric polarization between water-vapor particles occurs due to electrostatic power, then the water-vapor particles existing in numbers of pores in the membrane stay therein while receiving a dielectric relaxation phenomenon from the membrane. In this case, conductive elements such as white gold, gold, silver, and copper or the like may be provided in the internal wall of the pore inside of conductive porous body of the pore or in one side of the membrane as a border of chambers according to a means such as evaporation or the like.

Also, it may be designed so that a gradient in potential inside the pore will occur.

Accordingly, it is conceivable that the water-vapor particles existing in numbers of pores in the membrane adjacent to the grounded conductive porous body tend to be dielectrified, while the water-vapor particles existing in the numbers of pores in the membrane opening toward the chamber side in the opposite side thereof tend to approach a state depending on electrostatic features (electrified rows and an electrified rate) which the membrane itself holds.

For this reason, the arrangement of the conductive porous body shows, as described above, effects to the relaxation phenomena of the dielectric polarization of water vapor inside numbers of pores existing the membrane itself, so that it is conceivable that dehumidifying effect can be promoted.

In a case where only the surface of a membrane is considered, contact of a moisture-permeable waterproof membrane with a conductive porous body may interfere with, if water-soluble metal elements are more or less leaked out from the conductive porous body, electric insulating features and electrostatic features which the moisture-permeable waterproof membrane itself holds, so that it is required to provide a conductive porous body and a moisture-permeable waterproof membrane without contact with each other in the dehumidifying device according to the present invention.

That is because, depending on climatical environments, it is quite possible to estimate a case where dew condensation may occur in the portion of a conductive porous body.

As means for solving the problem, there are effective means, one of which a stressed conductive porous membrane is provided; and another one of which, as a countermeasure against thermal expansion or contraction, a 3D solids wave-front form to the direction of the membrane of the conductive porous body is provided in a position decided after consideration of the dielectric relieving effect and convection of gas inside a chamber, and also in the same moisture-permeable waterproof membrane, the thickness of the membrane is changed as a countermeasure against thermal distortion as described above, for instance, a sectional type of membrane in the dehumidifying device is provided so that the thickness of the membrane is made thicker in a connection section between the dehumidifying device and the membrane and the thickness thereof is made gradually thinner in the central section thereof; and in this case, countermeasures against prevention of a pore form from distortion has to be executed by changing the thickness of a moisture-permeable waterproof membrane as necessary according to specifications based on each local characteristics taking into consideration, in addition to the purpose of making smaller distortion of the pore in the membrane, convection inside spaces in chambers, and relaxation phenomena of water-vapor particles existing inside of numbers of pores in the moisture-permeable waterproof membrane.

As for a change of a moisture absorbing rate and electric conductivity of a polymer membrane, there is disclosed a change of electric conductivity along the direction of the membrane due to moisture absorption in a case of an ordinary polymer membrane in [Handbook of Static Electricity: Published by Kabushikigaisha Chijin shokan; Editor: Polymer Association; Published on Oct. 11, 1990, the 11th impression of the second edition; ISBN4-4852-0017-0 C3042, From 1.15 in page 40 to page 41].

In the above cited reference, both a case of a large moisture absorbing rate and a case of a small moisture absorbing rate are described, however, the moisture-permeable waterproof membrane used in the present application assumes that a moisture-permeable waterproof membrane showing physical features mainly with a small rate of moisture absorption or a small capability of water absorption is used.

As supplementary countermeasures, in a case where temperature in air to be breathed is extremely high, especially in a case where the apparatus is quite possible to be provided under high temperature conditions, or in a case where the temperature in the box side increases extremely high, as a substance with high radiant heat and having a volume required for cooling of the air passing through the membrane as well as with high thermal conductivity, for instance, an aluminum fin for cooling is provided in each chamber as a space for convection which is also a radial cooling space, or in the air exit port or in the air sucking port in the dehumidifying device, and also the membrane is provided in a position in consideration of the thermal radiant features of the conductive porous body, which makes it possible to reduce a volume required for a chamber or a size of the apparatus.

On the other hand, the features described below can be obtained by providing a carbon fiber mesh (electric weak conductive porous body) therein. Herein, the weak conductive porous body indicates a so-called resistant body and includes also, for instance, metal oxide or the like.

Summarize of Effects due to Provision of a Weak Conductive Porous Body Adjacent to a Membrane Effects due to provision of synthetic-resin mesh such as a carbon-fiber mesh or the like.

1. Stabilization of a gradient in local temperature in front of and back of a moisture-proofing waterproof membrane or adjacent thereto in the synthetic-resin mesh is inferior to that in a case of metallic mesh (conductive porous body).

When a mesh in a direction to cut off the flow of gas is to be provided in the direction of gas to pass therethrough, and if it is provided on an entire surface thereof, the flow can be stabilized in a case where it is provided in a portion functioning like a valve (e.g. the entire surface of a circle of section in a landscape type), for instance, stabilization of the flow is such that, if the mesh (conductive porous body) is provided on a rink-shaped concentric circle inside the periphery of the circle of section in landscape-type, the flow tends to occur in the side of discharging air (because in many cases temperature in a tubular component substance, in which temperature in an outer tube thereof tends to be low, is lower than that in air around the tube even in a case where a resin or metal is used for the substance), or if the mesh is provided on a concentric circle section of the central side in an inner concentric circle, the flow tends to occur in the side of sucking air.

In a metallic mesh (electric conductive porous body), when a flow passes through the mesh, a drop of temperature in the flow is expected, in contrast, in the non-conductive porous body, specific heat is smaller than that of metal in a case where a resin fiber such as nylon is used therefor, so that a cooling capability of the resin-fiber mesh is inferior to a metallic mesh, and in a case where a resin fiber with a lower coefficient of thermal conductivity than that of metal is used, an effect unifying each temperature in the gradient in an internal periphery of the tube and that in a central section thereof, for instance, in a landscape type is naturally low as compared to a metallic mesh (electric conductive porous body) because of the coefficient of thermal conductivity lower than that of metal.

If any substance with a lower coefficient of thermal conductivity according to physical features of a mesh is selected, it is more difficult to unify a temperature distribution of a membrane by providing a single membrane adjacent to the mesh or near the mesh.

The above effect is supposed to be more difficult to be performed in proportion to a thickness of the mesh or to a number of meshes which are superimposed on each other, however, if it is too thick, a portion in which a temperature is locally nonuniform is made large, so that a heat insulating effect is increased as well as a moisture insulating effect is also enhanced.

That is because, in a case where meshes are superimposed on each other, for instance, a temperature distribution (nonuniformity) has occurred in the superimposed meshes, specific heat therein is low and a coefficient of thermal conductivity is low, a fluctuation rate of an electrostatic volume therein is larger than that in a portion of the membrane, and for this reason stagnation occurs therein.

There is a stronger tendency in which temperature in the flux passing through the mesh changes to the temperature in the mesh itself in proportion to the thickness of the mesh or to an increase of a number of meshes which are superimposed on each other with nothing to do with the temperature in the gas passing therethrough. In this process, a form of a structure for interfering air permeability in the mesh is largely affected by the temperature fluctuations. That is the same as that in a case of metallic mesh.

2. A case, that provision of an electric non-conductive porous body for the purpose of stabilization of a gradient in temperature locally in front of and back of a moisture-proofing waterproof membrane or adjacent thereto simultaneously generates a drop of a density of water vapor locally in front of and back of the same electric non-conductive porous body or adjacent thereto in a stage in which a speed of the flux adjacent to the electric non-conductive porous body in the dehumidifying device is still slow, less occurs as compared to a case where a metallic mesh (electric conductive porous body) is used.

Namely, in an electric non-conductive porous body, specific heat is smaller than that of metal in a case where a resin fiber such as nylon or the like is used therefor, so that a cooling capability of the mesh made of resin fiber is inferior to a metallic mesh, and in a case where a resin fiber with a low coefficient of thermal conductivity than that of metal is used, the coefficient of thermal conductivity is lower than that of metal, so that, in a case where a gradient in temperature occurs in the mesh, an effect of unifying each temperature in the gradient is inferior to that of a metallic mesh.

However, in a case where temperature fluctuations before and after a flow passes through the mesh is considered, and in a case where a material with low specific heat and a lower coefficient of thermal conductivity is used for a mesh, a heat insulating effect is stronger opposite to a case of the metallic mesh (electric conductive porous body) if a speed of the flow is sufficiently slow.

3. The dielectric effect in front of and back of the moisture-permeable waterproof membrane (a moisture-permeable membrane) for stabilizing a gradient in an electrostatic volume in a chamber depends on the conductivity thereof.

4. This kind of phenomenon can be realized also by providing a plurality of concentric circular rings.

5. As an effect due to generation of ionized wind though the effect is supposed to be extremely weak, depending on selection of any of moisture-permeable waterproof membranes, if any material with a low coefficient of water absorption is selected in consideration of stabilization of an ionized wide (depending on selection of features of the material for a mesh) in a case where ionized wind occurs as well as of the electrostatic features thereof, the mesh can easily maintain its dry state and can also easily maintain the potential at a high level with no end of them according to features of the surface potential thereof.

Accordingly, in contrast, any material with a low coefficient of water absorption and low conductivity (e.g. a substance such as thin asbestos, or thin glass fibers or the like) is easily and positively electrified, and in a case where any material with a high coefficient of water absorption and low conductivity is used as a mesh, the potential of the mesh approaches potential 0 quicker, while in a case where any material with a low coefficient of water absorption and also low conductivity is used as a mesh, the material can sometimes negatively electrified (e.g. styrene foam), and depending on selection of these physical features used for a mesh, a gradient in potential between the material and a moisture-permeable waterproof membrane (moisture permeable membrane) occurs, and ionized wind occurs although it is extremely weak.

6. When the dehumidifying device (portrait type, landscape type) is used under such environment that electrification in the box side or in the outer side is supposed to occur, a drop of electrification due to generation of ionized wind or to electrified gas as an element that can interfere with the electrostatic physical features which the moisture-permeable waterproof membrane originally holds, and the dielectric effect depends on the conductivity or electric resistance according to the component substance of the waterproof membrane, so that if any substance with higher electric resistance is used, the dielectric effect decreases more.

The specifically described configuration of the present invention is not limited to the embodiments described above, and it is to be understood that design variations or the like without departing from the spirit and the scope of the invention will also be included in the present invention.

For instance, electrically grounded conductive porous bodies are successively provided and grounded in a vent path used in the dehumidifying device with a conducting line provided in a vent pipe, and a box is mounted on a mounting section of the dehumidifying device, whereby a grounded route of the vent path may be connected to the ground in the box side.

The dehumidifying device may also comprise a tubular body provided in a wall section of a box and forming a vent path for air communication between inside and outside of the box; a conductive porous body electrically grounded provided adjacent to at least one side of a waterproof membrane having moisture-permeable micro-throughholes and of which an electric resistor for an insulating or grounding line is connected to the other side thereof; and a vent body for arranging at least three types of vent paths each comprising the waterproof membrane and electric conductive porous body to make a pair therewith at a space from each other inside the tubular body to shield an inside space of the tubular body into at least two chambers.

The dehumidifying device comprises a tubular body provided in a wall section of a box and forming a vent path for air communication between inside and outside of the box; a conductive porous body electrically grounded provided adjacent to at least one side of a moisture-permeable waterproof membrane and of which an electric resistor for an insulating or grounding cable is connected to the other side thereof; and at least dual tubular-shaped vent bodies each with a bottom forming a portion of the tubular wall by the vent path comprising the waterproof membrane and electric conductive porous body to make a pair therewith at an inside space of the vent path, and an inside space of the vent path is shielded into a plurality of stages in the direction from inside of the box to outside by providing the tubular-shaped vent bodies each with a bottom inside the tubular body.

A weather shade may also be provided outside of the tubular body.

Temperature sensors such as a thermistor set in each chamber, a box, or in a outer side other than a fixed resistor is used for a grounded circuit of the electric conductive porous body as a variable resistor, and by selecting thermistors (NTC, PTC, CTR, or the like) each appropriate features discretely for a vent path in each chamber, an inside or outside of the electric conductive porous body, a weather shade provided in the outside of the dehumidifying device, a solar battery section, an outside wall section, a vent path section, and a mounting section to the box side or the like according to any use environment (local characteristics) of the dehumidifying device as necessary, resistance or impedance in the grounded circuit of each electric conductive porous body may be adjusted according to a change of an external environment or fluctuations in temperature in the box side. The grounded circuit may reversibly be cut off or connected with a thermoswitch (a temperature-sensing reed switch or the like) according to a particular temperature in each section.

As a power source used in Embodiment of claim 10, a solar battery mounted on the weather shade or the wall in the box side or some other place may be used for a power source. A current rate generated in this case changes depending on a state of receiving a light, so that a drive of a Peltier's thermoelectronic element may be adjusted using a state of receiving a light.

Either a vent body heat-producing by absorbing moisture or a moisture-permeable waterproof membrane with the property of heat producing by absorbing moisture may be provided in the vent path. However, in these cases also, the moving direction of water vapor is actively controlled to promote a discharge thereof in consideration of a gradient in temperature or a gradient in water-vapor density. Also, the moving direction thereof is controlled so that a gradient therein will be reversed, which may be applied for suppression of the back flow.

The tubular body may have dual walls for protecting the body from disturbance which are used as a structure of heat insulation for a space of a chamber, whereby the structure may not be reversely affected onto generation of a gradient in temperature in each chamber.

In the most ideal method as a mounting means of the dehumidifying device, by contacting the wall section in a box side of the apparatus with the internal wall of the box having a heat-insulated layer, for instance, a box having a metallic laminating structure filled with urethane, and also contacting the wall section in the outer side thereof with the outside of the box, a dehumidifying effect can be promoted, water vapor or the like in the outer side can be suppressed to flow in the box, and effects in the apparatus capable of resisting significant fluctuations in outside air can easily be obtained.

That is because electric equipment accommodated in a box tends to produce heat in many cases and a time indicating significant fluctuation in temperature on the external wall of the box, in many case, occupies a large amount within a total dehumidifying time (in a case of Japan).

When the apparatus is to be attached to a box with no heat-insulated layer, the box side of the apparatus may be contacted therewith base on the same theory as described above in a state in which the apparatus is projected to the external wall of the box.

As for the direction of attaching the apparatus thereto, the bottom of the lower side of the box is the best, but it may be attached to the side wall thereof.

As for specifications covering extremely cold weather, reversely the method as described above, the outer side of the apparatus may be contacted with the external wall of the box.

The above positional effect is acted effectively on generation of a gradient in temperature in each of the chambers of the apparatus or a chamber and inside of the box with a membrane therebetween.

The main body of the electric conductive porous body may comprise substances each having a different thermal conductivity so that generation of gradient in temperature will be promoted. Also, a heat insulating board may be provided in an external tube as necessary.

The main body (tubular body) may comprise substances each having a different electric conductivity or electrification so that generation of gradient in electrostatic volume between chambers or the like will be promoted.

An electric conductive porous body and a waterproof membrane (functional porous membrane) are arranged in the same idea as that for Experiment G2-1 executed in a state in which the heat insulating side of the waterproof membrane directs towards the box side so as not to give any damage to the electrostatic features of the membrane, namely electrification thereof, namely electric insulating strength thereof, and when the same heat insulating side (non-woven fabric) is arranged on the box side, a structural body having conductivity on the surface of the non-woven fabric, or fibers having conductivity, or the evaporated layer of a conductive substance may be a structure integrated with the membrane.

A porous body showing semiconducting features may also be used as an intermediate element.

An insect-proofing net or a dust-proofing net may be provided on the opening section in the outer side of the dehumidifying device. The insect-proofing net or the dust-proofing net may employ a drooping shape in the central section thereof so as not to hold water droplet, or a fin for protection against a windstorm with a shape suitable for drying it (especially a less concave shape in the vertical direction) may be provided on the outside of the insect-proofing net or the dust-proofing net.

Provided in each of the chambers as a space for a passage of air breathing in and out between the box and outside air is an accumulator opening to the outer side, and the accumulator may restrict or cut off a sectional area of air passing therethrough when the accumulator is massive so that the air is brought into close contact with the side wall of each chamber or a speed of flowing-in thereof is restricted when the accumulator is massive for the purpose of preventing air containing water-vapor particles from abrupt flow-in to the box side from the outer side between chambers when a sudden drop of temperature in the outside or a sudden rise of atmospheric pressure therein is about to occur under abrupt fluctuations in temperature or in atmospheric pressure in the outside environment under which the box is installed. It is needless to say that a number of the accumulator to be provided may be a plurality thereof or a single one.

As a protecting countermeasure against clogging in membranes or grounding meshes forming each chamber (small chamber) in the opening section in the box side, an air vibration plate or a coil for actuating vibration of the air in each chamber may be provided inside of the box so that air vibration is generated for each specified time interval by an amplifier for outputting a low frequency and all the membranes, grounding meshes, or dust-proofing nets or the like can be prevented from clogging.

Fluctuations in a volume of a chamber space, or movement of an electric conductive porous body or a convection controlling fin may be designed to be manually carried out from outside. A frame 13 may electrically be moved to a outer side or to a box side, for instance, by spirally moving an external wall (tube) 12.

In the dehumidifying device according to claim 10, especially, temperature inside the box, in each chamber, and in outside air may be detected with a thermosensor so that each position of the temperature will be changed according to control by a microcomputer.

As for a moving method of a frame, a parallel movement may be employed so that hermeticity between the box side and each chamber space or the outer side in a small chamber will be maintained, while as a method of not interfering with a convective phenomenon in a vent path, a spiral movement may be employed for movement of the moving frame or the like.

Other than a shape-memory alloy used for movement of the moving frame, an internal wall 1 may be constructed by an elastic body capable of flexible contraction. The internal wall 1 is formed with a moisture-permeable waterproof membrane, and at that time the character of a hole is changed in a folding section, so that the membrane may be provided in a position away from the section. Also, a material in this folding section can expand or contract according to a change of moisture absorption. For instance, the movement of the frame may be controlled by using natural fiber of cotton or silk as a non-woven fabric.

In a case where significant fluctuations in temperature occur and temperature in outside air is also high, as shown in FIG. 30, an internal wall 14a with an elastic body flexible to contraction is provided in the box side chamber to form a portion 14b continued to the internal wall 14a positioned outside of the internal wall 14a which forms a space 14c closed by the internal wall 14a in accordance with a rise of the temperature in the external wall 15 or a rise of temperature in the side of the box (internal wall of the box or external wall thereof).

The internal space 14c expands, with a rise of temperature, according to air or gas contained therein, which causes a sectional area for gas passing therethrough in the box side chamber to shrink and at the same time makes a second membrane B move to the outer side. At that time, the internal walls 14a and 14b have a balloon in doughnut-shaped form, so that the second membrane B can move in parallel to a first membrane A or a third membrane C even in a case where temperature in the box or the external wall 15 of the apparatus rises nonuniformly.

When the temperature drops, the internal space 14c shrinks, the sectional area of the vent path enlarges and at the same time the second membrane B approaches the side of the first membrane A.

As for the internal wall 14a or 14b, the thickness thereof may be thinned at the most expanded section so that the above movement can be promoted. The internal wall 11 shown in FIG. 26 may exist in a position except a balloon section (accumulator section) by the internal wall 14a or 14b shown in FIG. 30.

In a case where the apparatus is used under such environment that a sudden fluctuation in atmospheric pressure may occur, the internal wall 14 with an elastic body flexible to contraction may be provided in the outer side chamber as shown in FIG. 31, and a traffic path 18 for air communication with outside field through a waterproof membrane 19 having high air-permeable and moisture-permeable micro-throughholes may be provided in the most lower side of the content of the elastic body. In this case, the elastic body contracts in accordance with reduction of the pressure in outside air so as to closely contact with the external wall 15, and at the same time the chamber in the outer side shrinks, on the contrary, the elastic body expands with increasing of pressure in outside air which makes the second membrane B approach the first membrane A side namely the box side in parallel, so that a relation of a volume between chambers to suppress the movement of water vapor contained in outside air to the box side can be maintained, and a back-flow phenomenon with a phenomenon of a drop of temperature inside of the box in accordance with increasing of temperature in outside air or a back-flow phenomenon due to back pressure generating with a difference in air permeability between waterproof membranes each having moisture-permeable micro-throughholes can be suppressed.

As for a sliding form of the moving section along the external wall 15, the parallel movement may be employed or a groove as a guide for restricting a moving state such as a spiral movement or the like may be provided thereon.

In the mounting section of the box, as shown in FIG. 1 (b), a bank for preventing the first membrane or the like from being soaked in water may be provided therein against intrusion of water into the box due to condensation of a large amount of water vapor intruded by an accident or due to breakage of hermeticity in the box side. Also, an air cut valve for discharging water may be incorporated in the tubular body of the dehumidifying device. A net 39 for protecting the electric conductive porous body a1 and the first membrane A, or a drop-proof shade 3b may be provided thereon.

EFFECTS OF THE INVENTION

The dehumidifying device according to claim 1 can promote a dehumidifying effect by preventing a dehumidifying function from reduction due to strongly electrified gas which caused a dehumidifying effect not to be achieved in a conventional type of dehumidifying device, namely in the apparatus partitioned into small chambers each shielded by moisture-permeable waterproof membranes into a plurality of stages therein, because electrification in air, surroundings, or of the gas in the box side receives a dielectric effect along the vent path comprising an electrically grounded conductive porous body provided adjacent to at least one side of a waterproof membrane having moisture-permeable micro-throughholes to make a pair therewith, or by selecting any gradient in humidity, obtained by making use of the dielectric effect, between the small chambers as required according to the environment.

The dehumidifying device according to claim 2 can promote a dehumidifying effect by preventing a dehumidifying function from reduction due to more strongly electrified gas as compared to that in a case where the electric conductive porous body is partially grounded by which a dehumidifying effect could not be achieved in the conventional type of dehumidifying device, namely in the device partitioned into small chambers each shielded by moisture-permeable waterproof membranes into a plurality of stages therein, because electrification in air, surroundings, or of the gas in the box side receives a dielectric effect by the vent path comprising conductive porous bodies successively provided and electrically grounded each adjacent to at least one side of each of the waterproof membranes having moisture-permeable micro-throughholes to make a pair therewith, and by making weather proofing higher, increasing a protecting capability against spoiling of the device or by selecting any gradient in humidity, obtained by making use of the dielectric effect, between the small chambers as required according to the environment.

The dehumidifying device according to claim 3 can promote a dehumidifying effect by preventing a dehumidifying function from reduction due to strongly electrified gas which caused a dehumidifying effect not to be achieved in the conventional type of dehumidifying device, namely in the device only partitioned into small chambers each shielded by moisture-permeable waterproof membranes into a plurality of stages therein, because electrification in air, surroundings, or of the gas in the box side is dielectrified by the vent path comprising an electrically grounded conductive porous body provided adjacent to at least one side of a waterproof membrane having moisture-permeable micro-throughholes to make a pair therewith and suitable for a larger type of airtight box because of a higher discharging rate which can dehumidify more than that in the dehumidifying device according to claim 1, or by selecting any gradient in humidity, obtained by making use of the dielectric effect, between the small chambers as required according to the environment.

The dehumidifying device according to claim 4 can promote a dehumidifying effect by preventing a dehumidifying function from reduction due to more strongly electrified gas as compared to that in a case where the electric conductive porous body is partially grounded by which a dehumidifying effect could not be achieved in a conventional type of dehumidifying device, namely in the device only partitioned into small chambers each shielded by moisture-permeable waterproof membranes into a plurality of stages therein, because electrification in air, surroundings, or of the gas in the box side receiving a dielectric effect along the vent path comprising conductive porous bodies successively provided and electrically grounded each adjacent to at least one side of each of the waterproof membranes having moisture-permeable micro-throughholes to make a pair therewith and suitable for a larger type of airtight box because of a higher discharging rate which can dehumidify more than that in the dehumidifying device according to claim 2, and by making weather proofing higher, increasing a protecting capability against spoiling of the device or by selecting any gradient in humidity, obtained by making use of the dielectric effect, between the small chambers as required according to the environment.

The dehumidifying device according to claim 5 can promote a dehumidifying effect by preventing a dehumidifying function from reduction due to more strongly electrified gas as compared to that in a case where the conductive porous body is partially grounded by which a dehumidifying effect could not be achieved in the conventional type of dehumidifying device, namely in the device only partitioned into small chambers each shielded by moisture-permeable waterproof membranes into a plurality of stages therein, because electrification in air, surroundings, or of the gas in the box side is dielectrified by the vent path comprising conductive porous bodies successively provided and electrically grounded each adjacent to at least one side of each of the waterproof membranes having moisture-permeable micro-throughholes to make a pair therewith and suitable for a larger type of airtight box because of a higher discharging rate which can dehumidify more than that in the dehumidifying device according to claim 2, and by making weather proofing higher, increasing a protecting capability against spoiling of the device or by selecting any gradient in humidity, obtained by making use of the dielectric effect, between the small chambers as required according to the environment.

The dehumidifying device according to claim 6 can promote a dehumidifying effect by preventing a dehumidifying function from reduction due to more strongly electrified gas as compared to that in a case where the electric conductive porous body is partially grounded by which a dehumidifying effect could not be achieved in the conventional type of dehumidifying device, namely in the device only partitioned into small chambers each shielded by moisture-permeable waterproof membranes into a plurality of stages therein, because electrification in air, surroundings, or of the gas in the box side is dielectrified by the vent path comprising conductive porous bodies successively provided and electrically grounded each adjacent to at least one side of each of the waterproof membranes having moisture-permeable micro-throughholes to make a pair therewith and suitable for a larger type of airtight box because of a higher discharging rate which can dehumidify more than that in the dehumidifying device according to claim 2, and by making weather proofing higher, increasing a protecting capability against spoiling of the device or by selecting any gradient in humidity, obtained by making use of the dielectric effect, between the small chambers as required according to the environment.

The dehumidifying device according to claim 7 can improve a dehumidifying effect as well as suppress a sucking speed of gas in the outer side at the time of sucking gas by selecting any shape, with which the electric conductive porous body can uppermost be effected, among a combination of electric conductive porous bodies with a wave-front shape and a concentric circular shape or a combination of the electric conductive porous bodies with the same shape each required for designing a shape so that the electric conductive porous body exists in a path in the discharging air side as the most appropriate one to avoid the fluctuation because an electric conductive porous body with a simple concentric circular shape may generate an unstable element, because the electrically grounded conductive porous body in the vent path used in the dehumidifying device according to claims 1, 2, 3, 4, 5, or 6 has a wave front shape or a concentric circular shape provided in a position decided in consideration of convection in each chamber, and the electrically conductive porous bodies are placed in a position decided by taking into consideration a difference between temperature in the side to be dehumidified and that in the outer side in accordance with vibration of flow due to inconsistency of convective gas in density generated by convection in each of small chambers, so that, even in one sheet of conductive porous body, there are places with a large flow and a small flow which fluctuate according to a velocity of flow namely flow velocity, a flux of the flow namely a flux, or to gas density in outside air.

The dehumidifying device according to claim 8 can also adjust a drying speed at a constant level by adjusting a gradient in an electrostatic potential adjacent to a moisture-permeable waterproof membrane as an interface between chambers or adjusting the density in water vapor therein according to a use of gradient in potential in an electric resistor or without connecting a discrete electric resistance to the electric conductive porous body.

The dehumidifying device according to claim 9 can adjust a drying speed without adding any discrete electric resistor to a grounded circuit.

The dehumidifying device according to claim 10 can promote a dehumidifying effect together with a gradient in temperature between chambers generated by artificially generating a gradient in temperature in an area with the electric conductive porous body and a moisture-permeable waterproof membrane provided therein, which results in generation of an electrostatic gradient on a surface of a porous sheet made from a substance with a high insulating capability such as 4-ethylene fluoride or polyethylene or the like, so that a gradient in potential for promoting a dehumidifying effect acts continuously yet weak between chambers or on the same membrane and adjacent to the electric conductive porous body, and making use of fluctuations in a generating rate of electric power in accordance with fluctuations in an irradiating amount of light around the apparatus.

The dehumidifying device according to claim 11 can promote a dehumidifying effect together with a gradient in temperature between chambers generated by artificially generating a gradient in temperature in an area with the electric conductive porous body and a moisture-permeable waterproof membrane provided therein, which results in generation of an electrostatic gradient on a surface of a porous sheet made from a substance with a high insulating capability such as 4-ethylene fluoride or polyethylene or t like, so that a gradient in potential for promoting a dehumidifying effect acts continuously yet weak between chambers or on the same membrane and adjacent to the electric conductive porous body, and making use of fluctuations in a generating rate of electric power in accordance with fluctuations in an irradiating amount of light around the apparatus.

The dehumidifying device according to claim 12 can buffer phenomena such as a back-flow phenomenon and a reverse gradient in temperature contradicting against conditions such as a gradient in temperature between chambers required for the dehumidifying device generated due to temperature in outside air and a sudden fluctuation in atmospheric pressure of outside air in a relation of a distance between the chamber in the box side and the chamber in the outer side and in a relation of the volumes therebetween and a gradient in an electrostatic volume generated with a gradient in density of water vapor between the chambers, and can maintain dehumidification in the box side in a stabler state.

The dehumidifying device according to the present invention can change a degree of dehumidification in an internal space of the box as a space for an object to be dehumidified, without power and power source as a rule, corresponding to a significant fluctuation in an external environment, prevent abrupt thermal-insulated cooling of an electric conductive porous body, a convection control fin, or a wall section in the chamber side, and can prevent more safely dew condensation inside the space in each of the chambers.

In a case where a shape-memory alloy is used as a moving means, it can be moved in parallel by depending on fluctuations in temperature on the external wall, but in this case, a frictional resistance occurs when a moving section is moving. And for this reason, by hanging a frame of the second membrane section so that the frame is hung by a piece of shape-memory alloy at the central section of the frame, distortion of the shape-memory alloy or a rise of a frictional resistance can be prevented.

In a case where a balloon is used as a moving means, the balloon expands in accordance with a rise of temperature on the external wall to make the sectional area of the vent path shrink, in a case where the vent path comprises two sheets of membrane the second membrane is moved to the outer side, and in a case where the vent path comprises three sheets of membranes, the second membrane is moved thereto, namely by making the volume of the box side chamber larger as compared to that of the outer side chamber, movement of water vapor to the outer side can be promoted by passing water vapor, inside the box having passed through the electric conductive porous body and the first membrane in a state in which the water vapor maintain sufficient diffusion energy therein, through the electric conductive porous body and the membrane in the second membrane section, and by shrinking a volume of the chamber in the outer side, a total amount of movement due to convection of air in the outer side of chamber is relatively reduced, so that a back-flow phenomenon in accordance with a decrease of temperature inside the box relatively generated when temperature in outside air is increasing as well as a back-flow phenomenon due to back pressure generating according to a difference in a gas permeable rate between membranes each having moisture-permeable micro-throughholes can be suppressed, and diffusion of water vapor from the box side chamber to the outer side chamber is promoted, and as a result, the diffusion of water vapor from the box side chamber to the outer side chamber is promoted, so that a dehumidifying effect can be promoted.

On the other hand, in a case where the temperature on the external wall drops in accordance with a drop of temperature in outside air or with a drop of the temperature in the box side, the moving section approaches the box side, which makes the total amount of movement due to convection of air in the outer side of chamber increase and also makes a moving speed of the water vapor in the outer side to the box side slower, and for this reason, the volume of the box side of chamber, viewing from the box side, decreases as compared to the volume of the outer side of chamber, and a result, a moving speed of water vapor from the box to outside air is promoted, so that the back-flow phenomenon, as described above, in accordance with a decrease of temperature as well as the back-flow phenomenon due to back pressure generating according to a difference in a gas permeable rate between membranes each having moisture-permeable micro-throughholes can be suppressed.

The balloon give a thermal insulating effect to the vent path, so that it has a double effect of buffering abrupt thermal conduction from the box side as well as of promoting a dehumidifying effect.

INDUSTRIAL APPLICABILITY

As described above, the dehumidifying device according to the present invention is effective in dehumidification in various types of controlling box, a gear case, a container, a wave guide, an antenna dome for microwaves or the like each of which does not require instant dehumidifying effects, and is especially suitable for dehumidifying an airtight box which does not receive any inspection thereof for a long period of time.

What is claimed is:

1. A dehumidifying device comprising:
   a tubular body provided in a wall section of a box and forming a vent path for air communication between inside and outside of said box; and
   a vent body formed by providing an electrically grounded conductive porous body adjacent to at least one side of a waterproof membrane having moisture-permeable micro-throughholes to make a pair therewith and arranging at least two pairs thereof at a space from each other inside said tubular body to shield an inside space of said vent path into at least one chamber in the direction from said box to the outside.

2. A dehumidifying device comprising:
   a tubular body provided in a wall section of a box and forming a vent path for air communication between inside and outside of said box; and
   a vent body formed by providing electric conductive porous bodies successively provided and electrically grounded each adjacent to at least one side of each of waterproof membranes having moisture-permeable micro-throughholes to make a pair therewith and arranging at least two pairs thereof at a space from each other inside said tubular body to shield an inside space of said vent path into at least one chamber in the direction from said box to the outside.

3. A dehumidifying device comprising:
   a tubular body provided in a wall section of a box and forming a vent path for air communication between inside and outside of said box; and
   a tubular-shaped vent body with a bottom formed by providing an electrically grounded conductive porous body adjacent to at least one side of a waterproof membrane having moisture-permeable micro-throughholes to make a pair therewith and forming a portion of the wall of the tube therewith; wherein said vent path is shielded in the direction from inside of said box to the outside by providing said tubular-shaped vent body with a bottom inside of said tubular body.

4. A dehumidifying device comprising:
   a tubular body provided in a wall section of a box and forming a vent path for air communication between inside and outside of said box; and
   a tubular-shaped vent body with a bottom formed by providing conductive porous bodies successively provided and electrically grounded each adjacent to at least one side of each of waterproof membranes having moisture-permeable micro-throughholes to make a pair therewith and forming a portion of the wall of the tube therewith; wherein said vent path is shielded in the direction from inside of said box to the outside by providing said tubular-shaped vent body with a bottom inside of said tubular body.

5. A dehumidifying device comprising:
   a tubular body provided in a wall section of a box and forming a vent path for air communication between inside and outside of said box; and
   a vent body formed by providing an electrically grounded conductive porous body adjacent to at least one side of a waterproof membrane having moisture-permeable micro-throughholes and arranging a plurality of said membranes at a space from each other inside said tubular body to shield an inside space of said vent path into a plurality of small chambers.

6. A dehumidifying device comprising:
   a tubular body provided in a wall section of a box and forming a vent path for air communication between inside and outside of said box; and
   a vent body formed by providing conductive porous bodies successively provided and electrically grounded each adjacent to at least one side of each of waterproof membranes having moisture-permeable micro-throughholes and arranging a plurality of said membranes at a space from each other inside said tubular body to shield an inside space of said vent path into a plurality of small chambers.

7. A dehumidifying device according to claims 1, 2, 3, 4, 5, or 6; wherein the electrically grounded conductive porous body in the vent path used in said device according to any of said claims has a wave-front shape or a concentric circular shape and is provided in a position with consideration of a convective phenomenon in each chamber.

8. A dehumidifying device comprising:
   a tubular body provided in a wall section of a box and forming a vent path for air communication between inside and outside of said box; and
   a vent body formed by providing a weak conductive porous body comprising a porous electric resistor with high electric resistance adjacent to at least one side of a waterproof membrane having moisture-permeable micro-throughholes to make a pair therewith and arranging said membrane and conductive porous body as a pair constituting the vent path at a space from each other inside said tubular body to shield an inside space of said tubular body.

9. A dehumidifying device comprising:
   a tubular body provided in a wall section of a box and forming a vent path for air communication between inside and outside of said box; and
   at least dual tubular-shaped vent bodies each with a bottom formed by providing a weak electric conductive porous body comprising a porous electric resistor with high electric resistance adjacent to at least one side of a waterproof membrane having moisture-permeable micro-throughholes to make a pair therewith and forming a portion of the tubular wall thereby constituting the vent path; wherein an inside space of said vent path is shielded into a plurality of stages in the direction from inside to outside of the box by providing said tubular-shaped vent bodies each with a bottom inside said tubular body.

10. A dehumidifying device according to claims 1, 2, 3, 4, 5, 6, 8, or 9; wherein said vent path comprises a thermoelectronic element which directs its heating section toward the box side and also directs its cooling section toward the side of outside air with the waterproof membrane therebetween.

11. A dehumidifying device according to claims 1, 2, 3, 4, 5, 6, 8, or 9; wherein moisture-permeable waterproof membranes constituting at least three types of vent path of said dehumidifying device comprises moisture-permeable membranes each of which can be waterproofed and is set so that moisture permeability becomes higher along the direction from the box side to the side of outside air, and is also set so that air permeability becomes lower along the direction from the box side to the side of outside air.

12. A dehumidifying device according to claims 1, 2, 3, 4, 5, 6, 8, or 9 comprising:

a frame forming a vent path for air communication between inside and outside of said box in which a volume of said vent path can be changed;

a waterproof membrane having moisture-permeable micro-throughholes fixed to said frame with hermeticity therein; and a means extending and shrinking according to such an external environment which makes said frame move.

\* \* \* \* \*

UNITED STATES PATENT AND TRADEMARK OFFICE
CERTIFICATE OF CORRECTION

PATENT NO.   : 5,985,005
DATED        : November 16, 1999
INVENTOR(S)  : Kunitaka Mizobe Page 1 of 1

It is certified that error appears in the above-identified patent and that said Letters Patent is hereby corrected as shown below:

Please change item [86] to read:
§371 Date: 4-11-97
§102 (e) Date: 4-11-97

Claim 12,
Line 2, delete "or 9".

Signed and Sealed this

Fourth Day of December, 2001

Attest:

*Nicholas P. Godici*

NICHOLAS P. GODICI
*Attesting Officer*   *Acting Director of the United States Patent and Trademark Office*